(12) United States Patent
Sasada et al.

(10) Patent No.: US 7,157,124 B2
(45) Date of Patent: Jan. 2, 2007

(54) POLYMERIZABLE COMPOUNDS AND THEIR POLYMERS

(75) Inventors: Yasuyuki Sasada, Ichihara (JP); Kazuhiko Saigusa, Ichihara (JP)

(73) Assignees: Chisso Petrochemical Corporation, Tokyo (JP); Chisso Corporation, Osaka (JP)

( * ) Notice: Subject to any disclaimer, the term of this patent is extended or adjusted under 35 U.S.C. 154(b) by 347 days.

(21) Appl. No.: 10/752,295

(22) Filed: Jan. 5, 2004

(65) Prior Publication Data

US 2004/0222403 A1 Nov. 11, 2004

(30) Foreign Application Priority Data

Jan. 6, 2003 (JP) .............................. 2003-000567

(51) Int. Cl.
*C09K 19/52* (2006.01)
*C09K 19/38* (2006.01)
*C09K 19/34* (2006.01)
*C09K 19/32* (2006.01)
*C09K 19/20* (2006.01)
*C07D 405/04* (2006.01)
*C07C 25/22* (2006.01)

(52) U.S. Cl. .................... 428/1.1; 428/1.2; 428/1.3; 428/1.31; 252/299.01; 252/299.61; 252/299.62; 252/299.63; 252/299.66; 252/299.67; 548/526; 570/128; 570/138; 570/183

(58) Field of Classification Search ................ 428/1.1, 428/1.2, 1.3, 1.31; 252/299.01, 299.61, 299.62, 252/299.63, 299.64, 299.65, 299.67, 299.66; 548/526; 570/128, 138, 183

See application file for complete search history.

(56) References Cited

U.S. PATENT DOCUMENTS 5,622,648 A   4/1997  Parri et al. ............. 252/299.66

(Continued)

FOREIGN PATENT DOCUMENTS

JP         07-017910        1/1995

(Continued)

OTHER PUBLICATIONS

English abstract for JP 2003-128665.*

*Primary Examiner*—Shean C. Wu
(74) *Attorney, Agent, or Firm*—J.C. Patents

(57) ABSTRACT

A compound represented by formula (1) or (2) and a polymer obtained by polymerizing the compound are provided:

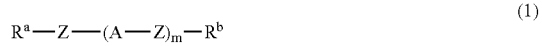

(1)

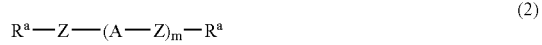

(2)

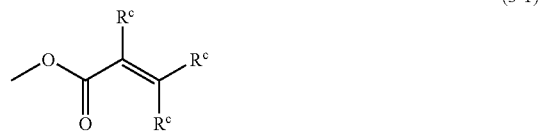

(3-1)

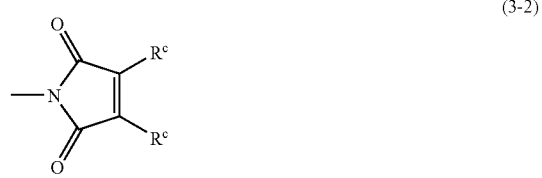

(3-2)

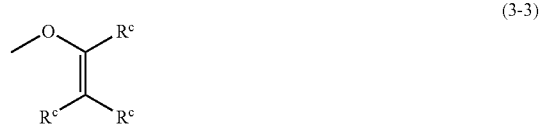

(3-3)

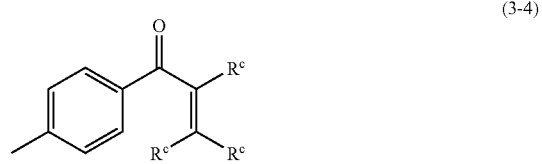

(3-4)

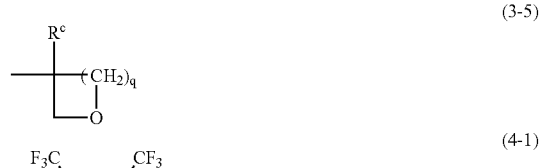

(3-5)

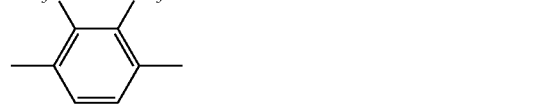

(4-1)

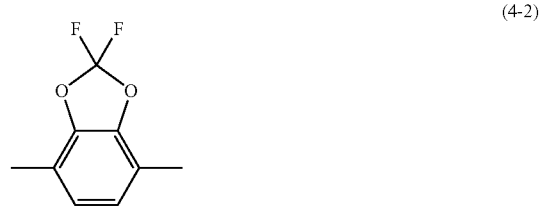

(4-2)

wherein $R^a$ is one of the groups represented by Formulas (3-1) to (3-5); $R^b$ is hydrogen, halogen, or a side chain such as —CN, —NCO, —NCS or alkyl having a carbon number of 1 to 20; A is a cyclic diyl group such as 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]oct-1,4-diyl or bicyclo[3.1.0]hex-3,6-diyl, wherein at least one A is substituted 1,4-phenylene represented by Formula (4-1) or (4-2); Z is a single bond or a bonding group such as alkylene having a carbon number of 1 to 20; $R^c$ is hydrogen, halogen, —$CF_3$ or alkyl having a carbon number of 1 to 5; m is an integer of 1 to 6, and q is 0 or 1.

47 Claims, No Drawings

U.S. PATENT DOCUMENTS

| | | | |
|---|---|---|---|
| 5,863,457 A | 1/1999 | Hasebe et al. | 252/299.01 |
| 6,844,032 B1 * | 1/2005 | Miyazawa et al. | 428/1.1 |
| 2005/0213009 A1 * | 9/2005 | Yanai et al. | 349/137 |
| 2005/0224757 A1 * | 10/2005 | Syundo et al. | 252/299.61 |

FOREIGN PATENT DOCUMENTS

| | | | |
|---|---|---|---|
| JP | 09-316032 | | 9/1997 |
| JP | 2003-128665 | * | 5/2003 |

* cited by examiner

POLYMERIZABLE COMPOUNDS AND THEIR POLYMERS

BACKGROUND OF THE INVENTION

1. Field of the Invention

The present invention relates to a compound having a polymerizability and a crystallinity, a polymer thereof and uses of the polymer. The polymer can be used for a molded article having an optical anisotropy, a liquid crystal display element and the like.

2. Description of Related Art

In recent years, a polymerizable liquid crystalline compound is utilized for a molded article having an optical anisotropy such as a polarizing plate and a phase contrast plate. This is because the above compound has an optical anisotropy in a liquid crystal state and the arrangement of the above compound is fixed by polymerization. Optical characteristics required to a molded article having an optical anisotropy are different according to the purposes, and therefore a compound having characteristics, which meets the above purpose is required. In general, the above compound is polymerized to prepare a polymer, and it is molded and utilized. In a compound used for such purpose, the characteristics of the polymer in addition to the anisotropy described above are important. These characteristics include polymerizing speed of the compound, and transparency, mechanical strength, coating property, solubility, crystallinity, shrinking property, water permeability, water absorbency, melting point, glass transition point, clearing point, chemical resistance of the polymer, and the like.

Acrylates have a large polymerization reactivity, and the resulting polymers have a high transparency, so that they are used for such purpose (refer to, for example, a patent document 1, a patent document 2, a patent document 3 and a patent document 4).

Patent document 1: JP H7-17910 A/1995

Patent document 2: JP H8-3111 A/1996 (U.S. Pat. No. 5,863,457)

Patent document 3: JP H9-316032 A/1997

Patent document 4: U.S. Pat. No. 5,622,648 are incorporated herein by reference.

SUMMARY OF THE INVENTION

Accordingly, the present invention is directed to polymerizable compounds and their uses.

According to an embodiment of the present invention, a compound represented by the following formula (1) or (2) is provided:

(1)

(2)

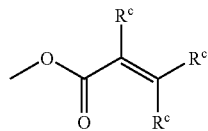
(3-1)

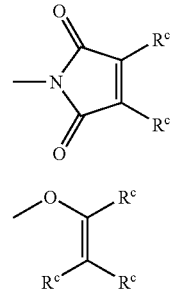
(3-2)

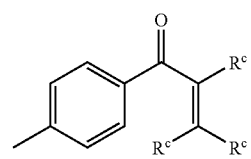
(3-3)

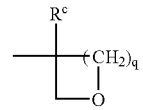
(3-4)

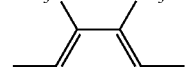
(3-5)

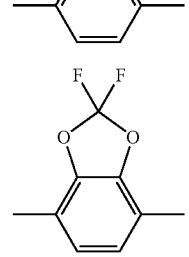
(4-1)

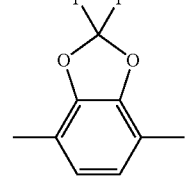
(4-2)

wherein $R^a$ is any one of polymerizable groups represented by Formulas (3-1) to (3-5); $R^b$ is hydrogen, halogen, —CN, —NCO, —NCS or alkyl having a carbon number of 1 to 20; in the above alkyl, at least a —CH$_2$— can be substituted with —O—, —S—, —CO—, —COO—, —OCO—, —CH=CH— or —C≡C—, and at least a hydrogen can be substituted with halogen or —CN; A is 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]oct-1,4-diyl or bicyclo[3.1.0]hex-3,6-diyl; in the above rings, at least a —CH$_2$— can be substituted with —O—, and at least a —CH= can be substituted with —N=; in the above rings, at least a hydrogen can be substituted with halogen, alkyl having a carbon number of 1 to 5 or halogenated alkyl having a carbon number of 1 to 5, and when the above substituents are adjacent, they can be combined with each other to form a ring together with a carbon-carbon bond in the ring, but at least one A is substituted 1,4-phenylene represented by Formula (4-1) or (4-2); Z is a single bond or alkylene having a carbon number of 1 to 20; in the above alkylene, at least a —CH$_2$— can be substituted with —O—, —S—, —COO—, —OCO—, —CH=CH—, —CF=CF— or —C≡C—, and at least a hydrogen can be substituted with halogen; $R^c$ is hydrogen, halogen, —CF$_3$ or alkyl having a carbon number of 1 to 5; m is an integer of 1 to 6, and q is 0 or 1.

DETAILED DESCRIPTION OF THE INVENTION

According to an embodiment of the present invention, a polymer is obtained by polymerizing the compound described above.

The present invention is directed to a polymerizable liquid crystalline compound having a broad temperature range in a liquid crystal phase, an excellent compatibility with other compounds and necessary characteristics such as an optical anisotropy and a liquid crystal composition containing the above compound.

According to an embodiment of the present invention, a polymer having many excellent characteristics, such as transparency, mechanical strength, coating property, solubility, crystallinity, shrinking property, water permeability, water absorbency, melting point, glass transition point, clearing point and chemical resistance and molded article having an optical anisotropy which is formed from the above polymer, is provided.

According to another embodiment of the present invention, a liquid crystal display element containing the above polymer is provided.

The embodiments described above are being described in detail as follows.

A compound, according to an embodiment of the present invention, is represented by the following formula (1) or (2):

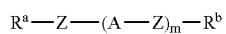  (1)

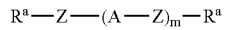  (2)

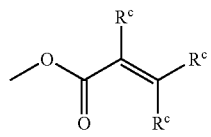  (3-1)

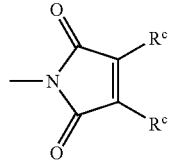  (3-2)

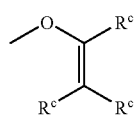  (3-3)

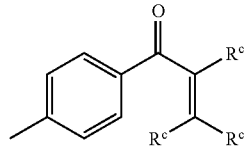  (3-4)

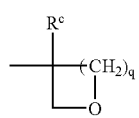  (3-5)

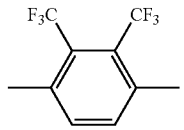  (4-1)

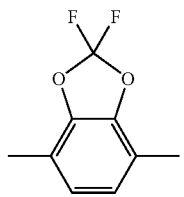  (4-2)

wherein $R^a$ can be any one of polymerizable groups represented by formulae (3-1) to (3-5); $R^b$ can be hydrogen, halogen, —CN, —NCO, —NCS or alkyl having a carbon number of 1 to 20; in the above alkyl, optional —$CH_2$— can be substituted with —O—, —S—, —CO—, —COO—, —OCO—, —CH=CH— or —C≡C—, and optional hydrogen can be substituted with halogen or —CN; A is 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]oct-1,4-diyl or bicyclo[3.1.0]hex-3,6-diyl; in the above rings, optional —$CH_2$— can be substituted with —O—, and optional —CH= can be substituted with —N=; in the above rings, optional hydrogen can be substituted with halogen, alkyl having a carbon number of 1 to 5 or halogenated alkyl having a carbon number of 1 to 5, and when the above substituents are adjacent, they may be combined with each other to form a ring together with a carbon-carbon bond in the ring, but at least one A is substituted 1,4-phenylene represented by formula (4-1) or (4-2); Z is a single bond or alkylene having a carbon number of 1 to 20; in the above alkylene, optional —$CH_2$— can be substituted with —O—, —S—, —COO—, —OCO—, —CH=CH—, —CF=CF— or —C≡C—, and optional hydrogen can be substituted with halogen; $R^c$ is hydrogen, halogen, —$CF_3$ or alkyl having a carbon number of 1 to 5; m is an integer of 1 to 6, and q is 0 or 1.

According to an embodiment of the present invention, the compound as described in [0009] above, wherein in formulae (1) and (2), $R^a$ is the polymerizable group represented by Formula (3-1) or (3-5).

According to another embodiment of the present invention, the compound as described in [0009] above, wherein in Formulas (1) and (2), $R^a$ is the polymerizable group represented by formula (3-1) or (3-5), and A other than the ring represented by formula (4-1) or (4-2) is 1,4-cyclohexylene, 1,4-cyclohexylene in which optional hydrogen is substituted with halogen, 1,4-phenylene or 1,4-phenylene in which optional hydrogen is substituted with halogen.

According to an embodiment of the present invention, the compound as described in [0009] above, wherein in formulae (1) and (2), $R^a$ is the polymerizable group represented by formula (3-1) or (3-5); A other than the ring represented by formula (4-1) or (4-2) is 1,4-cyclohexylene, 1,4-cyclohexylene in which optional hydrogen is substituted with halogen, 1,4-phenylene or 1,4-phenylene in which optional hydrogen is substituted with halogen; Z is a single bond, —$(CH_2)_a$—, —$O(CH_2)_a$—, —$(CH_2)_aO$—, —$O(CH_2)_aO$—, —CH=CH—, —C≡C—, —COO—, —OCO—, —CH=CH—COO—, —OCO—CH=CH—, —CH$_2$CH$_2$—COO—, —OCO—CH$_2$CH$_2$—, —OCF$_2$— or —CF$_2$O—; and a is an integer of 1 to 20.

According to an embodiment of the present invention, the compound as described in [0009] above, wherein in formulae (1) and (2), R$^a$ is the polymerizable group represented by any one of formulae (3-2) to (3-4).

According to an embodiment of the present invention, the compound as described in paragraph [0009] above, wherein in formulae (1) and (2), R$^a$ is the polymerizable group represented by any one of formulae (3-2) to (3-4), and A other than the ring represented by formula (4-1) or (4-2) is 1,4-cyclohexylene, 1,4-cyclohexylene in which optional hydrogen is substituted with halogen, 1,4-phenylene or 1,4-phenylene in which optional hydrogen is substituted with halogen.

According to an embodiment of the present invention, the compound as described in [0009] above, wherein in formulae (1) and (2), R$^a$ is the polymerizable group represented by any one of Formulas (3-2) to (3-4); A other than the ring represented by Formula (4-1) or (4-2) is 1,4-cyclohexylene, 1,4-cyclohexylene in which optional hydrogen is substituted with halogen, 1,4-phenylene or 1,4-phenylene in which optional hydrogen is substituted with halogen; Z is a single bond, —(CH$_2$)$_a$—, —O(CH$_2$)$_a$—, (CH$_2$)$_a$O—, —O(CH$_2$)$_a$O—, —CH=CH—, —C≡C—, —COO—, —OCO—, —OCF$_2$— or —CF$_2$O—; and a is an integer of 1 to 20.

According to an embodiment of the present invention, the compound as described in [0009] above, wherein in formulae (1) and (2), m is 2.

According to an embodiment of the present invention, the compound as described in [0009] above, wherein in Formulas (1) and (2), m is 3.

The compound as described in paragraph [0009], wherein in Formulas (1) and (2), m is 4.

According to an embodiment of the present invention, the compound as described in paragraph [0009] above, wherein in formulae (1) and (2), R$^a$ is the polymerizable group represented by formula (3-1) or (3-5); one of A is the ring represented by Formula (4-1), and A other than it is 1,4-cyclohexylene, 1,4-phenylene or 1,4-phenylene in which optional hydrogen is substituted with halogen; Z is a single bond, —COO—, —OCO—, —(CH$_2$)$_a$—, —CH=CH—COO—, —OCO—CH=CH—, —CH$_2$CH$_2$—COO—, —OCO—CH$_2$CH$_2$—, —O(CH$_2$)$_a$—, —(CH$_2$)$_a$O— or —O(CH$_2$)$_a$O—; and a is an integer of 1 to 20.

According to an embodiment of the present invention, the compound as described in paragraph [0009] above, wherein in Formulas (1) and (2), R$^a$ is the polymerizable group represented by formula (3-1) or (3-5); one of A is the ring represented by formula (4-2), and A other than it is 1,4-cyclohexylene, 1,4-phenylene or 1,4-phenylene in which optional hydrogen is substituted with halogen; Z is a single bond, —COO—, —OCO—, —(CH$_2$)$_a$—, —O(CH$_2$)$_a$—, —(CH$_2$)$_a$O— or —O(CH$_2$)$_a$O—; and a is an integer of 1 to 20.

According to an embodiment of the present invention, the compound as described in paragraph [0009] above, wherein in formulae (1) and (2), R$^a$ is the polymerizable group represented by Formula (3-1) or (3-5); one of A is the ring represented by Formula (4-1), and A other than it is 1,4-phenylene; Z is —COO—, —OCO—, —(CH$_2$)$_a$—, —O(CH$_2$)$_a$—, —(CH$_2$)$_a$O— or —O(CH$_2$)$_a$O—; and a is an integer of 1 to 20.

According to an embodiment of the present invention, the compound as described in paragraph [0009], wherein in formulae (1) and (2), R$^a$ is the polymerizable group represented by any one of formulae (3-2) to (3-4); one of A is the ring represented by Formula (4-1), and A other than it is 1,4-cyclohexylene, 1,4-phenylene or 1,4-phenylene in which optional hydrogen is substituted with halogen; Z is a single bond, —COO—, —OCO—, —(CH$_2$)$_a$—, —O(CH$_2$)$_a$—, —(CH$_2$)$_a$O— or —O(CH$_2$)$_a$O—; and a is an integer of 1 to 20.

According to an embodiment of the present invention, the compound as described in paragraph [0009], wherein in formulae (1) and (2), R$^a$ is the polymerizable group represented by any one of formulae (3-2) to (3-4); one of A is the ring represented by Formula (4-2), and A other than it is 1,4-cyclohexylene, 1,4-phenylene or 1,4-phenylene in which optional hydrogen is substituted with halogen; Z is a single bond, —COO—, —OCO—, —(CH$_2$)$_a$—, —O(CH$_2$)$_a$—, —(CH$_2$)$_a$O— or —O(CH$_2$)$_a$O—; and a is an integer of 1 to 20.

According to an embodiment of the present invention, the compound as described in paragraph [0009], wherein in formulae (1) and (2), R$^a$ is the polymerizable group represented by any one of formulas (3-2) to (3-4); one of A is the ring represented by formula (4-1), and A other than it is 1,4-phenylene; Z is —COO—, —OCO—, —(CH$_2$)$_a$—, —O(CH$_2$)$_a$—, —(CH$_2$)$_a$O— or —O(CH$_2$)$_a$O—; and a is an integer of 1 to 20.

According to an embodiment of the present invention, a compound represented by any one of the following formulae (a) to (r) are provided:

R$^a$-Z-B—R$^a$   (a)

R$^a$-Z-B-Z-A-R$^a$   (b)

R$^a$-Z-B-Z-A-Z-A-R$^a$   (c)

R$^a$-Z-A-Z-B-Z-A-R$^a$   (d)

R$^a$-Z-B-Z-A-Z-A-Z-A-R$^a$   (e)

R$^a$-Z-A-Z-B-Z-A-Z-A-R$^a$   (f)

R$^a$-Z-B-Z-A-Z-A-Z-A-Z-A-R$^a$   (g)

R$^a$-Z-A-Z-B-Z-A-Z-A-Z-A-R$^a$   (h)

R$^a$-Z-A-Z-A-Z-B-Z-A-Z-A-R$^a$   (i)

R$^a$-Z-B-Z-R$^a$   (j)

R$^a$-Z-B-Z-A-Z-R$^a$   (k)

R$^a$-Z-B-Z-A-Z-A-Z-R$^a$   (l)

R$^a$-Z-A-Z-B-Z-A-Z-R$^a$   (m)

R$^a$-Z-B-Z-A-Z-A-Z-A-Z-R$^a$   (n)

R$^a$-Z-A-Z-B-Z-A-Z-A-Z-R$^a$   (o)

R$^a$-Z-B-Z-A-Z-A-Z-A-Z-A-Z-R$^a$   (p)

R$^a$-Z-A-Z-B-Z-A-Z-A-Z-A-Z-R$^a$   (q)

R$^a$-Z-A-Z-A-Z-B-Z-A-Z-A-Z-R$^a$   (r)

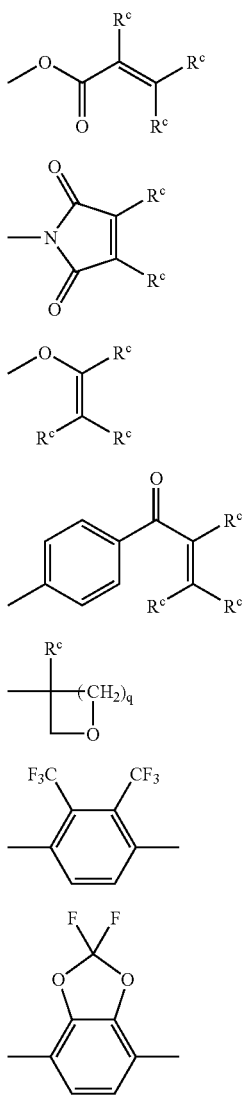

wherein $R^a$ is any one of polymerizable groups represented by Formulas (3-1) to (3-5); $R^b$ is hydrogen, halogen, —CN, —NCO, —NCS or alkyl having a carbon number of 1 to 20; in the above alkyl, optional —CH$_2$— can be substituted with —O—, —S—, —CO—, —COO—, —OCO—, —CH═CH— or —C≡C—, and optional hydrogen can be substituted with halogen or —CN; A is 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]oct-1,4-diyl or bicyclo[3.1.0]hex-3,6-diyl; in the above rings, optional —CH$_2$— can be substituted with —O—, and optional —CH═ may be substituted with —N═; in the above rings, optional hydrogen can be substituted with halogen, alkyl having a carbon number of 1 to 5 or halogenated alkyl having a carbon number of 1 to 5, and when the above substituents are adjacent, they can be combined with each other to form a ring together with a carbon-carbon bond in the ring; B is substituted 1,4-phenylene represented by formula (4-1) or (4-2); Z is a single bond or alkylene having 1 to 20 carbon atoms; in the above alkylene, optional —CH$_2$— can be substituted with —O—, —S—, —COO—, —OCO—, —CH═CH—, —CF═CF— or —C≡C—, and optional hydrogen can be substituted with halogen; $R^c$ is hydrogen, halogen, —CF$_3$ or alkyl having 1 to 5 carbon atoms; and q is 0 or 1.

According to an embodiment of the present invention, the compound as described in paragraph [0025] above, wherein in formulae (a) to (r), A is 1,4-cyclohexylene or 1,4-phenylene, and in the above rings, optional hydrogen can be substituted with halogen; Z is a single bond, —CH═CH—, —C≡C—, —COO—, —OCO—, —(CF$_2$)$_2$—, —CF═CF—, —OCF$_2$—, —CF$_2$O—, —(CH$_2$)$_a$—, —CH═CH—COO—, —OCO—CH═CH—, —CH$_2$CH$_2$—COO—, —OCO—CH$_2$CH$_2$—, —O(CH$_2$)$_a$—, —(CH$_2$)$_a$O— or —O(CH$_2$)$_a$O—; and a is an integer of 1 to 20.

According to an embodiment of the present invention, the compound as described in paragraph [0025], wherein in formulae (a) to (i), A is 1,4-cyclohexylene, 1,4-phenylene or 1,4-phenylene in which optional hydrogen is substituted with halogen; Z is a single bond, —COO—, —OCO—, —(CH$_2$)$_a$—, —O(CH$_2$)$_a$—, —(CH$_2$)$_a$O— or —O(CH$_2$)$_a$O—; and a is an integer of 1 to 20.

According to an embodiment of the present invention, a liquid crystal composition comprising at least two polymerizable compounds is provided, wherein at least one of the polymerizable compounds is the compound as described in any of the paragraphs [0009] to [0027].

According to an embodiment of the present invention, the liquid crystal composition as described in paragraph [0032] above, wherein all of the polymerizable compounds are the compounds as described in any of the paragraphs [0009] to [0027].

According to an embodiment of the present invention, the liquid crystal composition as described in paragraph [0028] above, comprises at least one of the compounds as described in any of the paragraphs [0009] to [0027] and at least one of polymerizable compounds other than the above compound.

According to an embodiment of the present invention, the liquid crystal composition as described in paragraph [0028], comprises at least one of the compounds as described in any of the paragraphs [0009] to [0027] and at least one polymerizable compound selected from the group of compounds each represented by formula (A), formula (B) and formula (C):

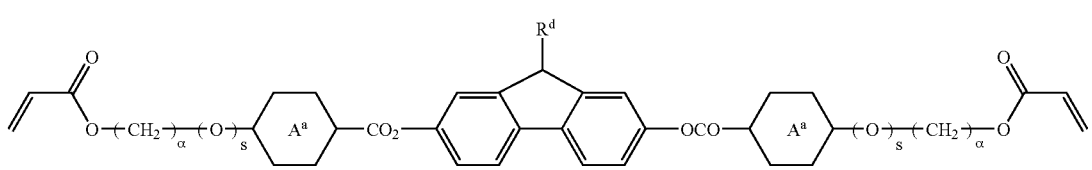

(A)

-continued

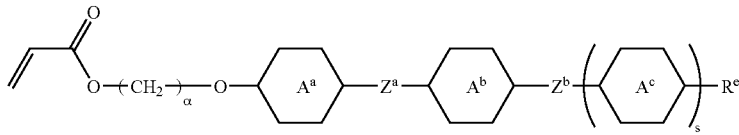
(B)

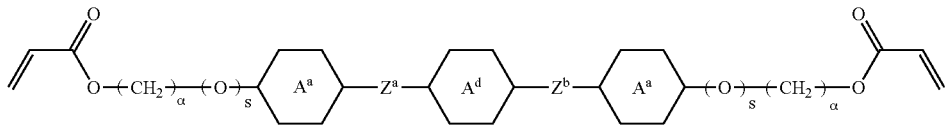
(C)

wherein $R^d$ is hydrogen, methyl, ethyl or propyl; $R^e$ is —CN, alkyl having a carbon number of 1 to 20 or alkoxy having a carbon number of 1 to 20; rings $A^a$, $A^b$ and $A^c$ are independently 1,4-cyclohexylene, 1,4-phenylene or 1,4-phenylene in which optional hydrogen is substituted with halogen; a ring $A^d$ is 1,4-phenylene or 2-methyl-1,4-phenylene; $Z^a$ and $Z^b$ are independently a single bond, —(CH$_2$)$_2$—, —CH═CH—COO—, —OCO—CH═CH—, —CH$_2$CH$_2$—COO—, —OCO—CH$_2$CH$_2$—, —COO— or —OCO—; α is an integer of 0 to 20; and s is 0 or 1.

According to an embodiment of the present invention, the liquid crystal composition as described in any of the paragraphs [0028] to [0031], further comprises an optically active compound.

According to an embodiment of the present invention, a polymer obtained by polymerizing at least one of the compounds as described in any of the paragraphs [0009] to [0027] is provided.

According to an embodiment of the present invention, a polymer obtained by homopolymerizing one of the compounds as described in any of the paragraphs [0009] to [0027] is provided.

According to an embodiment of the present invention, a polymer obtained by polymerizing the composition as described in any of the paragraphs [0028] to [0031].

According to an embodiment of the present invention, the polymer as described in the paragraph [0032], wherein a weight average molecular weight is in a range of about 500 to 100,000.

According to an embodiment of the present invention, the polymer as described in paragraph [0032], wherein a weight average molecular weight is in a range of about 1,000 to 50,000.

According to an embodiment of the present invention, the polymer as described in any of the paragraphs [0032] to [0034] is optically active.

According to an embodiment of the present invention, a film obtained from the polymer as described in any of the paragraphs [0032] to [0038] is provided.

According to an embodiment of the present invention, a molded article having an optical anisotropy comprising the polymer as described in any of the paragraphs [0032] to [0038] is provided.

According to an embodiment of the present invention, a phase contrast film comprising the polymer as described in any of the paragraphs [0032] to [0038] is provided.

According to an embodiment of the present invention, a liquid crystal aligning film comprising the polymer as described in any of the paragraphs [0032] to [0038] is provided.

According to an embodiment of the present invention, a reflection reducing film comprising the polymer as described in any of the paragraphs [0032] to [0038] is provided.

According to one embodiment of the present invention, a viewing angle compensation film comprising the polymer as described in any of the paragraphs [0032] to [0038] is provided.

According to an embodiment of the present invention, a polarizing element comprising the polymer as described in any of the paragraphs [0032] to [0038] is provided.

According to an embodiment of the present invention, a film having a selective reflection function comprising the polymer as described in any of the paragraphs [0032] to [0038] is provided.

According to an embodiment of the present invention, a liquid crystal display element comprising at least one selected from the group of the film as described in paragraph [0039] is provided. The molded article comprises an optical anisotropy as described in paragraph [0040], the phase contrast film as described in paragraph [0041], the liquid crystal aligning film as described in paragraph [0042], the reflection reducing film as described in paragraph [0043], the viewing angle compensation film as described in paragraph [0044], the polarizing element as described in paragraph [0045] and the film having a selective reflection function as described in paragraph [0046].

According to an embodiment of the present invention, a liquid crystal display element comprising the composition as described in any of the paragraphs [0028] to [0031].

In the above, the meaning of the phrase [in the above rings, optional —CH$_2$— may be substituted with —O—] shall be shown by one example. A part of groups in which optional —CH$_2$— is substituted with —O— in —C$_4$H$_8$— includes —C$_3$H$_6$O—, —CH$_2$—O—(CH$_2$)$_2$— and —CH$_2$—O—CH$_2$—O—. Thus, [optional] means [at least one selected without discrimination]. —CH$_2$—O—CH$_2$—O— in which oxygens are not adjacent is preferred to —CH$_2$—O—O—CH$_2$— in which oxygens are adjacent considering the stability of the compound.

In [in the above rings, optional —CH$_2$— may be substituted with —O—, and optional —CH═ may be substituted with —N═; in the above rings, optional hydrogen may be substituted with halogen, alkyl having a carbon number of 1 to 5 or halogenated alkyl having a carbon number of 1 to 5], [the above rings] in the latter include as well the rings in which optional —CH$_2$— is substituted with —O— and the rings in which optional —CH═ is substituted with —N═.

Preferably, $R^b$ is hydrogen, halogen, —CN, —CF$_3$, —CF$_2$H, —CFH$_2$, —OCF$_3$, —OCF$_2$H, alkyl having a carbon number of 1 to 20, alkoxy having a carbon number of 1 to 19 and alkenyl having a carbon number of 2 to 21.

Particularly preferred $R^b$ is —CN, alkyl having a carbon number of 1 to 20 and alkoxy having a carbon number of 1 to 19. In the above groups, linear alkyl and linear alkenyl are preferred to branched alkyl and branched alkenyl.

At least one of independent A is substituted 1,4-phenylene represented by formula (4-1) or (4-2), and preferred A other than it is 1,4-cyclohexylene, 1,4-phenylene, 2-fluoro-1,4-phenylene, 2,3-difluoro-1,4-phenylene, 2,5-difluoro-1,4-phenylene, 2,6-difluoro-1,4-phenylene, 1,3-dioxane-2,5-diyl, pyridine-2,5-diyl, 6-fluoropyridine-2,5-diyl, pyrimidine-2,5-diyl, pyridazine-3,6-diyl, naphthalene-2,6-diyl, tetrahydronaphthalene-2,6-diyl and fluorene-2,7-diyl. Particularly preferred A other than it is 1,4-cyclohexylene, 1,4-phenylene, 2-fluoro-1,4-phenylene, 2,3-difluoro-1,4-phenylene, 2,5-difluoro-1,4-phenylene and 2,6-difluoro-1,4-phenylene. Trans-1,4-cyclohexylene and trans-1,3-dioxane-2,5-diyl are preferred to cis-1,4-cycloherxylene and cis-1,3-dioxane-2,5-diyl. 2-Fluoro-1,4-phenylene is equivalent to 3-fluoro-1,4-phenylene in terms of a structure, and therefore the latter was not given as the example. The above rule shall be applied as well to the relations of 2,5-difluoro-1,4-phenylene, 3,6-difluoro-1,4-phenylene and the like.

In the compound having a large optical anisotropy, A other than substituted 1,4-phenylene represented by Formula (4-1) or (4-2) is preferably 1,4-phenylene in which optional hydrogen can be substituted with halogen, pyridine-2,5-diyl, pyrimidine-2,5-diyl, pyridazine-3,6-diyl, naphthalene-2,6-diyl, tetrahydronaphthalene-2,6-diyl or fluorene-2,7-diyl. In the compound having a small optical anisotropy, A other than it is preferably 1,4-cyclohexylene, 1,4-cyclohexenylene or 1,3-dioxane-2,5-diyl.

Preferably, Z is a single bond, —(CH$_2$)$_a$—, —O(CH$_2$)$_a$—, —(CH$_2$)$_a$O—, —O(CH$_2$)$_a$O—, —CH=CH—, —C≡C—, —COO—, —OCO—, —(CF$_2$)$_2$—, —CH=CH—COO—, —OCO—CH=CH—, —CH$_2$CH$_2$—COO—, —OCO—CH$_2$CH$_2$—, —C≡C—COO—, —OCO—C≡C—, —CH=CH—(CH$_2$)$_2$—, —(CH$_2$)$_2$—CH=CH—, —CF=CF—, —C≡C—HC=CH—, —CH=CH—C≡C—, —OCF$_2$— or —CF$_2$O—, and a is an integer of 1 to 20.

More preferably, Z is a single bond, —(CH$_2$)$_2$—, —(CH$_2$)$_4$—, —OCH$_2$—, —O(CH$_2$)$_3$—, —CH$_2$O—, —(CH$_2$)$_3$O—, —O(CH$_2$)$_2$O—, —CH=CH—, —C≡C—, —COO—, —OCO—, —(CF$_2$)$_2$—, —CF=CF—, —CH=CH—COO—, —OCO—CH=CH—, —CH$_2$CH$_2$—COO—, —OCO—CH$_2$CH$_2$—, —OCF$_2$— or —CF$_2$O—. Particularly preferred Z is a single bond, —(CH$_2$)$_2$—, —OCH$_2$—, —CH$_2$O—, —O(CH$_2$)$_2$O—, —CH=CH—, —(CH$_2$)$_4$—, —CF=CF—, —CH=CH—COO—, —OCO—CH=CH—, —CH$_2$CH$_2$—COO—, —OCO—CH$_2$CH$_2$—, —OCF$_2$— or —CF$_2$O—. In the compound having a small viscosity, Z is preferably a single bond, —(CH$_2$)$_2$—, —CH=CH—, —CF=CF—, —OCF$_2$— or —CF$_2$O—. In the above bonding groups, a trans double bond is preferred to a cis double bond.

In Z adjacent to $R^a$ or $R^b$, the alkylene preferably comprises a carbon number of 1 to 9, more preferably a carbon number of 3 to 7 and particularly a carbon number of 2 to 6. The preferred examples of the alkylene are (Z$^1$-1) to (Z$^1$-7) and (Z$^5$-1) to (Z$^5$-7).

$$—(CH_2)_r— \quad (Z^1\text{-}1)$$

$$—(CH_2)_r—O— \quad (Z^1\text{-}2)$$

$$—(CH_2)_r—S— \quad (Z^1\text{-}3)$$

$$—(CH_2)_r—OCO— \quad (Z^1\text{-}4)$$

$$—(CH_2)_r—COO— \quad (Z^1\text{-}5)$$

$$—(CH_2)_s—O—(CH_2)_t— \quad (Z^1\text{-}6)$$

$$—(CH_2)_s—O—(CH_2)_t—O— \quad (Z^1\text{-}7)$$

$$—(CH_2)_u— \quad (Z^5\text{-}1)$$

$$—O—(CH_2)_u— \quad (Z^5\text{-}2)$$

$$—S—(CH_2)_u— \quad (Z^5\text{-}3)$$

$$—CO_2—(CH_2)_u— \quad (Z^5\text{-}4)$$

$$—OCO—(CH_2)_u— \quad (Z^5\text{-}5)$$

$$—(CH_2)_v—O—(CH_2)_w— \quad (Z^5\text{-}6)$$

$$—O—(CH_2)_v—O—(CH_2)_w— \quad (Z^5\text{-}7)$$

In (Z$^1$-1) to (Z$^1$-7), r is an integer of 2 to 6, and s and t are independently 1 or 2. In (Z$^5$-1) to (Z$^5$-7), u is an integer of 2 to 6, and v and w are independently 1 or 2. Provided that s+t is ≦8 and v+w is ≦8.

Preferably, $R^c$ is hydrogen, halogen or methyl. More preferably $R^c$ is hydrogen, fluorine or methyl.

The term m is an integer of 1 to 6. Preferably, m is an integer of 2 to 4. When m is 2, the compound of the present invention is a bicyclic compound having two rings such as a six-membered ring. When m is 3 or 4, it is a tricyclic or tetracyclic compound respectively. When m is 1, two Z can be the same or different. When m is 2, three Z (or two A) can be the same or different. When m is 3 to 6, the same shall apply. In the case of the groups represented by $R^a$ and $R^c$, the same shall apply. When a temperature range of the liquid crystal phase is set at a lower temperature side, the bicyclic compound can be selected, and when the temperature range is set at a relatively higher temperature side, the tricyclic or tetracyclic compound can be selected. When a temperature range of the liquid crystal phase is set at a higher temperature side, the compound in which m is 4, 5 or 6 can be selected.

The compound, according to an embodiment of the present invention, can be used for a polymerizable liquid crystalline compound having a broad temperature range in a liquid crystal phase, an excellent compatibility with other compounds and required characteristics such as an optical anisotropy and a liquid crystal composition comprising the above compound. The polymer of the present invention is excellent and has many excellent characteristics such as transparency, mechanical strength, coating property, solubility, crystallinity, shrinking property, water permeability, water absorbency, melting point, glass transition point, clearing point and chemical resistance, and a molded article having an optical anisotropy can be formed from the above polymer. Further, a liquid crystal display element comprising the above polymer can be produced. The terms in the present specification are used in the following manners. The term 「liquid crystalline compound」 is used as a general term for a compound having a liquid crystal phase and a compound which does not have a liquid crystal phase but is useful as a component for a liquid crystal composition. In this technical field, the term of polymerizability means a capability of carrying out polymerization by means of such as light, heat and a catalyst to provide a polymer. The terms of the liquid crystalline compound and the liquid crystal composition shall be shown by the compound and the composition respectively. The compounds represented by formula (1) and formula (2) shall be shown by the compound (1) and the compound (2) respectively. The polymers obtained from the compound (1) and the compound (2) shall be shown by the polymer (1) and the polymer (2) respectively. Acrylate and methacrylate shall be shown by (meth) acrylate.

The compound (1), the compound (2) and the polymer thereof have the following characteristics. (1) The compound (1) and the compound (2) have a single-membered ring to a six-membered ring and have a polymerizability and a liquid crystallinity. (2) The compound (1) and the compound (2) are physically and chemically very stable in conditions usually used and have a good compatibility with other compounds.

The physical property values such as a large dielectric anisotropy, a small dielectric anisotropy, a large optical anisotropy, a small optical anisotropy and a small viscosity can be controlled by suitably selecting rings, bonding groups and side chains each constituting the compound (1) and the compound (2).

The polymer is provided with characteristics such as transparency, mechanical strength, coating property, solubility, crystallinity, shrinking property, water permeability, water absorbency, melting point, glass transition point, clearing point and chemical resistance which are optimized by suitably selecting the structures of the compound (1) and the compound (2). These characteristics can be determined according to methods defined in JIS and the like.

The compound (1) and the compound (2) have the following physical properties.

The bicyclic and tricyclic compounds (1) and (2) have a low viscosity. The tricyclic or more compounds (1) and (2) have a high clearing point (a phase transition temperature between a liquid crystal phase and an isotropic liquid). Even when the compound (1) and the compound (2) are tricyclic or more compounds, the compound (1) and the compound (2) will still have a good wetting property so that they can be dissolved easily in a solvent, and therefore they are advantageous in terms of preparing the composition, coating on a substrate and forming a thin film. The tricyclic or more compounds (1) and (2) have a very broad temperature range in a liquid crystal phase. In particular, the tricyclic or more compounds (1) and (2) have a liquid crystal phase in a high temperature range, and therefore a liquid crystal composition in which even a low temperature range is covered with a temperature range of a liquid crystal phase can be prepared by mixing the bicyclic compound (1) or (2).

The compounds (1) and (2) having at least two cyclohexane rings have a high clearing point, a small optical anisotropy and a small viscosity. The compounds (1) and (2) having at least two benzene rings have a relatively large optical anisotropy and a large liquid crystal orientational order parameter.

The compounds (1) and (2) having at least three benzene rings have a particularly large optical anisotropy, a wide temperature range in a liquid crystal phase and a high chemical stability.

The compounds (1) and (2) in which a 2-position or a 3-position and a 5-position are substituted with fluorines are chemically stable and have a particularly large dielectric anisotropy. The compounds (1) and (2) in which A is 2,3-difluoro-1,4-phenylene are chemically stable and have a negative dielectric constant.

The compounds (1) and (2) in which $R^c$ is hydrogen, halogen or alkyl having a carbon number of 1 to 5 have a large polymerizability and therefore are suited. The compounds (1) and (2) in which $R^c$ is hydrogen or fluorine have the largest polymerizability. The compounds (1) and (2) in which $R^c$ is alkyl having a carbon number of 1 to 5 are reduced in a polymerizability as the carbon number is increased. Accordingly, when $R^c$ is alkyl, it is preferably a methyl group.

The compounds (1) and (2) in which all of Z are single bonds have a particularly high clearing point. The compounds (1) and (2) in which a bonding group has a double bond have a broad temperature range in a liquid crystal phase. The compounds (1) and (2) in which a bonding group has a triple bond will particularly have a large optical anisotropy.

Accordingly, the compounds (1) and (2) with desired physical properties can be obtained by suitably selecting the rings, the side chains and the bonding groups. Even if atoms constituting the compounds (1) and (2) are isotopes, they show the same characteristics and can be preferably used.

In the compounds (1) and (2), the preferred examples of the central group [-Z-(A-Z)-] in the compounds are central groups (1-1) to (1-78). In these compounds, Z means the same as in formulae (1) and (2), and plural Z may be the same or different. The ring C (2) represents any of substituted 1,4-phenylenes represented by formula (4-1) or (4-2). In the central groups (1-1) to (1-78), 1,4-cyclohexylene, 1,4-phenylene, 1,4-cyclohexenylene, pyridine-2,5-diyl, naphthalene-2,6-diyl, tetrahydronaphthalene-2,6-diyl and fluorene-2,7-diyl can be substituted with fluorine or methyl as shown in the following formulas.

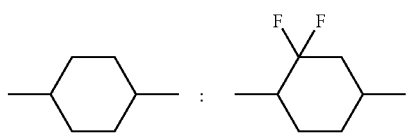

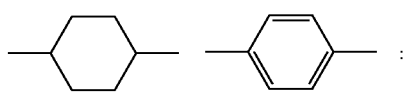

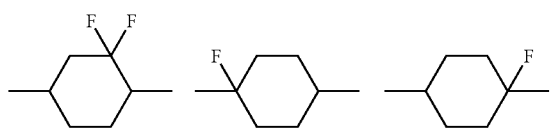

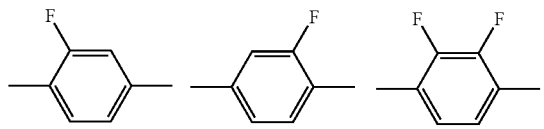

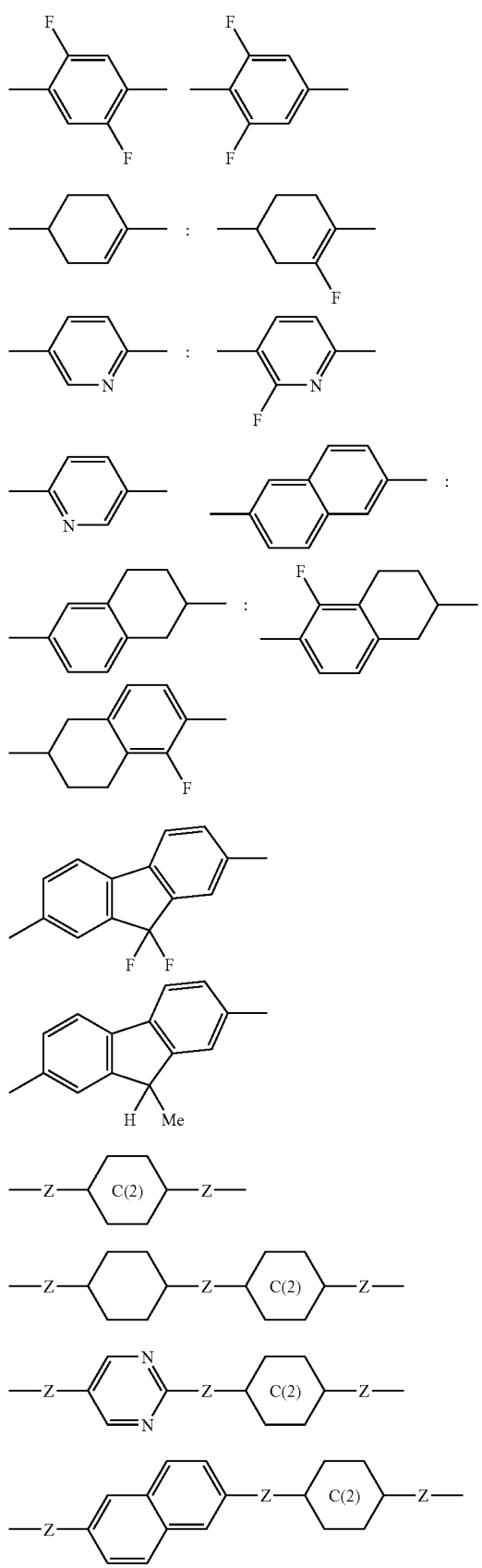

-continued
(1-9) 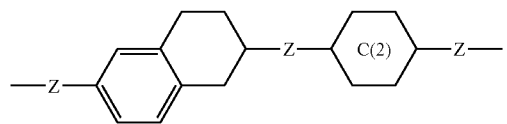
(1-10) 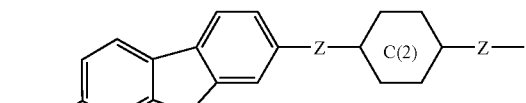
(1-11) 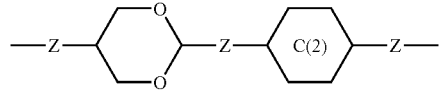
(1-12) 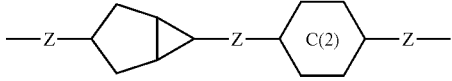
(1-13) 
(1-14) 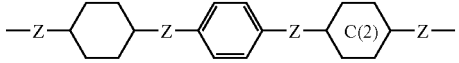
(1-15) 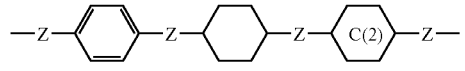
(1-16) 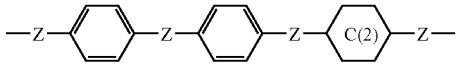
(1-17) 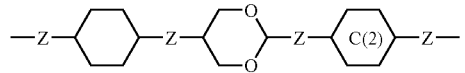
(1-18) 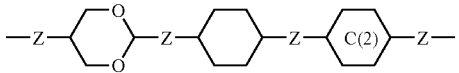
(1-19) 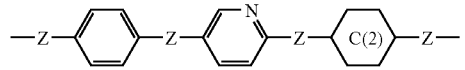
(1-20) 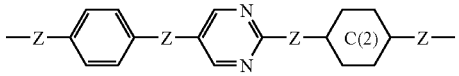
(1-21) 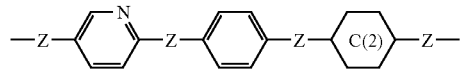
(1-22) 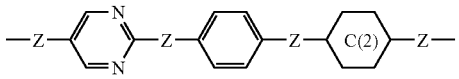
(1-23) 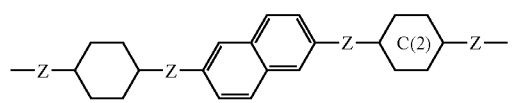
(1-24) 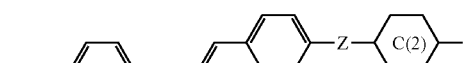
(1-25) 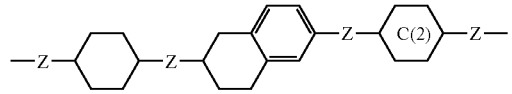
(1-26) 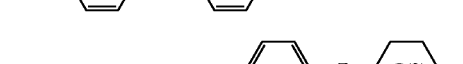
(1-27) 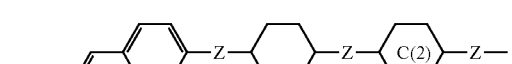
(1-28) 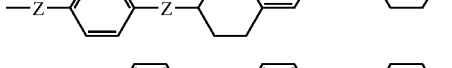
(1-29) 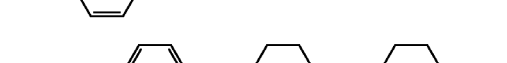
(1-30) 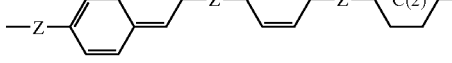
(1-31) 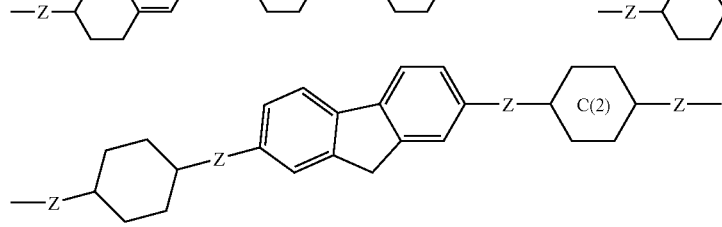
(1-32) 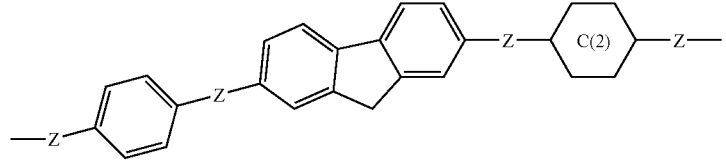
(1-33) 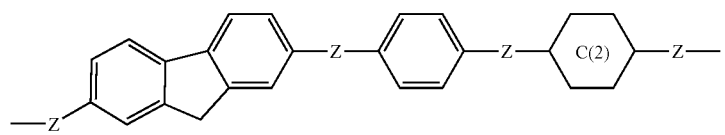

-continued
(1-34)
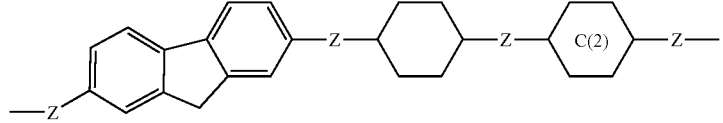
(1-35)
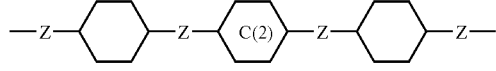
(1-36)
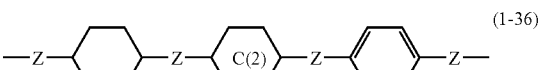
(1-37)
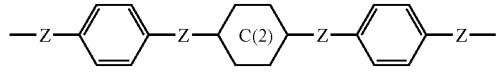
(1-38)
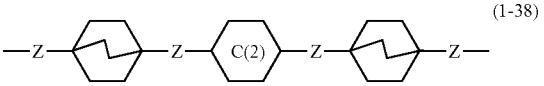
(1-39)
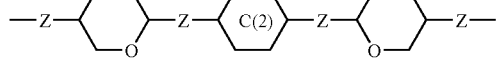
(1-40)
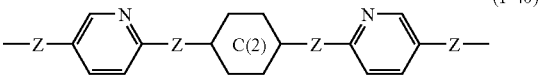
(1-41)
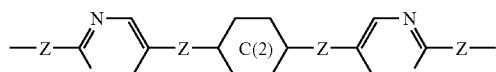
(1-42)
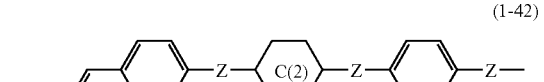
(1-43)
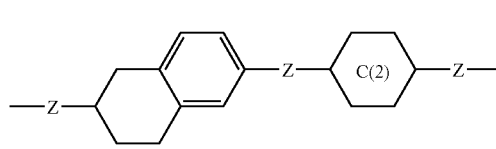
(1-44)
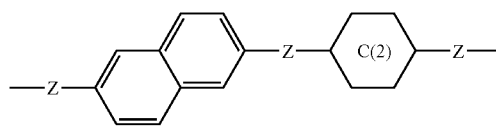
(1-45)
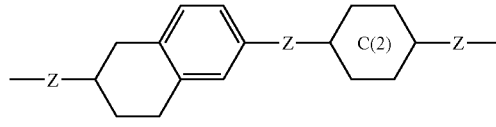
(1-46)
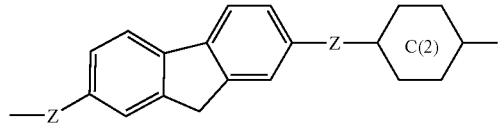
(1-47)
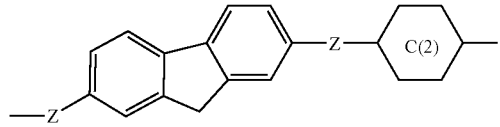
(1-48)
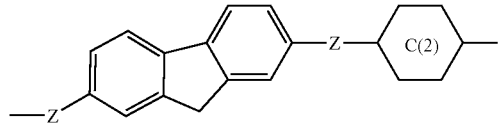
(1-49)
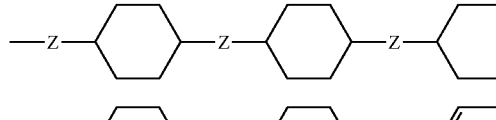
(1-50)
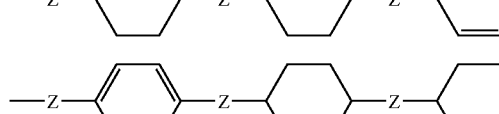
(1-51)

-continued
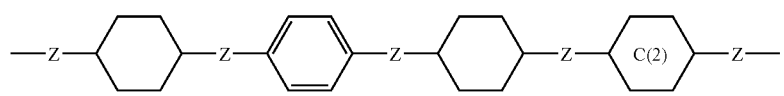
(1-52)
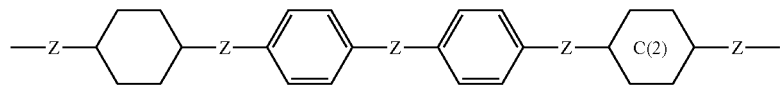
(1-53)
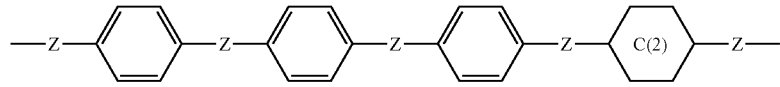
(1-54)
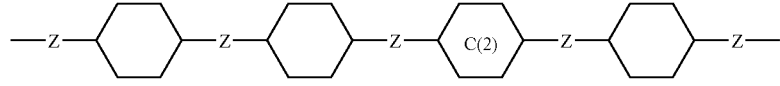
(1-55)
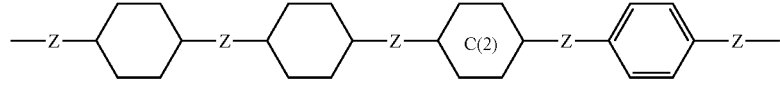
(1-56)
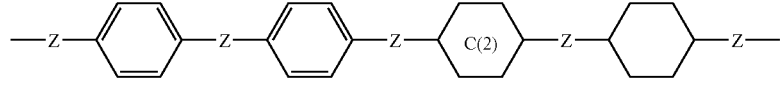
(1-57)
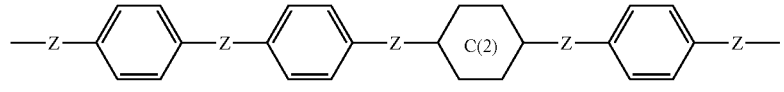
(1-58)
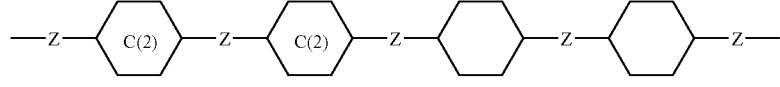
(1-59)
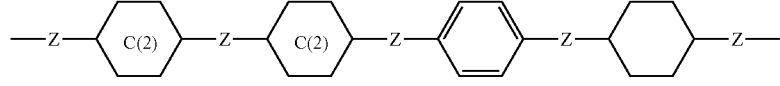
(1-60)
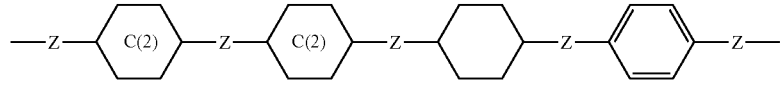
(1-61)
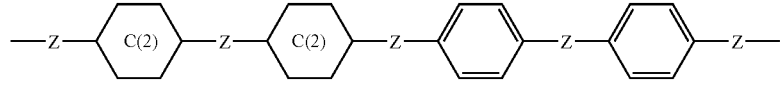
(1-62)
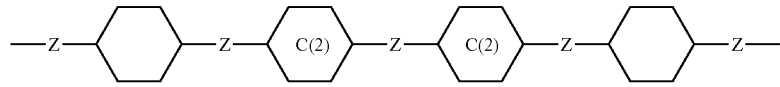
(1-63)
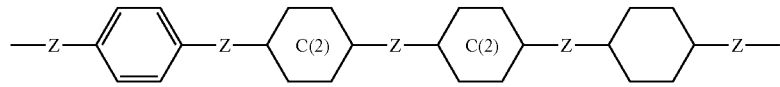
(1-64)
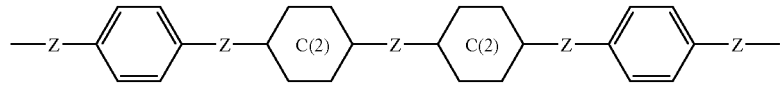
(1-65)
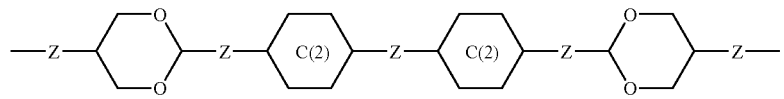
(1-66)
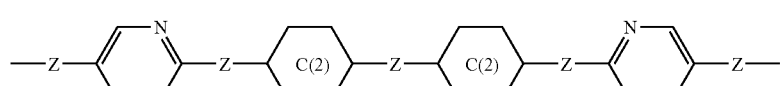
(1-67)

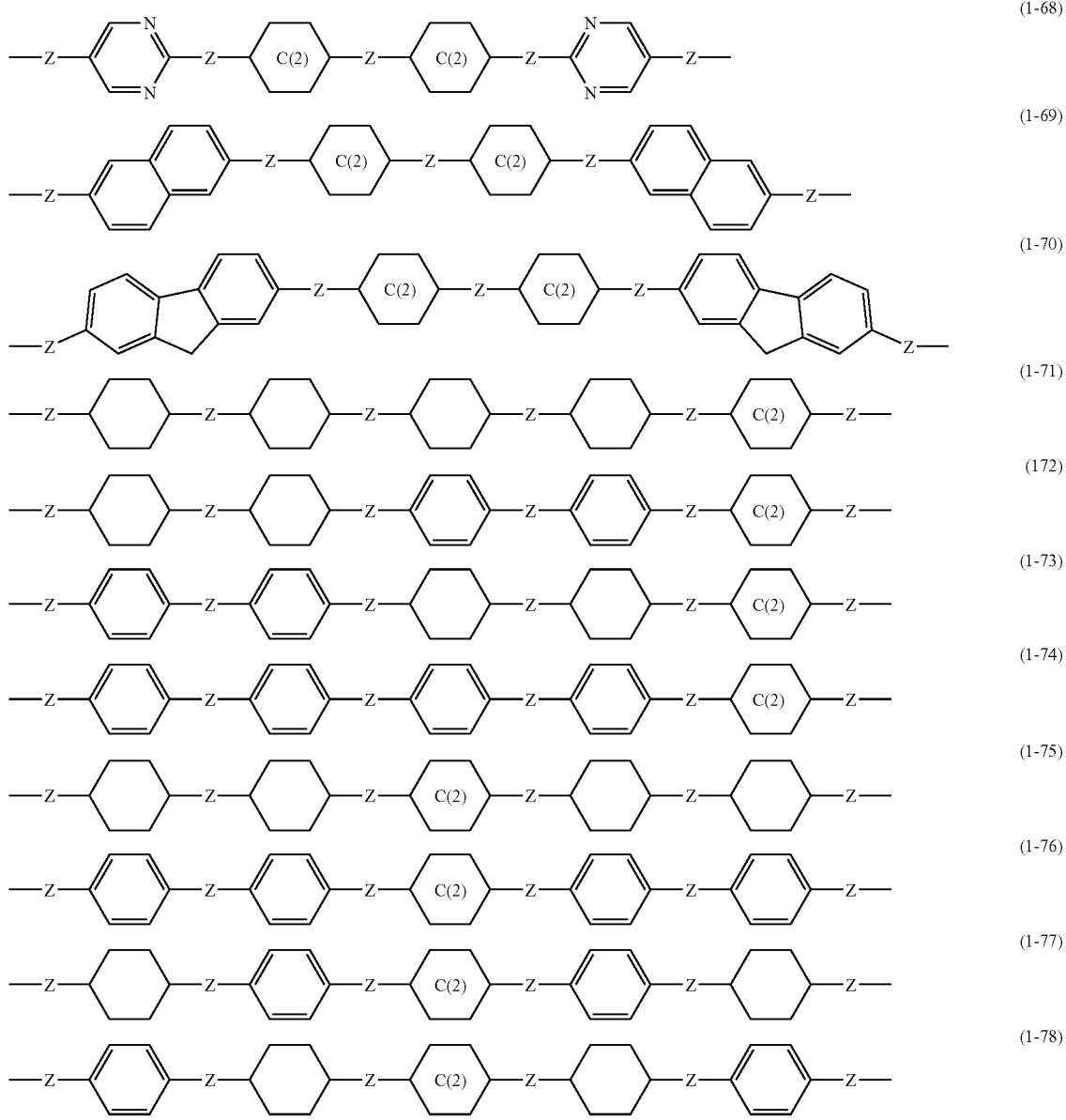

More preferred examples of the compounds (1) and (2) are compounds having the central groups (1-2) to (1-3), the central groups (1-13) to (1-16), the central groups (1-23) to (1-37), the central group (1-44), the central group (1-45), the central group (1-48), the central group (1-63), the central group (1-65), the central group (1-69) or the central group (1-70).

Further, the manufacturing process of compounds (1) and (2) is described as follows. The compounds (1) and (2) can be manufactured by suitably combining organic synthetic processes described in Houben Wyle, Methoden Der Organischen Chemie, George Thieme Verlag, Stuttgart, Organic Reactions, John Wily & Sons Inc., Organic Syntheses, John Wily & Sons Inc., Comprehensive Organic Synthesis, Pergamon Press, New Experimental Chemical Course (Maruzen) and the like.

The ring structure represented by formula (4-1) can be constituted by the following method. A compound (a) is reacted with 1,1,1,4,4,4-hexafluoro-2-butyne (b) by Diels-Alder reaction to prepare a compound (c), and then ring opening and deblocking are carried out on an acidic condition, whereby a compound (4-1-a) can be produced. Then, the compound (4-1-a) is reacted with halogen (chlorine, bromine and iodine) in the presence of triphenylphosphine, whereby a compound (4-1-b) in which a hydroxyl group is converted to halogen can be produced. When conversion to the compound (4-1-b) is difficult, tosylate and triflate can be used as an equivalent of the compound (4-1-b). The compound (a) can be synthesized by a publicly known method (Gui-Ding Zhu, et al, Organic Letters, 2 (21), 3345 [2000]).

The ring structure represented by formula (4-2) can be constituted by the following method. A compound (d) is reacted with n-butyllithium and then reacted with triisopropyl borate, followed by oxidizing with hydrogen peroxide, whereby a compound (e) is obtained. The compound (e) is reacted with dihydropyran in the presence of pyridinium p-toluenesulfonate to obtain a compound (f). This is reacted with n-butyllithium and then reacted with triisopropyl borate, followed by oxidizing with hydrogen peroxide, whereby a compound (4-2-a) can be produced. Then, the compound (4-2-a) is reacted with halogen (chlorine, bromine and iodine) in the presence of triphenylphosphine, whereby a compound (4-2-b) in which a hydroxyl group is converted to halogen can be produced. Similarly as described above, tosylate and triflate can be used as an equivalent of the compound (4-2-b).

The principal skeleton structures (liquid crystal residues) of the compounds (1) and (2) can be constituted by methods shown below or suitably combining them. That is, first, the scheme, using one example method of forming the bonding group Z is described, and then a production method in the scheme shall be described. In the above scheme, $MSG^1$ or $MSG^2$ is a monovalent organic group having at least one ring. Plural $MSG^1$ (or $MSG^2$) used in the scheme may be the same or different. Compounds (1A) to (1K) correspond to the compounds (1) and (2).

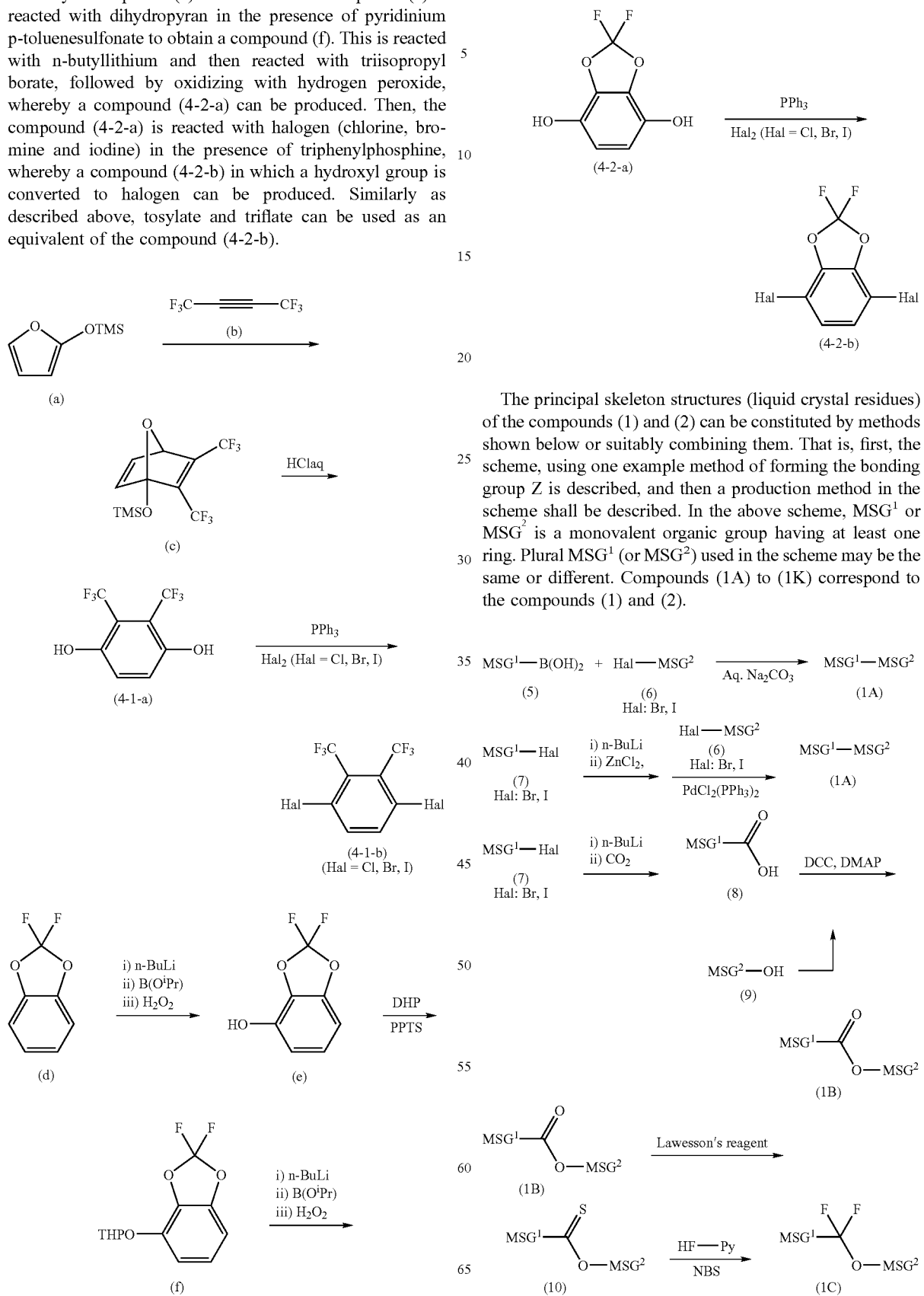

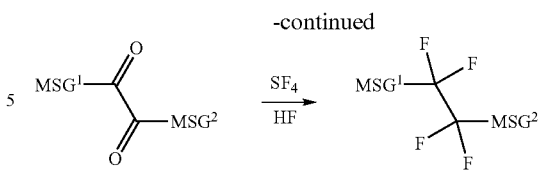

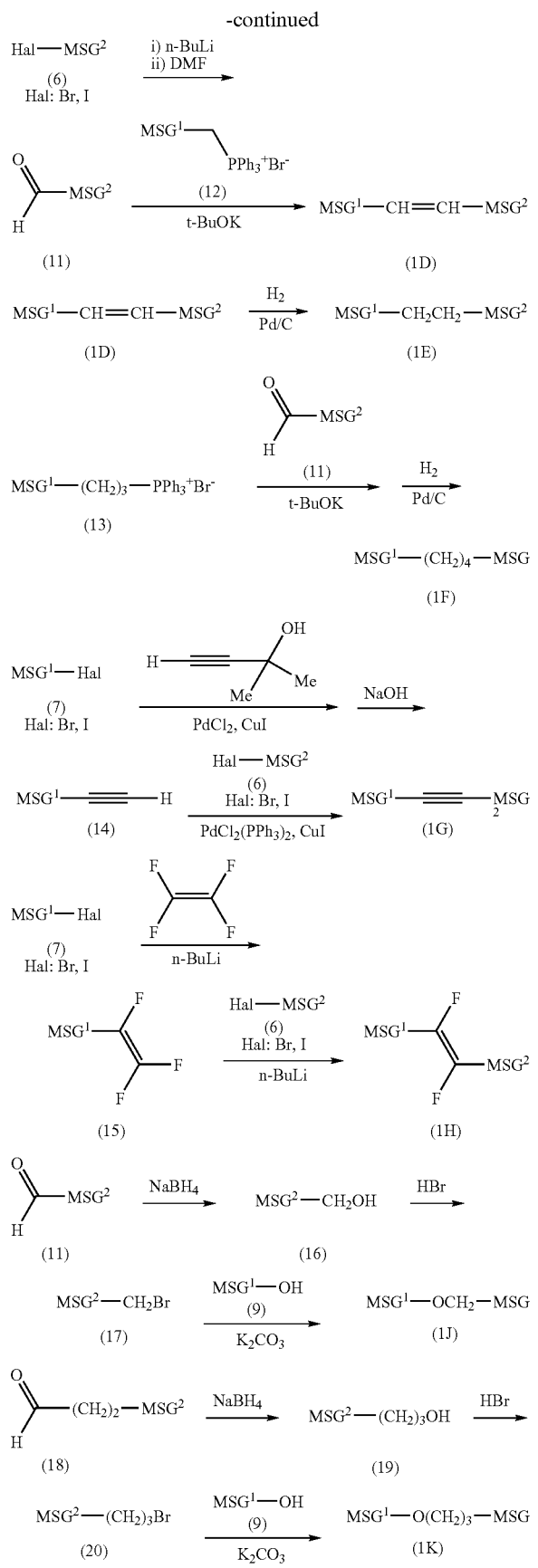

(I) Formation of Single Bond

A boric acid derivative (5) is reacted with a halide (6) synthesized by a well known method in the presence of a carbonate aqueous solution and a catalyst such as tetrakis (triphenylphosphine)-palladium to synthesize a compound (1A). The above compound (1A) can also be synthesized by reacting a compound (7) synthesized by a well known method with n-butyllithium, then reacting with zinc chloride and reacting with the compound (6) in the presence of a catalyst such as dichlorobis(triphenylphosphine)-palladium. The boric acid derivative (5) can be produced by deriving the compound (7) into a Grignard reagent or a lithium reagent and then reacting it with trialkyl borate.

(II) Formation of —COO— and —OCO—

The compound (7) is reacted with n-butyllithium and subsequently with carbon dioxide to obtain a carboxylic acid (8). The carboxylic acid (8) and a phenol (9) synthesized by a publicly known method are dehydrated in the presence of DCC (1,3-dicyclohexylcarbodiimide) and DMAP (4-dimethylaminopyridine) to synthesize a compound (1B) having —COO—. A compound having —OCO— can be synthesized as well by the above method.

(III) Formation of —CF$_2$O— and —OCF$_2$—

A compound (1B) is treated with a sulfurizing agent such as a Lawson reagent to obtain a compound (10). The compound (10) is fluorinated with a hydrogen fluoride-pyridine complex and NBS (N-bromosuccinimide) to synthesize a compound (1C) having —CF$_2$O—. Refer to M. Kuroboshi et al., Chem. Lett., 1992, 827. The compound (1C) can also be synthesized by fluorinating the compound (10) with (diethylamino)sulfur trifluoride. Refer to William H. Bunnelle et al., J. Org. Chem. 1990, 55, 768. A compound having —OCF$_2$— can be synthesized as well by the above method.

(IV) Formation of —CH═CH—

The compound (6) is treated with n-butyllithium and then reacted with formamide such as N,N-dimethylforamide to obtain an aldehyde (11). Phosphorus ylied produced by treating a phosphonium salt (12) synthesized by a well known method using a base such as potassium t-butoxide is reacted with the aldehyde (11) to synthesize a compound (1D). The cis compound is formed depending on the reaction conditions, and therefore the cis compound is isomerized, if necessary, to the trans compound.

(V) Formation of —(CH$_2$)$_2$—

The compound (1D) is hydrogenated in the presence of a catalyst such as palladium carbon to synthesize a compound (1E).

(VI) Formation of —(CH$_2$)$_4$—

A phosphonium salt (13) is used in place of the phosphonium salt (12) to obtain a compound having —(CH$_2$)$_2$—CH═CH— according to the method of the item (IV). This compound is catalytically hydrogenated to synthesize a compound (1F).

(VII) Formation of —C≡C—

The compound (7) is reacted with 2-methyl-3-butyne-2-ol in the presence of a catalyst of dichloropalladium and copper halide and then deblocked on a base condition to obtain a compound (14). The compound (14) is reacted with the compound (6) in the presence of a catalyst of dichlorobis(triphenylphosphine)palladium and copper halide to synthesize a compound (1G).

(VIII) Formation of —CF═CF—

The compound (7) is treated with n-butyllithium and then reacted with tetrafluoroethylene to obtain a compound (15). The compound (15) is treated with n-butyllithium and then reacted with the compound (6) to synthesize a compound (1H).

(IX) Formation of —CH$_2$O— or —OCH$_2$—

The compound (11) is reduced with a reducing agent such as sodium boron hydride to obtain a compound (16). This compound is halogenated with hydrobromic acid and the like to obtain a compound (17). The compound (17) is reacted with the compound (9) in the presence of potassium carbonate and the like to synthesize a compound (1J).

(X) Formation of —(CH$_2$)$_3$O— or —O(CH$_2$)$_3$—

A compound (18) is used in place of the compound (11) to synthesize a compound (1K) according to the method of the item (IX).

(XI) Formation of —(CF$_2$)$_2$—

A diketone (21) is fluorinated with sulfur tetrafluoride in the presence of a hydrogen fluoride catalyst according to a method described in J. Am. Chem. Soc., 2001, 123, 5414.

The first composition of the present invention is a composition comprising at least one of the compound (1) or (2) and a liquid crystalline compound, which is not polymerizable. In the following explanations, [a liquid crystalline compound which is not polymerizable] shall be described as [a non-polymerizable liquid crystal]. The compounds (1) and (2) have high characteristics for a liquid crystal such as an appropriate temperature range of a liquid crystal phase and a suitable compatibility with other liquid crystalline compounds. Accordingly, the composition comprising the compound (1) or (2) and the non-polymerizable liquid crystal can be used as a composition sealed in when producing a liquid crystal display element. The compound (1) or (2) contained in the composition is polymerized by subjecting the above composition to suited conditions, whereby a network structure is formed by polymerization. Accordingly, the above first composition can be used as a material for PDLC and PNLC.

When the compound (1) or (2) is optically active, it is preferable to control a spiral pitch of the composition. The above liquid crystal composition can be used as a raw material for obtaining the polymer of the present invention. In such case, it can be turned into a complex of the polymer of the present invention and the liquid crystalline compound. The examples of the non-polymerizable liquid crystal are liquid crystalline compounds described in a liquid crystal compound data base LiqCryst (registered trade mark) (LCI Publisher GmbH (Hamburg, Germany)) and the like. Further, the above liquid crystal composition may contain additives such as a dichroic pigment.

The second composition, according to an embodiment of the present invention, is a composition comprising at least one of the compounds (1) and (2) and a polymerizable compound other than the compound (1) or (2). In the following descriptions, [a polymerizable compound other than the compound (1) or (2)] shall be called [the other polymerizable compound], and [a composition comprising at least one of the compound (1) or (2) and the other polymerizable compound] shall be called [a polymerizable composition]. The polymerizable composition has preferably a liquid crystal phase but may not have a liquid crystal phase depending on purposes. The above polymerizable composition is described as polymer is described as follows.

The polymer, according to an embodiment of the present invention, is a polymer obtained by polymerizing at least one of the compound (1) or (2). The polymer (1) and the polymer (2) can be produced respectively by polymerizing the compound (1) and the compound (2). The first polymer, according to an embodiment of the present invention, is a homopolymer obtained by homopolymerizing one of the compound (1) or (2). The second polymer, according to an embodiment of the present invention, is a copolymer obtained by copolymerizing at least two of the compound (1) or (2). The third polymer, according to an embodiment of the present invention, is a copolymer obtained by copolymerizing a composition comprising at least one of the compound (1) or (2) and the other polymerizable composition, that is, a copolymer obtained by copolymerizing the polymerizable composition. Any of the above polymers has constitutional units (3-1-p) to (3-5-p) originating in the polymerizable groups (3-1) to (3-5).

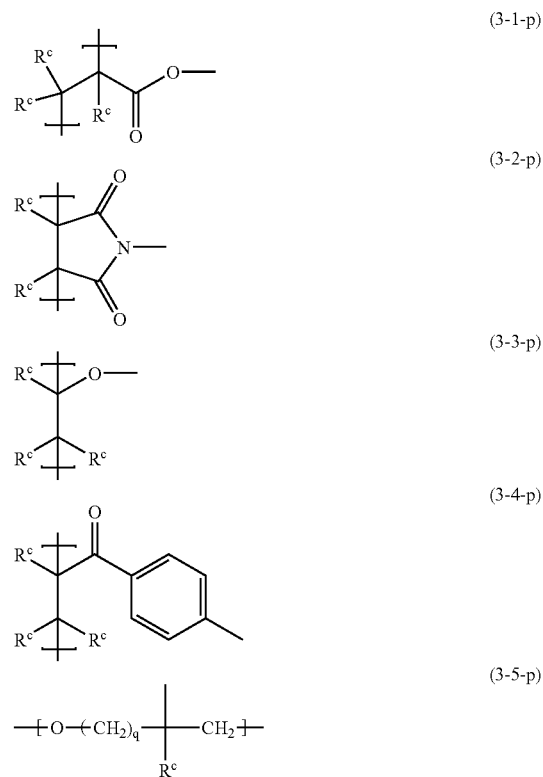

The compound (1) having the polymerizable group (3-1) has a high radical polymerizability. It can be polymerized in the presence of a radical polymerization initiator such as azobisisobutyronitrile. The compound (1) having the constitutional unit (3-1-p) shows a high transparency.

The compound (1) having the polymerizable group (3-2) and the compound (1) having the polymerizable group (3-4) have a high radical polymerizability. The above compounds (1) have a particularly high radical polymerizability by a UV ray. When producing the polymer (1) having the constitutional unit (3-2-p) or the constitutional unit (3-4-p) by photopolymerization, it has a large mechanical strength and a high surface hardness.

The compound (1) having the polymerizable group (3-3) and the compound (1) having the polymerizable group (3-5) have a high cationic polymerizability. They can be polymerized even in the presence of a substance inhibiting polymerization reaction (for example, oxygen). The polymer (1) having the constitutional unit (3-5-p) is an excellent adhesive property with various substrate materials. It has a small shrinkage factor and therefore can be suitably used for making various optical functional thin films.

The compound (1) has one polymerizable group. The compound (2) has two polymerizable groups. The compound (2) has the substantially same fundamental characteristics as those of the compound (1) having the corresponding polymerizable group. In addition thereto, the compound (2) has a higher polymerizability as compared with that of the compound (1). The compound (2) has a large polymerizing speed and is completed in polymerization in shorter time. The compound (2) provides a polymer having a large polymerization degree. The resulting polymer (2) has high heat resistance, low water permeability, low water absorbency and low gas permeability and excellent mechanical strength (particularly a Young's modulus, a tensile strength, a tear strength, a flexural strength, a flexural elastic modulus, an impact strength and the like), a hardness, a chemical stability (a chemical resistance) and the like.

A copolymer is obtained by polymerizing at least two of the compound (1) or (2) or the polymerizable composition. The polymer (1) or the polymer (2) having the aimed characteristics can be produced by suitably selecting at least two of the compound (1) or (2) or the composition of the polymerizable composition. For example, the polymer (2), which has an excellent physical properties such as mechanical strength, surface hardness, heat resistance and transparency, is obtained by polymerizing the compound (2) having the polymerizable group (3-1) with the compound (2) having the polymerizable group (3-2). Accordingly, a copolymer having the characteristics of the respective polymers (2) can be obtained by homopolymerizing respectively the compound (2) having the polymerizable group (3-1) and the compound (2) having the polymerizable group (3-2).

A thermoplastic resin can be produced by using the compound (1) or (2). Preferably, the thermoplastic resin has a weight average molecular weight in a range of about 500 to 100,000, more preferably in a range of about 1,000 to 50,000 and more preferably in a range of about 2,000 to 10,000. When producing the thermoplastic resin, the polymerization degree need not be increased or the weight average molecular weight need be controlled in the range described above. The compound (1) having one polymerizable group is advantageous.

According to an embodiment, a thermosetting resin can be produced by using the compound of the present invention. The polymer (1) and the polymer (2), each having a thermosetting property, have a three-dimensional cross-linking structure and thus rendered insoluble and infusible, and therefore it is impossible to measure the molecular weight. When producing the thermosetting resin, the compound (2) having two polymerizable groups having a large polymerizing speed is advantageous.

The other polymerizable compound contained in the polymerizable composition is used in order to optimize the thin film-forming property, the mechanical strength and the thermal strength. However, the scope of the present invention is not limited as such as long as it can be copolymerized with the compound (1) or (2), and it may not have a liquid crystallinity. The polymerizable compound having no liquid crystallinity includes vinyl derivatives, styrene derivatives (meth)acrylic acid derivatives, sorbic acid derivatives, fumaric acid derivatives, itaconic acid derivatives and the like.

The preferred vinyl derivatives include vinyl chloride, vinyl fluoride, vinyl acetate, vinyl pivalate, vinyl 2,2-dimethylbutanoate, vinyl 2,2-dimethylpentanoate, vinyl 2-ethyl-2-methylbutanoate, N-vinylacetamide, vinyl p-t-butylbenzoate, vinyl N,N-dimethylaminobenzoate, vinyl benzoate, ethyl vinyl ether, hydroxybutyl monovinyl ether, t-amyl vinyl ether, cyclohexanedimethanolmethyl vinyl ether, α, β-vinylnaphthalene, methyl vinyl ketone, isobutyl vinyl ketone and the like. The preferred styrene derivatives include styrene, o-chlorostyrene, m-chlorostyrene, p-chlorostyrene, o-chloromethylstyrene, m-chloromethylstyrene, p-chloromethylstyrene, α-methylstyrene and the like.

The preferred (meth)acrylic acid derivatives include methyl (meth)acrylate, ethyl (meth)acrylate, butyl (meth)acrylate, 2-ethylhexyl (meth)acrylate, phenyl (meth)acrylate, 1,4-butanediol diacrylate, 1,6-hexanediol diacrylate, 1,9-nonanediol diacrylate, neopentyl glycol diacrylate, triethylene glycol diacrylate, dipropylene glycol diacrylate, tripropylene glycol diacrylate, tetraethylene glycol diacrylate, trimethylolpropane triacrylate, trimethylol EO-added triacrylate, pentaerythritol triacrylate, trisacryloyloxyethyl phosphate, bisphenol A EO-added diacrylate, bisphenol A glycidyl diacrylate (brand name: Biscoat 700, manufactured by Osaka Yuki Kagaku Co., Ltd.), polyethylene glycol diacrylate dimethyl itaconate and the like.

The preferred sorbic acid derivatives include sodium sorbate, potassium sorbate, lithium sorbate, 1-naphthylmethylammonium sorbate, benzylammonium sorbate, dodecylammonium sorbate, octadecylammonium sorbate, methyl sorbate, ethyl sorbate, propyl sorbate, isopropyl sorbate, butyl sorbate, t-butyl sorbate, hexyl sorbate, octyl sorbate, octadecyl sorbate, cyclopentyl sorbate, cyclohexyl sorbate, vinyl sorbate, allyl sorbate, propargyl sorbate and the like.

The preferred fumaric acid derivatives include dimethyl fumarate, diethyl fumarate, diisopropyl fumarate, dibutyl fumarate, dicyclopentyl fumarate, dicyclohexyl fumarate and the like. The preferred itaconic acid derivatives include diethyl itaconate, dibutyl itaconate, diisopropyl itaconate and the like. In addition thereto, butadiene, isoprene and the like can be used as well. Polymerizable compounds showing no liquid crystallinity shall not be restricted by the examples described above.

Capable of being given as the other polymerizable compound having a liquid crystallinity are compounds which are liquid crystalline compounds having such as an acryloyloxy group, a methacryloyloxy group, a fumaroyloxy group, a maleimidyl group, an oxirane ring or an oxetane ring as a functional group and which are not the compound (1) or (2). Among them, the liquid crystalline acrylic acid derivatives provide polymers, which are transparent and have a large mechanical strength, are preferred. The above compounds can be also be used in order to control a temperature range of a liquid crystal phase in the polymerizable composition.

Among the other polymerizable compounds described above having a liquid crystallinity, the compounds excluding the liquid crystalline acrylic acid derivatives require longer time to polymerize compared with those of the acrylic acid derivatives in a certain case. However, the above polymerizable compounds inhibit the formation of by-products and enhance mechanical strength and thermal stability of the polymer, and therefore they are useful. In order to maintain the characteristics of the polymer of the present invention and notably reveal the characteristics of the copolymer, the constitutional units other than the constitutional units represented by formulae (3-1-p) to (3-5-p) is present in a range of about 5 to 95 mole %, and preferably in a range of about 60 to 95 mole %. Among the constitutional units other than the constitutional units represented by formulae (3-1-p) to (3-5-p), the constitutional units having a liquid crystallinity and the constitutional units having no liquid crystallinity can be adjusted within the above range such that the total amount thereof may fall in the range described above. Also, only either of them can be used.

For example, compounds represented by formulae (BRM-1) to (BRM-16) can be given as the polymerizable compounds other than the compound (1) or (2) having a liquid crystallinity.

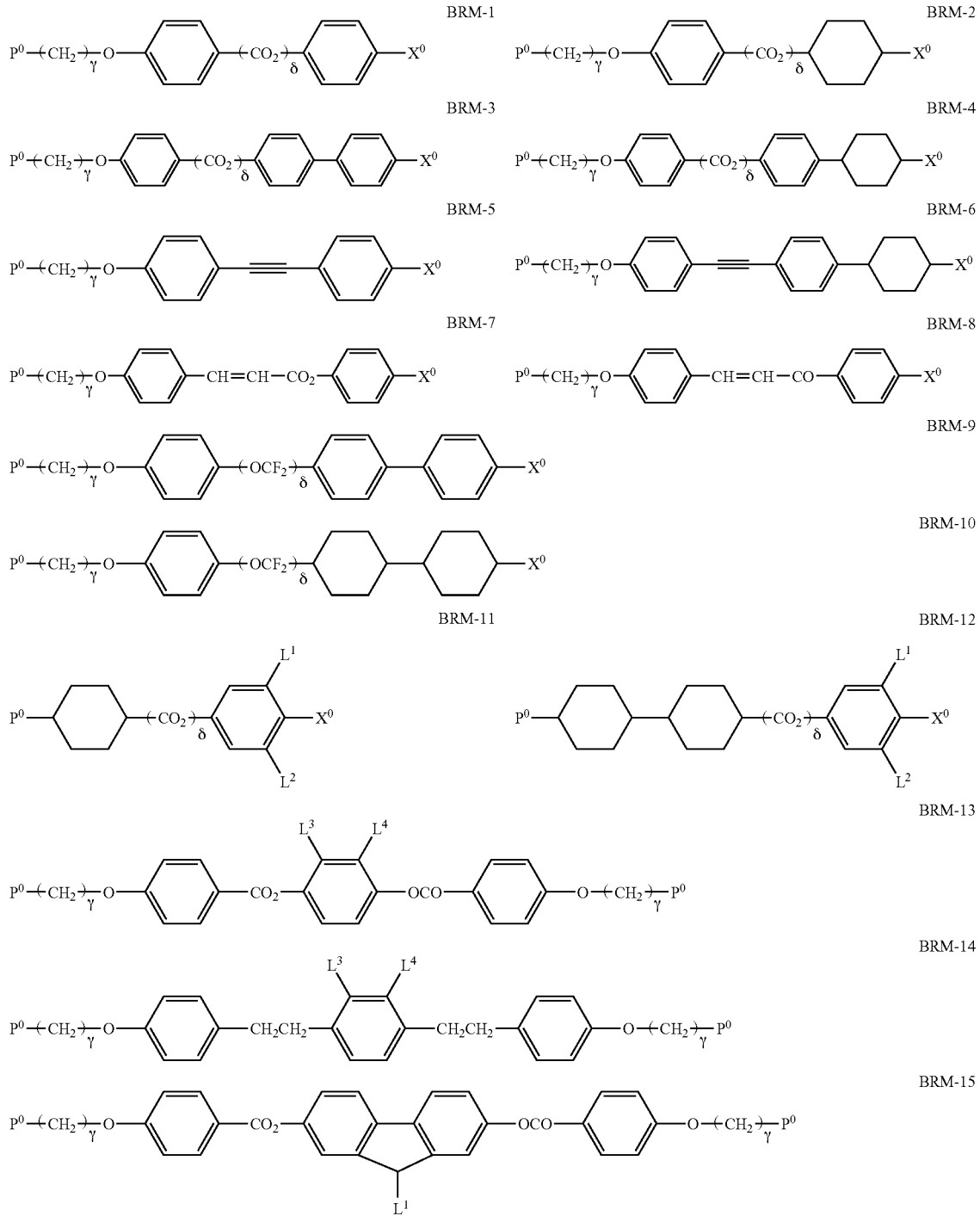

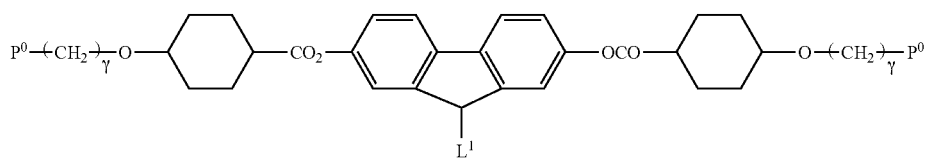

BRM-16

In formulae (BRM-1) to (BRM-16), $P^0$ is a polymerizable group having an acryloyloxy group, a methacryloyloxy group, a fumaroyloxy group, a maleimidyl group, an oxirane ring or an oxetane ring; γ is alkylene having a carbon number of 2 to 15; δ is 0 or 1; $X^0$ is alkyl having a carbon number of 1 to 15 or alkoxy having a carbon number of 1 to 15, halogen, halogenated alkyl having a carbon number of 1 to 3 or halogenated alkoxy having a carbon number of 1 to 3, CN or —O(CH$_2$)$_γ$P$^0$; $L^1$, $L^2$, $L^3$ and $L^4$ are independently hydrogen, halogen, alkyl having a carbon number of 1 to 15, alkoxy having a carbon number of 1 to 15, halogenated alkyl having a carbon number, of 1 to 3 or halogenated alkoxy having a carbon number of 1 to 3; provided that excluded are a case where $L^3$ and $L^4$ are trifluoromethyl at the same time and a case where $L^3$ is hydrogen and $L^4$ is trifluoromethyl.

Among them, the examples of the particularly suitable polymerizable compounds other than the compound (1) or (2) having a liquid crystallinity are compounds represented by the following formulae (BRM-a-1) to (BRM-a-11) and formulae (BRM-b-1) to (BRM-b-11). Any compounds can be suitably used as long as they are liquid crystalline compounds having the similar physical properties, and therefore the above examples shall not restrict the structure of the composition of the present invention.

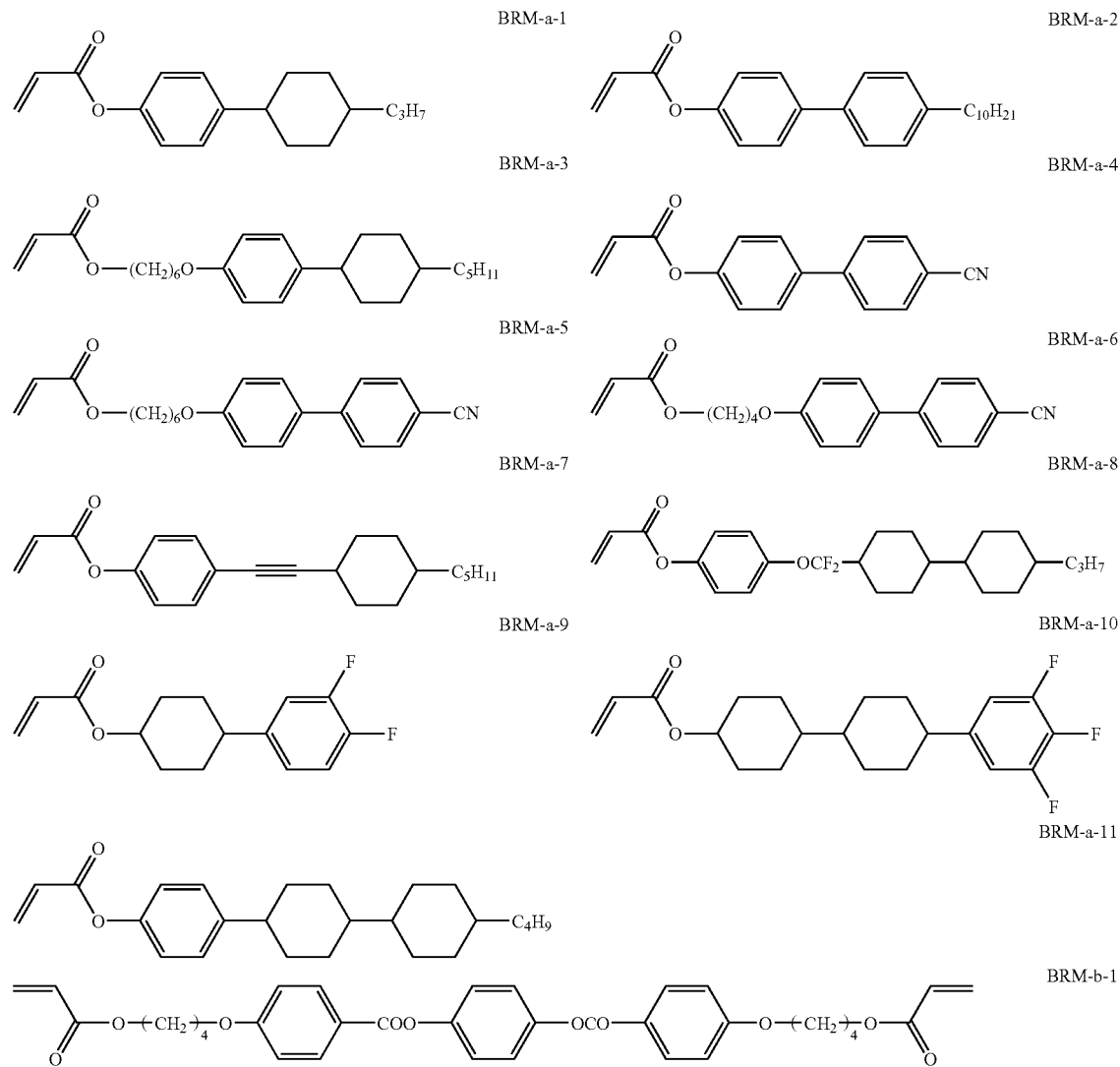

-continued
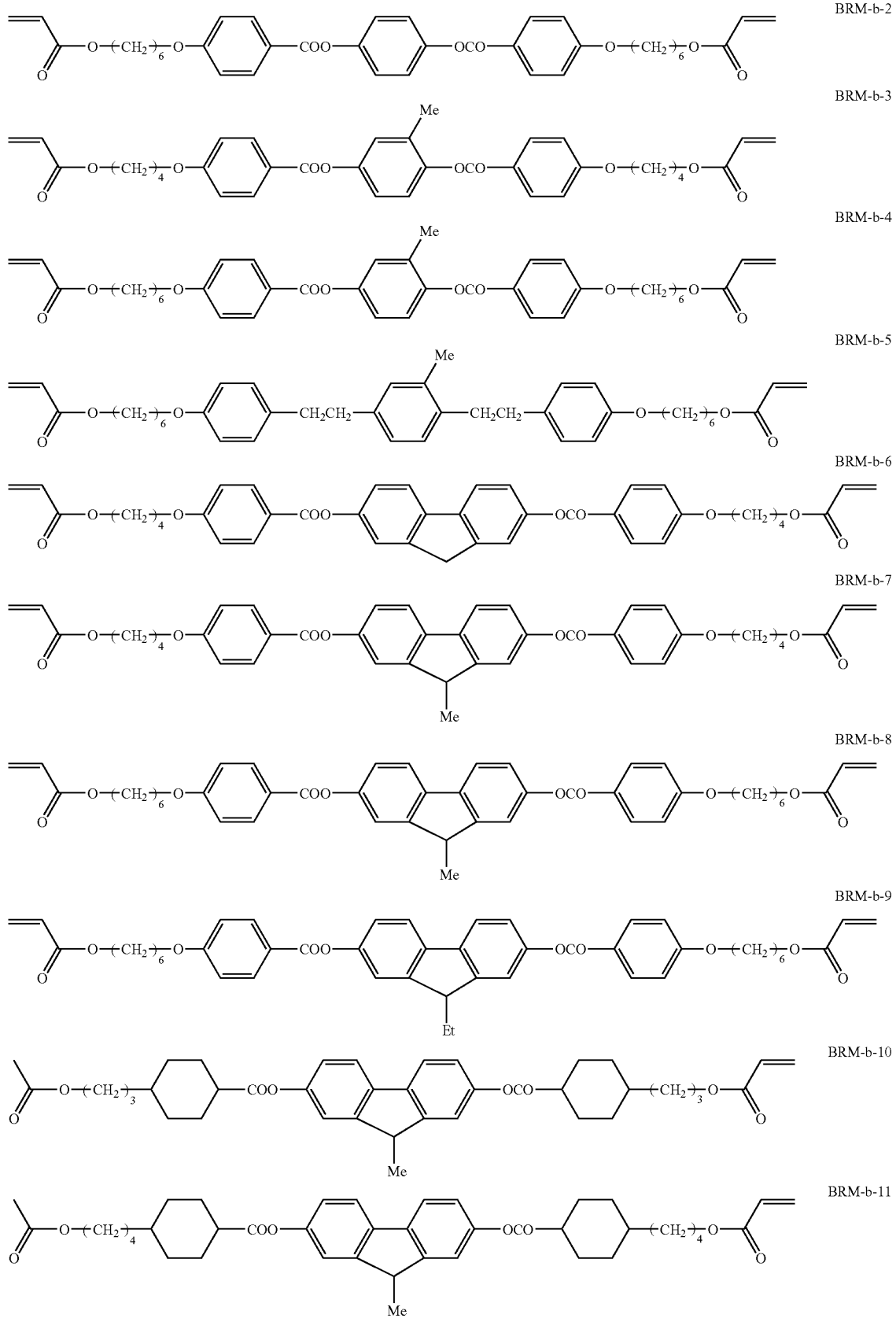

The polymer of the present invention is obtained by adding, if necessary, an initiator, a catalyst, a solvent and the like, to the polymerizable composition comprising one of the compound (1) or (2), at least two of the compound (1) or (2) or at least one of the compound (1) or (2) and polymerizing the composition. The copolymer can be selected from a group coomprising a random copolymer, an alternating copolymer, a block copolymer and a graft copolymer. A configuration repeating unit can be any of isotactic, syndiotactic and atactic.

Various polymerization methods can be used to obtain the polymer of the present invention using the compound (1) or (2). The preferable polymerization methods are free radical polymerization method, anionic polymerization method, cationic polymerization method, coordinated polymerization method and the like. A polymerization method for producing the polymer of the present invention can be selected according to the uses thereof. For example, for producing an optically anisotropic film such as a phase contrast film and a polarizing element, a quick polymerization has to be carried out in a manner that a liquid crystal phase is maintained, and therefore a polymerization method including irradiation using a UV ray or an electron beam is preferable. In such case, the compound (1) or (2) is polymerized optionally with the other polymerizable compound in the presence of, if necessary, an optical radical polymerization initiator.

The examples of an initiator in the optical radical polymerization are 2-hydroxy-2-methyl-1-phenylpropane-1-one (brand name: Darocure 1173), 1-hydroxycyclohexyl phenyl ketone (brand name: Irgacure 184), 2,2-dimethoxy-1,2-diphenylethane-1-one (brand name: Irgacure 651), Irgacure 500 (brand name), Irgacure 2959 (brand name), Irgacure 907 (brand name), Irgacure 369 (brand name), Irgacure 1300 (brand name), Irgacure 819 (brand name), Irgacure 1700 (brand name), Irgacure 1800 (brand name), Irgacure 1850 (brand name), Irgacure 4265 (brand name), Irgacure 784 (brand name), p-methoxyphenyl-2,4-bis(trichloromethyl)triazine, 2-(p-butoxystyryl)-5-trichloromethyl-1,3,4-oxadiazole, 9-phenylacridine, 1-(4-isopropylphenyl)-2-hydroxy-2-methylpropane-1-one, benzyl methyl ketal, 2-methyl-1-[4-(methylthio)phenyl]-2-morpholinopropane and a 2,4-diethylxanthone/ethyl p-dimethylaminobenzoate mixture.

The polymers obtained by a heat polymerization method and a photopolymerization method can be applied to various protective films, liquid crystal aligning films, viewing angle compensation films and the like. In the photopolymerization method, use of a polarized light, particularly a polarized UV light makes it possible to carry out polymerization in the state that polymerizable molecules are arranged in a direction of the polarized light. Accordingly, a polymer obtained by the photopolymerization method can be applied not only to various protective films, liquid crystal aligning films and the like but also such as aligning films requiring no rubbing. The polymer of the present invention has an optical anisotropy and therefore can be used alone as a phase contrast film or can be applied to, for example, a polarizing element, a circular polarizing element, an elliptic polarizing element, a reflection reducing film, a color compensation plate, a selective reflection film and a viewing angle compensation plate by combining with the other phase contrast films.

According to an embodiment of the present invention, a phase contrast film showing a spiral structure (twist structure) is obtained by coating the composition containing a suitable amount of the compound (1) or (2) having an optical activity or the composition obtained by adding an optically active compound to the compound (1) or (2), which is not optically active, on a substrate subjected to orientation treatment and then polymerizing the composition. The above spiral structure is fixed by polymerizing the compound (1) or (2). The characteristics of the resulting molded article having an optical anisotropy depend on the spiral pitch of the spiral structure thus obtained. A length of the above spiral pitch can be adjusted by controlling amount of the optically active compound. The single optically active compound may be added, but plural optically active compounds may be used in order to offset a temperature dependency of the spiral pitch. Further, a polymerizable compound other than the compound (1) or (2) in addition to the compound (1) or (2) and the optically active compound may be present in the composition.

In selective reflection of visible light, which is the characteristic of the above molded article having an optical anisotropy, the spiral structure functions to reflect circular polarized light and elliptic polarized light of the incident light. A selective reflection characteristic is shown by $\lambda = n \cdot \text{Pitch}$ ($\lambda$ is selective reflection central wavelength; n is an average refractive index; and Pitch is a spiral pitch), and therefore $\lambda$ and a band ($\Delta\lambda$) thereof can be suitably controlled by n and Pitch. It is advisable to reduce $\Delta\lambda$ in order to improve the color purity, and it is advisable to make $\Delta\lambda$ larger when reflection in a broad band is desired. Further, the above selective reflection is influenced to a large extent by a cell thickness. In order to maintain the color purity, it is important that the cell thickness is not too small. In order to maintain the uniformity of alignment, it is important that the cell thickness is not too large. Accordingly, the cell thickness has to be suitably controlled, and it is preferably in a range of about 0.5 to 25 μm, more preferably in a range of about 0.5 to 5 μm.

A negative type c-plate described in W. H. de Jeu, Physical Properties of Liquid Crystalline Materials, Gordon and Breach, New York (1980) can be prepared by making the spiral pitch further shorter than the visible light. Shortening of the spiral pitch can be achieved by using an optically active compound having a large helical twisting power (HTP) and increasing an addition amount thereof.

More specifically, the negative type c-plate can be prepared by setting $\lambda$ to 350 nm or less, preferably to 200 nm or less. The above negative type c-plate is an optical compensation film suitable for the display elements of such as a VAN type, a VAC type and an OCB type among liquid crystal display elements.

Any optically active compounds may be used as the optically active compound as long as they induce a spiral structure and can suitably be mixed with the polymerizable composition, which is the base. For example, the following optically active compounds (Op-1) to (Op-13) are suitable.

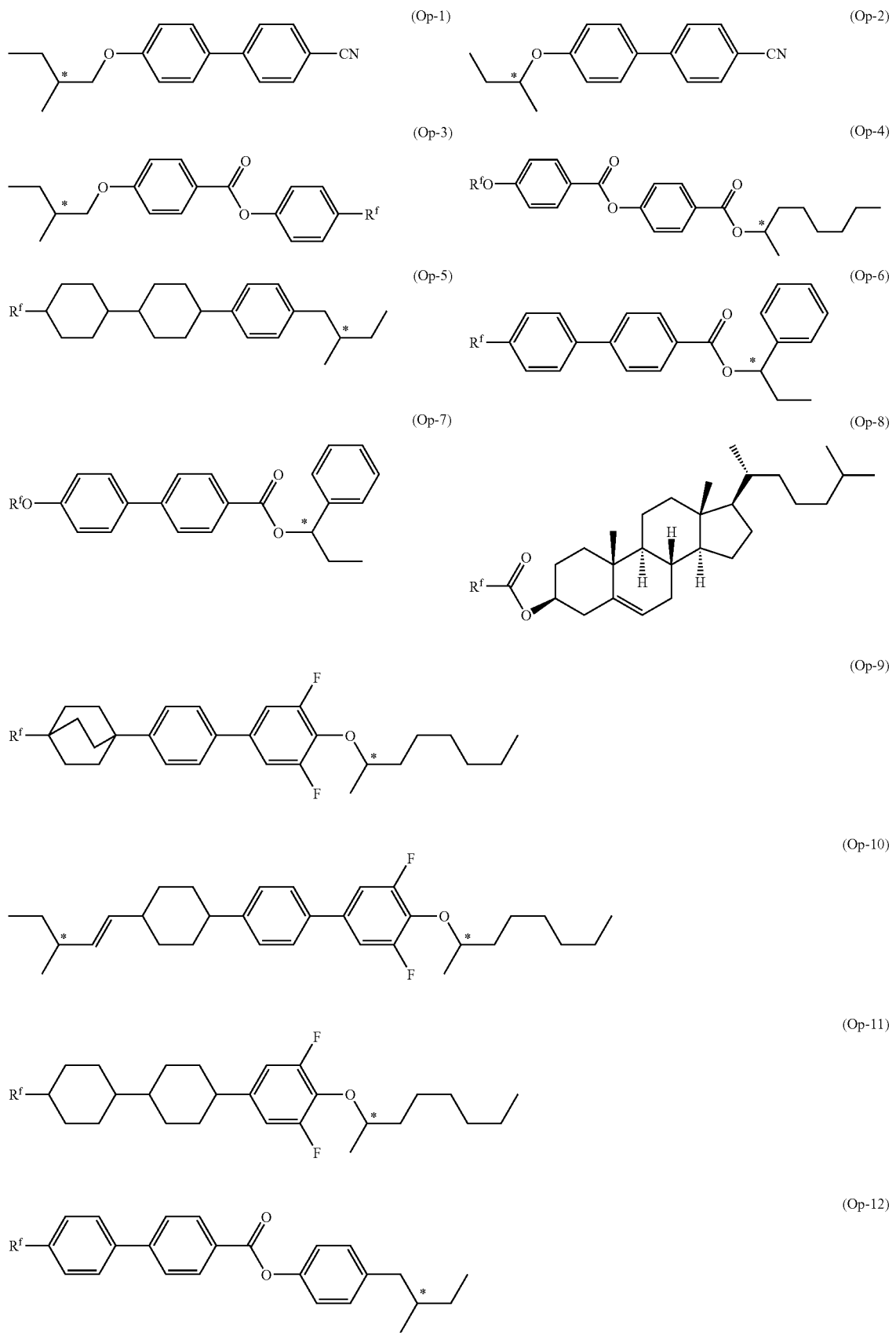

-continued

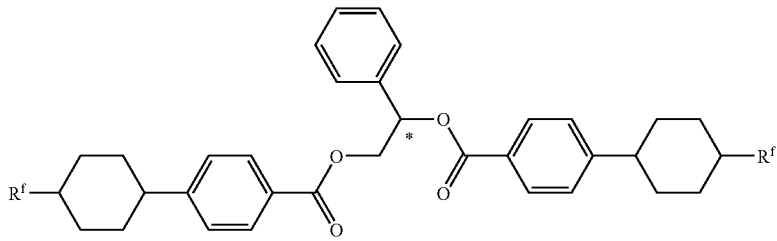

(Op-13)

In the above formulae, $R^f$ is an alkyl group having a carbon number of 1 to 10, and carbon affixed with * is asymmetric carbon.

The optically active compound may be either a polymerizable compound or a non-polymerizable compound. It can be optimized according to the purposes. In consideration of thermal resistance and solvent resistance, the polymerizable compound is suitable. Further, the optically active compound has, for example, a large helical twisting power (HTP) in terms of shortening the spiral pitch. The examples of the compound having a large helical twisting power are disclosed in a DE 1022175 official gazette. The suitable compounds represented by (Op-14) to (Op-19) are described below.

Compounds represented by (Op-14) to (Op-16) are polymerizable compounds, and compound represented by (Op-17) to (Op-19) are non-polymerizable compounds. In this case, if a polymerizable group is introduced into $-C_3H_7$ at an end of the chemical structure of the compounds shown in (Op-17) to (Op-19), useful optically active compound having a polymerizability can be formed.

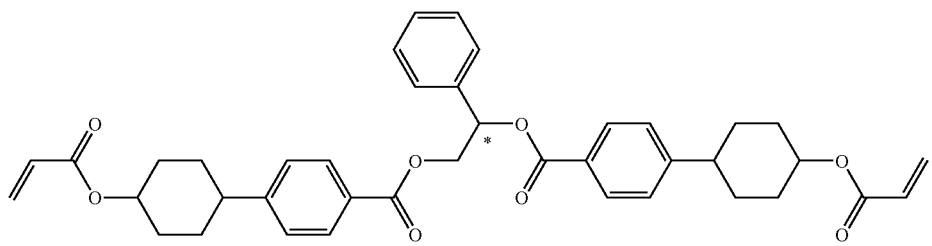

(Op-14)

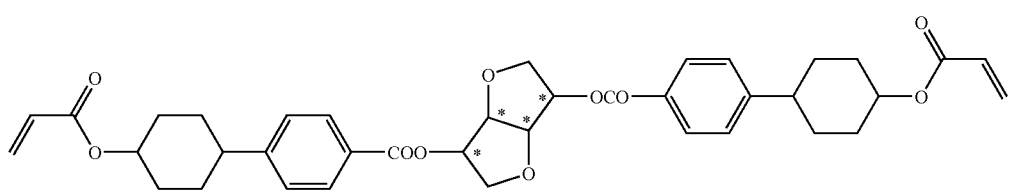

(Op-15)

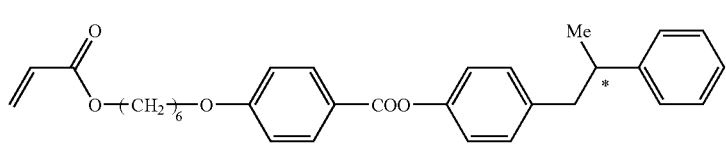

(Op-16)

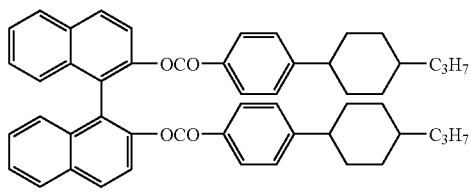

(Op-17)

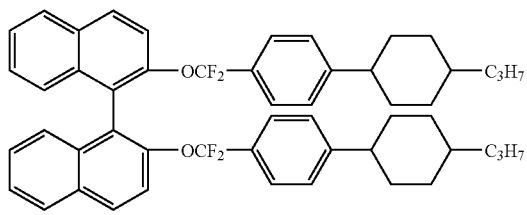

(Op-18)

-continued

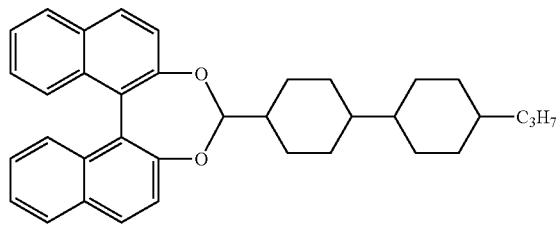

(Op-19)

An aligning film, a reflection reducing film, a viewing angle compensating film and the like are produced preferably by a thermal polymerizing method. In the thermal polymerization, the compound (1) or (2) is polymerized, optionally with the other polymerizable compounds, in the presence of a radical polymerization initiator. The preferred initiator for radical polymerization by heat includes benzoyl peroxide, diisopropylperoxydicarbonate, t-butylperoxy-2-ethyl hexanoate, t-butylperoxypivarate, di-t-butyl peroxide (DTBPO), t-butylperoxy-diisobutyrate, lauroyl peroxide, dimethyl 2,2-azobisbutyrate (MAIB), azobisisobutyronitrile (AIBN), azobiscyclohexanecarbonitrile (ACN) and the like. The polymerization is usually carried out at a reaction temperature of 0 to 150° C. for 1 to 100 hours.

The preferred initiators for an anionic polymerization method and a coordinate polymerization method include alkaline metal alkyls such as n-$C_4H_9Li$ and t-$C_4H_9Li$—$R_3Al$, aluminum compounds and transition metal compounds.

At least one of the compound (1) or (2) or the polymerizable composition containing the compound (1) or (2) can be polymerized by cationic polymerization. The cationic polymerization can be initiated by light or thermal irradiation. A cationic polymerization initiator can be added in order to shorten the reaction time and raise the degree of polymerization. Brønsted acids, halogenated metal compounds and onium salts can be suitably used as a photocation. Specific examples thereof can be referred to Macromolekulare Chemie, VCH Verlag, Weinheim and An Introduction to Polymer Science, VCH Verlag, Weinheim.

The polymerization is preferably carried out in an atmosphere of inert gas such as nitrogen and argon, but it can also be carried out in the atmosphere of air by optimizing the constitution of the initiator and the compounds.

When the polymerizable group is a group represented by formula (3-5), the compound (1) or (2) is reacted with a nucleophilic reagent such as phenols and amines to form secondary alcohols. The polymer can be produced by using a multifunctional nucleophilic reagent.

During the polymerization reaction, a solvent, in addition to the initiator and the catalyst, may be added to at least one of the compound (1) or (2) or the polymerizable composition. The preferred solvent includes, for example, benzene, toluene, xylene, mesitylene, hexane, heptane, octane, nonane, decane, tetrahydrofuran, γ-butyrolactone, N-methylpyrrolidone, dimethylformamide, dimethylsulfoxide, cyclohexane, methylcyclohexane, cyclopentanone, cyclohexanone, PGMEA and mixed solvents thereof. When producing an aligning film, a reflection reducing film and a viewing angle compensation film by photopolymerization, the solution of the composition is coated on a substrate by a spin coating method and may be polymerized by light irradiation after removing the solvent. A publicly known coater (a doctor blade, a coating apparatus and the like) may be used for coating the composition on the substrate. It is not meaningful so much to restrict a use proportion of the solvent in the polymerization. It may be determined by every individual case considering the polymerization efficiency, the solvent cost, the energy cost and the like.

The isolated polymer can be dissolved in a solvent and then molded. The preferred solvent is N-methylpyrrolidone, dimethylsulfoxide, N,N-dimethylacetamide, N,N-dimethylformamide, N,N-dimethylacetamide dimethyl acetal, tetrahydrofuran, chloroform, 1,4-dioxane, bis(methoxyethyl) ether, γ-butyrolactone, tetramethylurea, trifluoroacetic acid, ethyl trifluoroacetate, hexafluoro-2-propanol, cyclohexane, cyclohexane, methylcyclohexane, cyclopentanone, cyclohexanone and PGMEA. However, the present invention is not restricted to the above-mentioned solvent, a mixture of organic solvents such as acetone, benzene, toluene, heptane and methylene chloride may also be used to achieve the purpose of the present invention. It is not meaningful to restrict the proportion of the solvent in the molding in the above-mentioned polimerization. The proportion of the solvent may be determined by every individual case in consideration of, for example, the film thickness of a thin film produced and a vapor pressure of the solvent in the production environment. At least two of the compounds of the present invention can be used in a mixture depending on the uses and can also be used in a laminate. When used in a laminate, a thin film may be directly molded by photopolymerization without isolating the polymer.

The polymer of the present invention has an optical anisotropy and therefore can be used alone for a phase contrast film. The above polymer can be applied to, for example but not limited to, a polarizing plate, a circular polarizing plate, an elliptic polarizing plate, a reflection reducing film, a color compensation plate and a viewing angle compensation plate by combining it with the other phase contrast films. Further, the compounds of the present invention can also be used as adhesives, synthetic high polymers having a mechanical anisotropy, cosmetics, ornaments, non-linear optical materials and information storage materials.

The polymer of the present invention has a refractive index in a range of about 1.35 to 1.60. The refractive index can be optimized by selecting the structures of the compounds (1) and (2). That is, a large refractive index can be obtained by increasing an unsaturated bond, and a low refractive index can be obtained by decreasing an unsaturated bond and introducing halogen. The refractive index can also be controlled by adding the fine particles of inorganic substances. Addition of the fine particles makes it possible to increase the refractive index to about 2.5, and the adhesive property and the mechanical strength are raised at the same time. The fine particles of such as $TiO_2$, $SiO_2$ and $SnO_2$ each having a particle diameter of 10 nm to 1 μm can be used for the above purpose.

The chemical structure of the compound (2) has polymerizable groups at both ends thereof, and therefore a polymer having a large degree of polymerization and a large molecular weight can readily be produced from it. In the composition comprising the compound (2) and the compound other than the compound (2), when the compound other than the compound (2) contains a compound having one polymerizable group in a large proportion, the resulting polymer has a low molecular weight, low glass transition point and low melting point, and has excellent processability characteristic such as moldability. A preferred range of the molecular weight that reflect such characteristics is in a range of about 500 to 100,000 in terms of a weight average molecular weight. When the compound other than the compound (2) is multifunctional, the resulting polymer has a high molecular weight and has an excellent chemical resistance and excellent thermal resistance. A preferred range of the molecular weight that reflect such characteristics is in a range of about 100,000 or more in terms of a weight average molecular weight. When the composition of the present invention is coated on a substrate and polymerized to fix orientation of molecules to thereby obtain an optical anisotropy, further processing is not required, and therefore it does not matter whether the value of the molecular weight is large or small. It is better if the conditions are satisfactory in the use environment.

A cross-linking agent can be added to the composition of the present invention in order to further raise the molecular weight. The above composition can provide a polymer in which a molecular weight can be infinitely increased. The resulting polymer has an excellent chemical resistance and an excellent thermal resistance. Any compounds can be used as the cross-linking agent well known to persons having ordinary skill in the art, for example, tri(3-methylmercaptopropionate).

The compound and the composition of the present invention have a high polymerizability. A stabilizing agent can be added in order to facilitate handling thereof. Any stabilizing agents well known to the persons having ordinary skill in the art can be used, for example, hydroquinone, 4-ethoxyphenol and 3,5-di-t-butyl-4-hydroxytoluene (BHT).

When producing the optically anisotropic thin film, any substrates well known to the persons having ordinary skill in the art can be used. They include, for example, glass, polyesters such as polyethylene terephthalate (PET), polyvinyl alcohol (PVA), polycarbonate (PC), triacetyl cellulose (TAC) and norbornene base polymers such as Zeonoa (registered trade mark: manufactured by Nippon Zeon Co., Ltd.), Zeonex (registered trade mark: manufactured by Nippon Zeon Co., Ltd.) and Arton (registered trade mark: manufactured by JSR Co., Ltd.). The polymer of the present invention has an excellent adhesive property with these substrates.

The process of aligning the compound of the present invention on the substrate can be accomplished by subjecting an aligning film coated on the substrate to a rubbing treatment and then coating the compound of the present invention thereon. Any aligning films well known to the persons having ordinary skill in the art that provides an alignment control means can be used to achieve the purpose of the present invention. For example polyimide, polyamide and polyvinyl alcohol base aligning films can be suitably used. Further, aligning can also be achieved by rubbing the substrate itself with, for example, a rubbing cloth and then the composition of the present invention is directly coated thereon. The composition containing the aligned compound of the present invention is polymerized by, for example, a light irradiation, to produce a molded article having an optical anisotropy, and therefore it is an industrially advantageous method.

The compound, the composition and the polymer of the present invention can also be used for fabricating a liquid crystal display element such as a color filter, a horographic element, PDLC (polymer dispersed liquid crystal) and PSCT (polymer stabilized cholesteric texture).

The compounds (1) and (2) are particularly suitable for fabricating a high molecular liquid crystal thin film which is controlled in aligning. The compounds (1) and (2) can be readily applied by persons having ordinary skill in the art to fabricate the above liquid crystal display element.

A ferroelectric liquid crystal display element or an antiferroelectric liquid crystal display element which is stabilized by polymerization can be formed by mixing the compound (1) or (2) with a ferroelectric liquid crystal or an antiferroelectric liquid crystal and polymerizing the mixture. A specific constituting method of the display element itself is publicly known from documents and the like (J. of Photopoly. Sci. Technol., 2000, 13 (2), 295 to 300).

EXAMPLES

The present invention will now be described in detail with reference to the following examples, however the present invention shall by no means be restricted by these examples. The structures of the compounds were confirmed by a nuclear magnetic resonance spectrum, a mass spectrum and the like. The unit of a phase transition temperature is ° C.; C represents crystal; N represents a nematic phase; Iso represents an isotropic liquid; and the inside of a parenthesis represents a monotropic liquid crystal phase. For example, [C 100.0 N] shows that a phase transition temperature from crystal to a nematic phase is 100.0° C. The phase transition temperature was observed by means of DSC and a polarization microscope.

The weight average molecular weight and the number average molecular weight were measured by using Shimadzu LC-9A type gel permeation chromatography (GPC) manufactured by Shimadzu Seisakusho Co., Ltd. and a column Shodex GF-7M HQ (a developing solvent used was DMF or THF) manufacture by Showa Denko Co., Ltd. The pencil hardness was determined according to JIS standard [JIS-K-5400 8.4 pencil scratch test]. A unit mark L represents liter.

Example 1

Production of 2,3-bistrifluoromethyl-1,4-di(4-(6-acryloyloxyhexyloxy)benzoyloxy)benzene (Compound (1-13-7))

Compound (1-13-7) was produced through the following synthesis route:

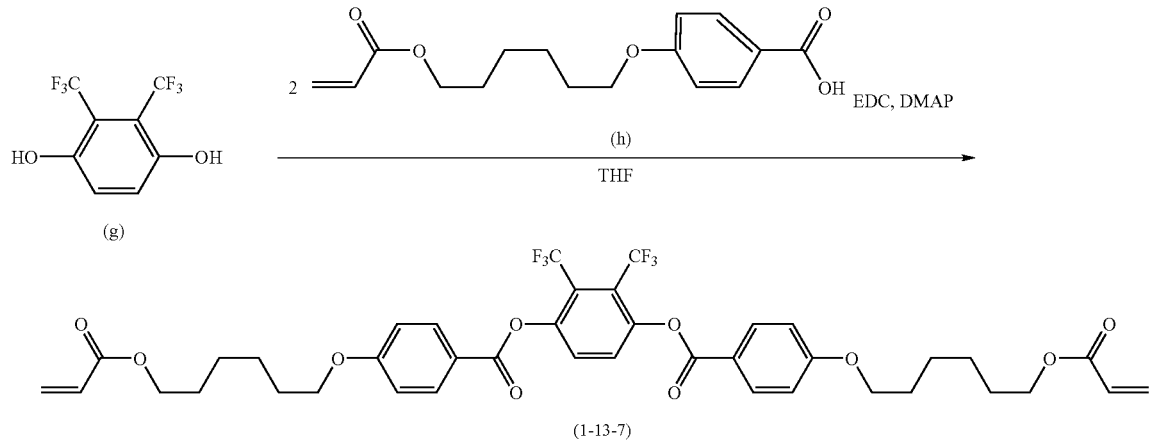

A mixture of 2,3-bistrifluoromethylhydroquinone (g) (1.46 g), 4-(6-acryloyloxyhexyloxy)benzoic acid (h) (1.83 g), 4-dimethylaminopyridine (1.83 g) and THF (70 ml) was cooled on an ice bath. 1-Ethyl-3-(3-dimethylaminopropyl)carbodiimide (4.50 g) was added thereto at the same temperature??, and the mixture was stirred for a night. Distilled water was added thereto to extract the reaction mixture by methylene chloride. The organic layers were put together, washed with 2M hydrochloric acid and a saturated sodium hydrogencarbonate aqueous solution, and dried on an anhydrous sodium sulfate. The solvent was distilled off, and the residue was refined by means of silica gel chromatography to obtain the required substance (3.36 g: yield 56.7%) in the form of colorless crystal having a nematic phase.

Phase transition temperature (° C.): C 90.3 (N 91.3) Iso.

$^1$H-NMR (CDCl$_3$; δ ppm): 8.14 (d, 4H), 7.56 (s, 2H), 6.99 (d, 4H), 6.41 (dd, 2H), 6.13 (dd, 2H), 5.82 (dd, 2H), 4.19 (t, 4H), 4.07 (t, 4H), 1.88–1.83 (m, 4H), 1.76–1.71 (m, 4H), 1.58–1.45 (m, 8H).

Example 2

Production of 5,8-di(4-(6-acryloyloxyhexyloxy)-benzoyloxy)-2,2-difluoro-1,3-benzodioxol (Compound (1-23-7))

Compound (1-23-7) was produced through the following synthesis route:

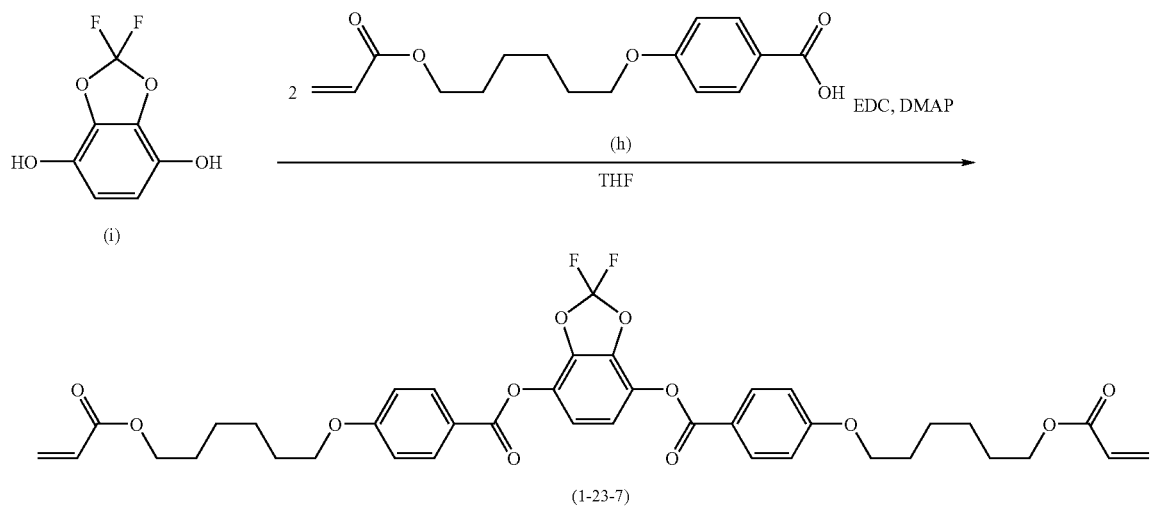

A mixture of 5,8-dihydroxy-2,2-difluoro-1,3-benzodioxol (i) (3.02 g), 4-(6-acryloyloxyhexyloxy)benzoic acid (h) (9.24 g), 4-dimethylaminopyridine (3.84 g) and THF (180 ml) was cooled on an ice bath. 1-Ethyl-3-(3-dimethylaminopropyl)carbodiimide (9.06 g) was added thereto at the same temperature??, and the mixture was stirred for a night.

Distilled water was added thereto to extract the reaction mixture by methylene chloride. The organic layers were put together, washed with 2M hydrochloric acid and a saturated sodium hydrogencarbonate aqueous solution, and dried on an anhydrous sodium sulfate. The solvent was distilled off, and the residue was refined by means of silica gel chromatography to obtain the required substance (7.66 g: yield 65.7%) in the form of a colorless liquid.

$^1$H-NMR (CDCl$_3$; δ ppm): 8.01 (d, 4H), 7.02 (dd, 2H), 6.86 (d, 4H), 6.39 (dd, 2H), 6.12 (dd, 2H), 5.81 (dd, 2H), 4.17 (t, 4H), 3.98 (t, 4H), 1.83–1.78 (m, 4H), 1.74–1.70 (m, 4H), 1.56–1.42 (m, 8H).

Compound (1-11-1) to Compound (1-34-6) were produced according to the methods described in Examples 1 to 2.

The compound (1-11-1) to Compound (1-34-6) are shown as follows:

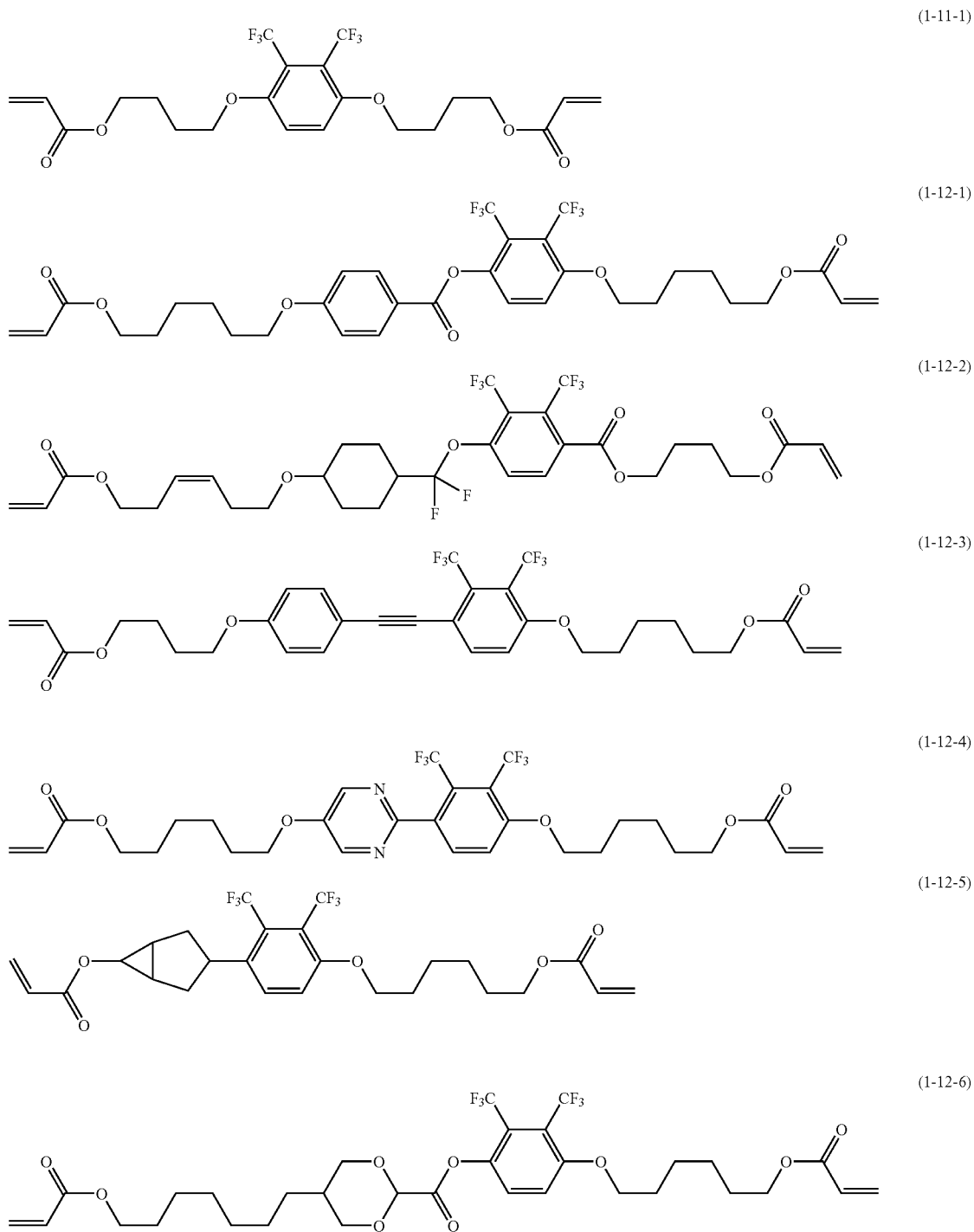

-continued
(1-13-1)
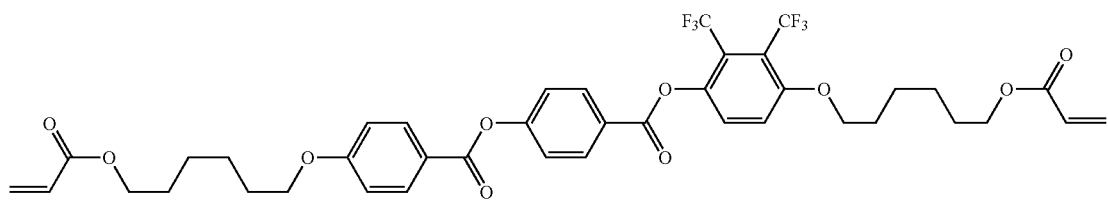
(1-13-2)
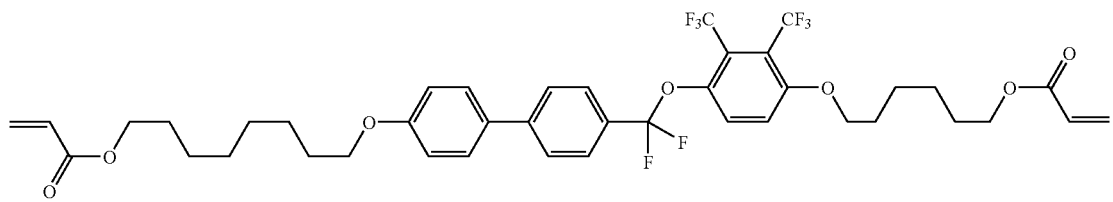
(1-13-3)
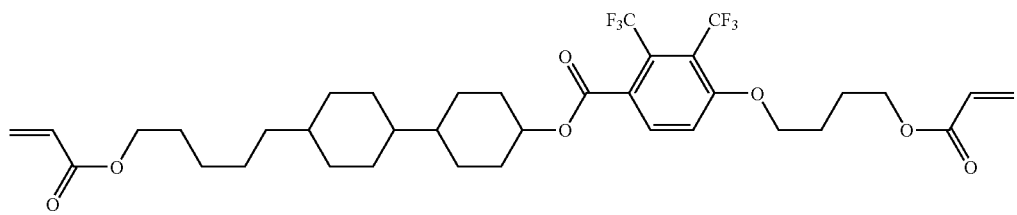
(1-13-4)
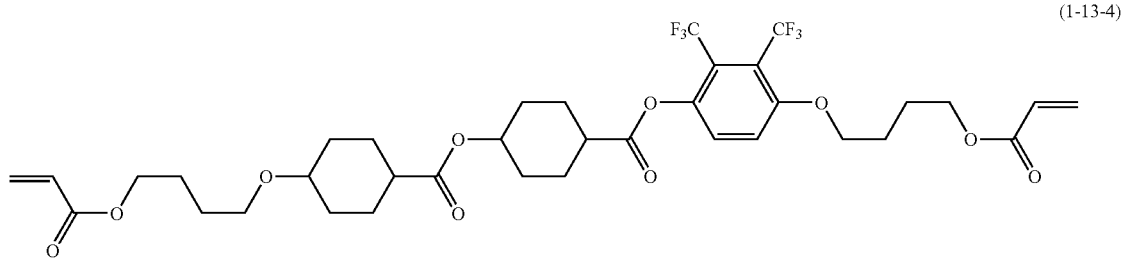
(1-13-5)
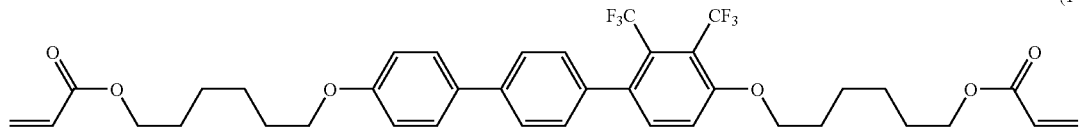
(1-13-6)
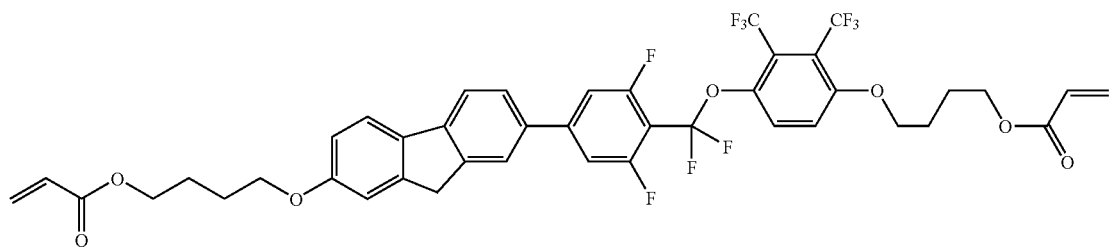
(1-13-7)
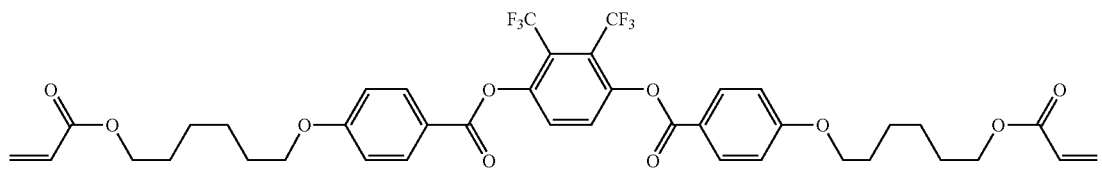
90.3 (N 91.3) Iso

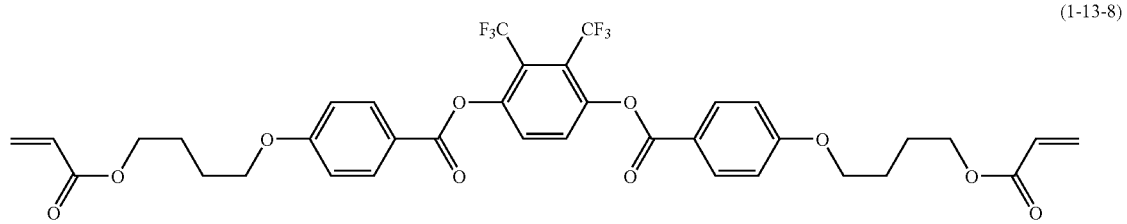
(1-13-8)
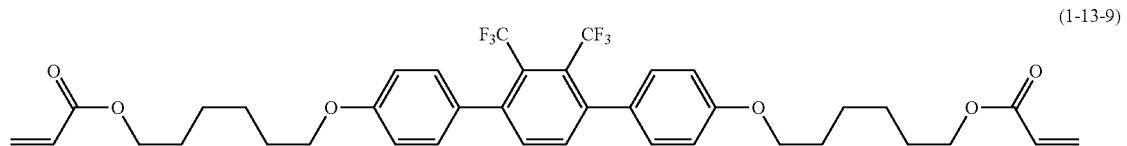
(1-13-9)
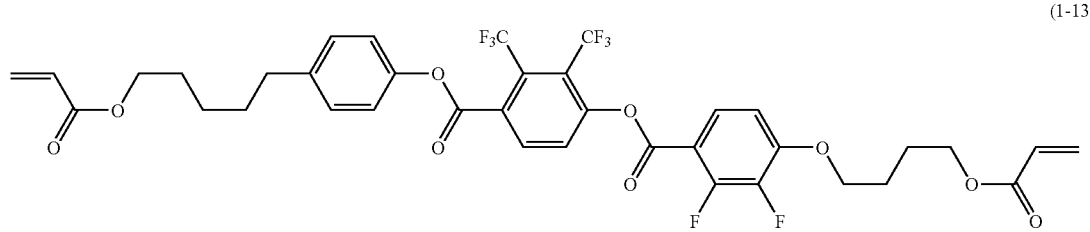
(1-13-10)
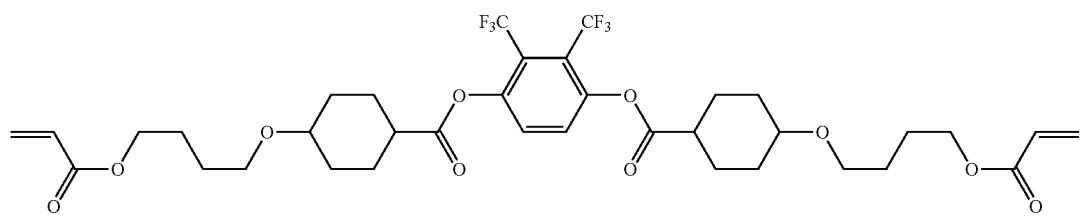
(1-13-11)
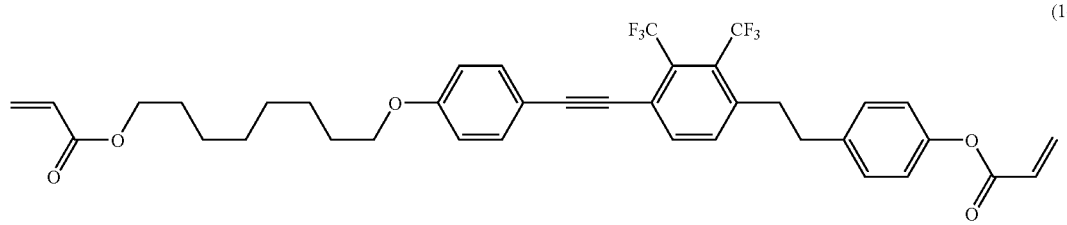
(1-13-12)
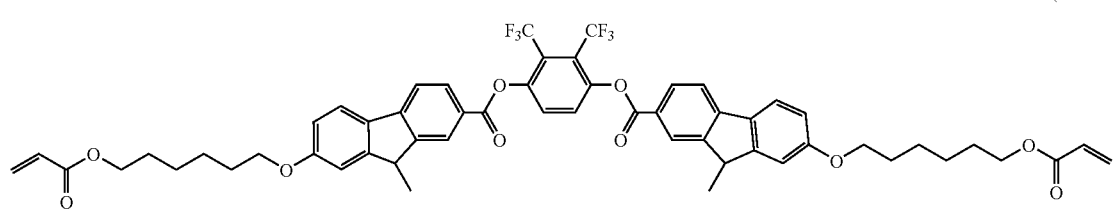
(1-13-13)
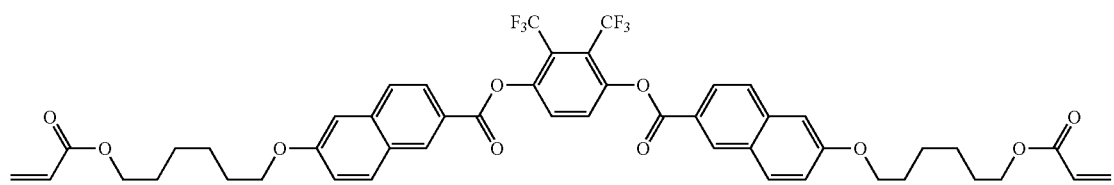
(1-13-14)

-continued
(1-13-15)
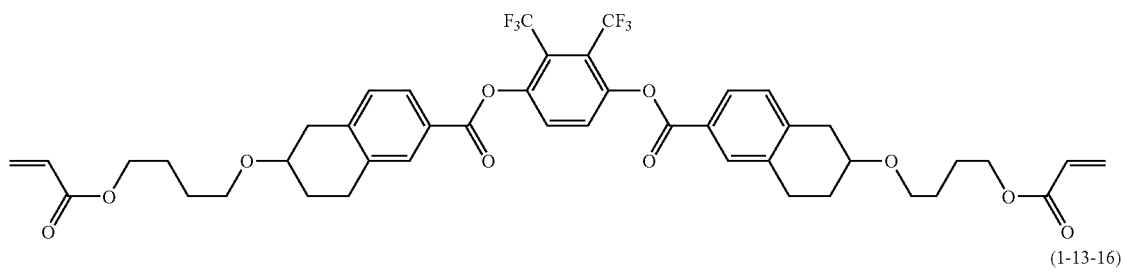
(1-13-16)
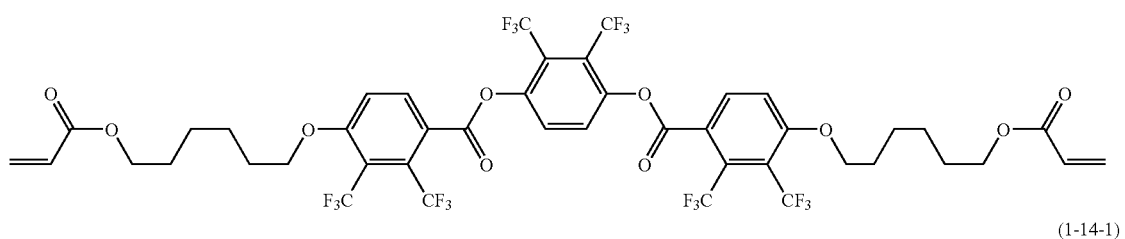
(1-14-1)
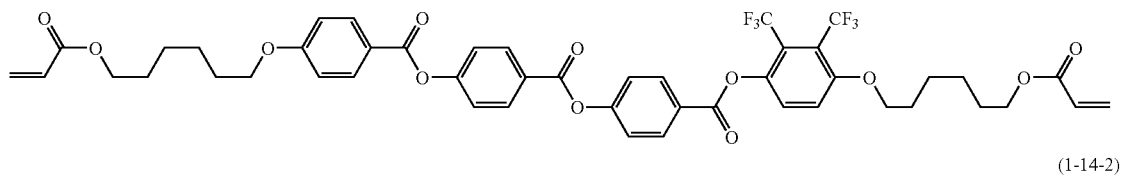
(1-14-2)
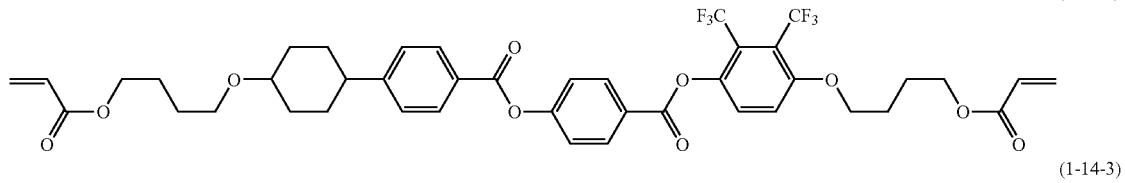
(1-14-3)
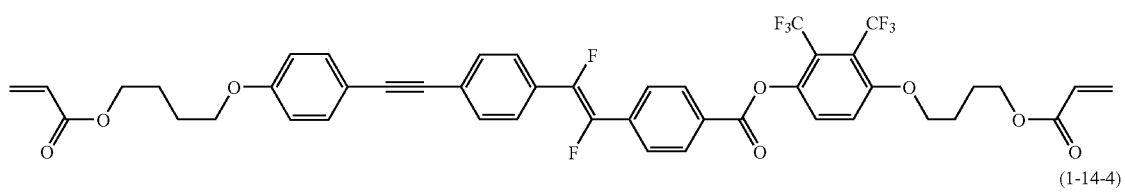
(1-14-4)
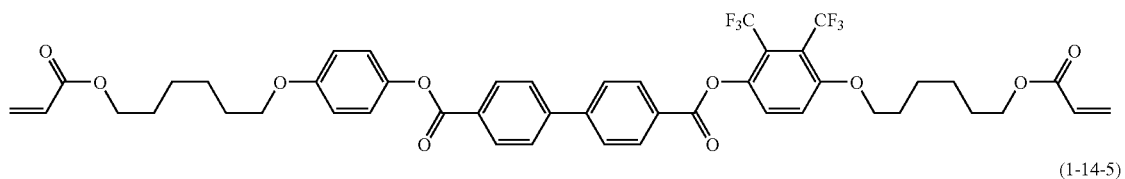
(1-14-5)
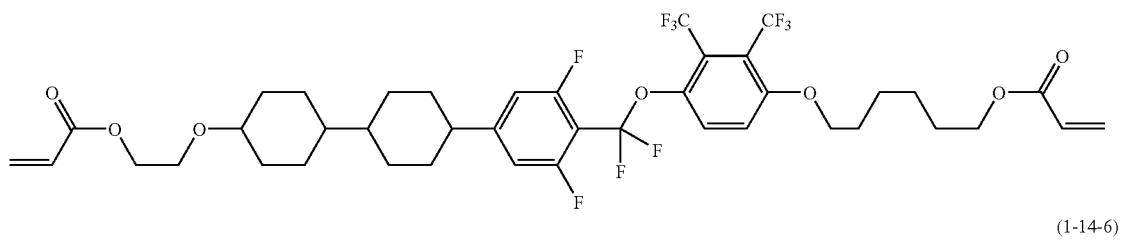
(1-14-6)
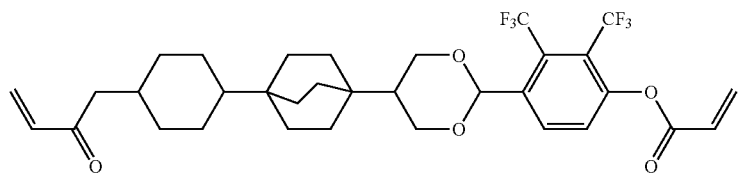

-continued
(1-14-7)
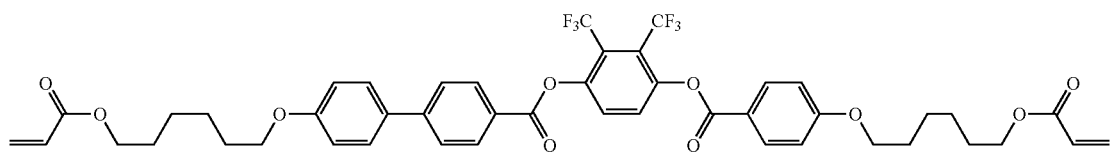
(1-14-8)
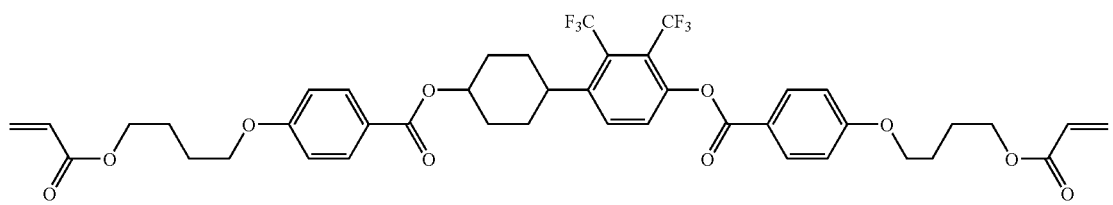
(1-14-9)
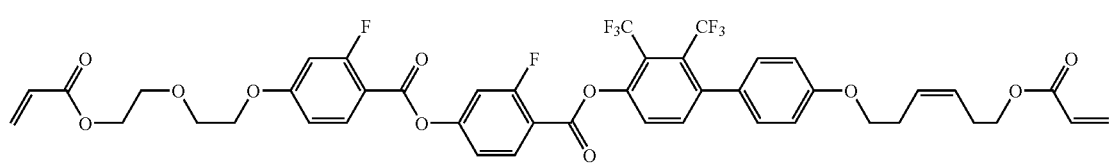
(1-14-10)
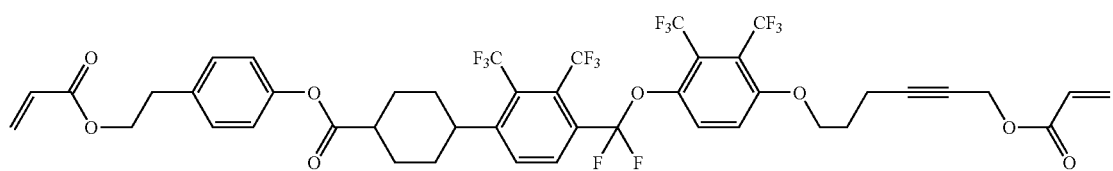
(1-14-11)
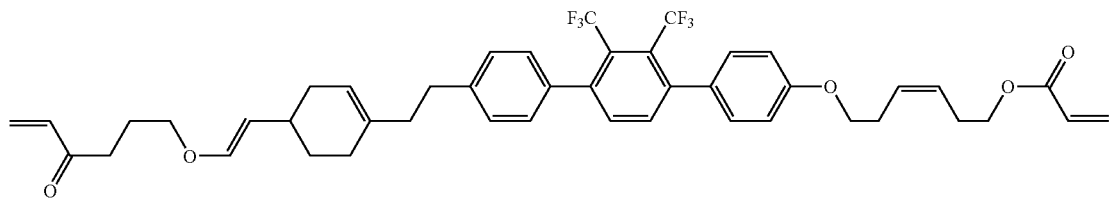
(1-14-12)
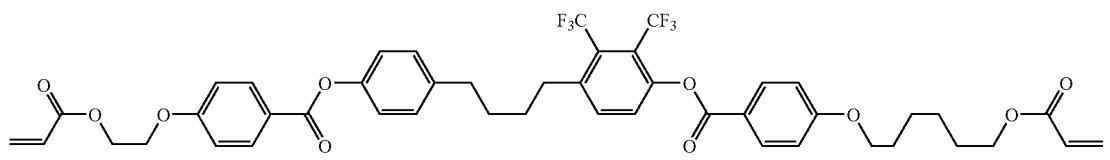
(1-14-13)
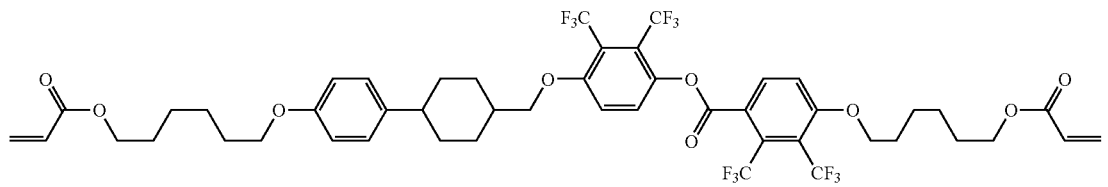

(1-14-14)
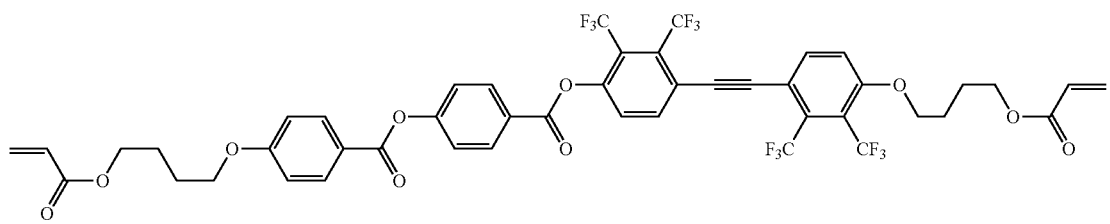
(1-14-15)
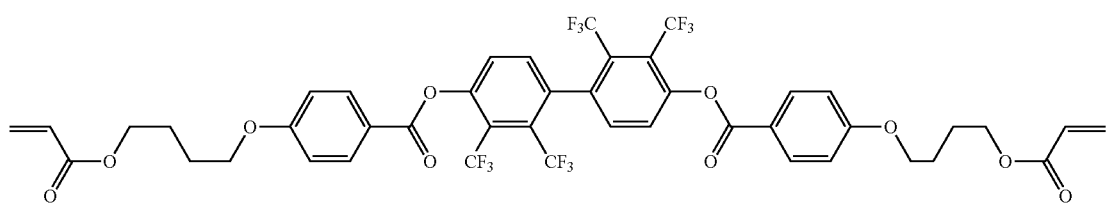
(1-14-16)
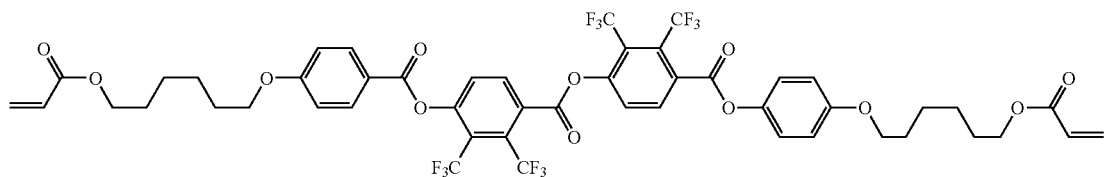
(1-14-17)
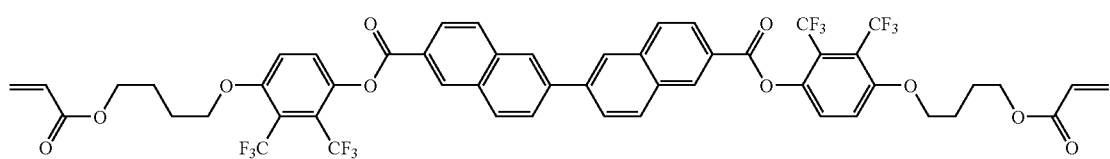
(1-21-1)
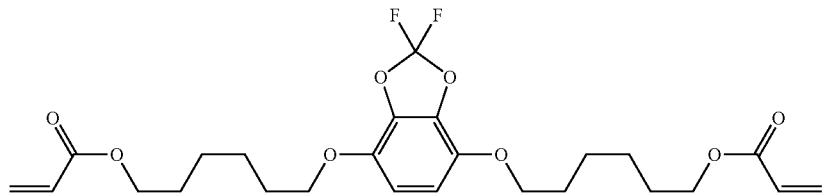
(1-22-1)
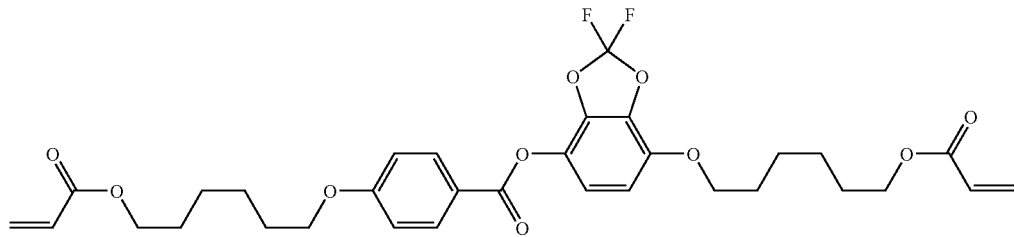
(1-22-2)
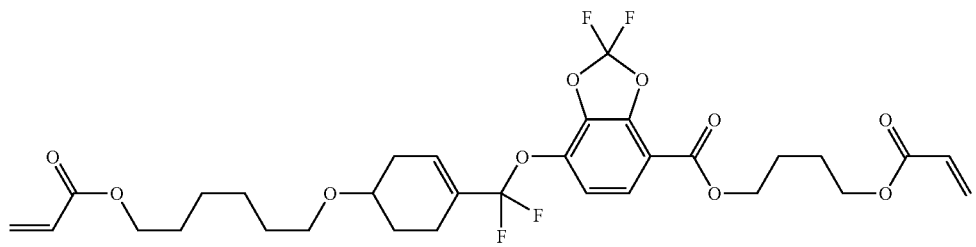

-continued
(1-22-3)
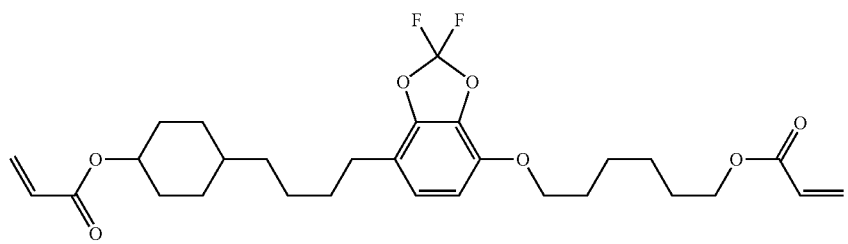
(1-22-4)
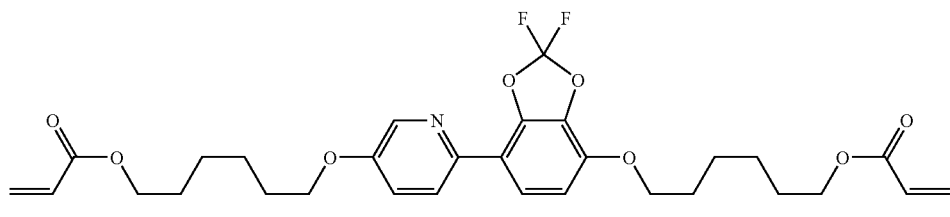
(1-22-5)
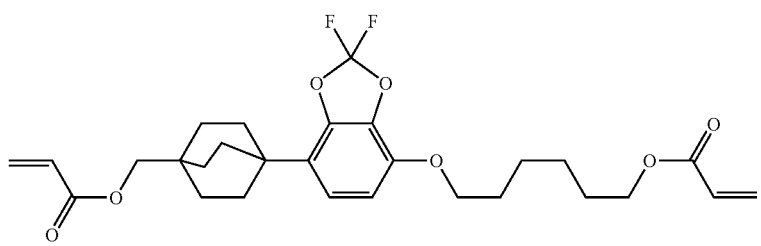
(1-22-6)
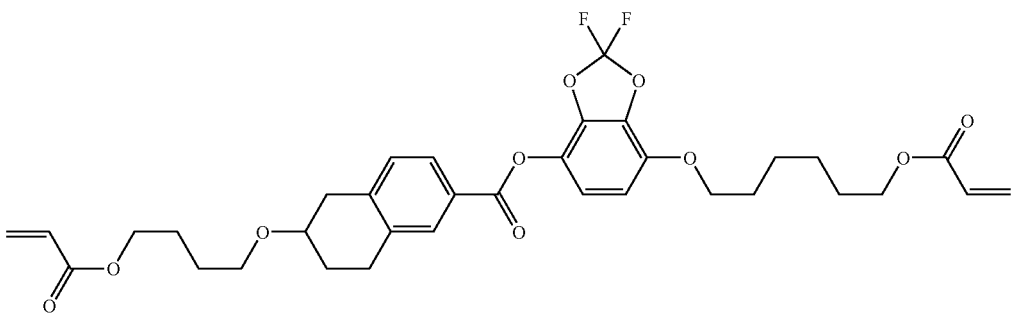
(1-23-1)
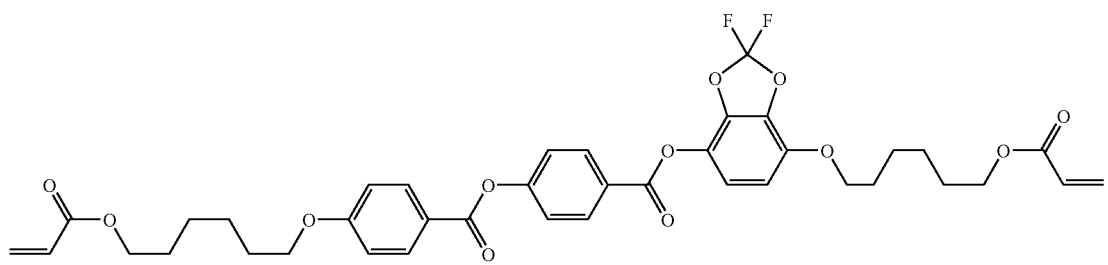
(1-23-2)
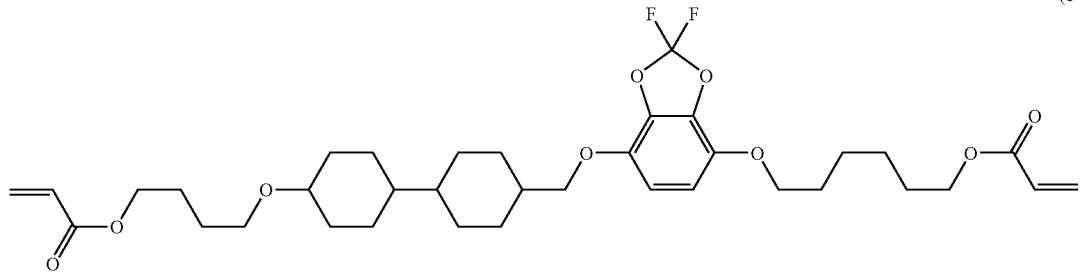

-continued
(1-23-3)
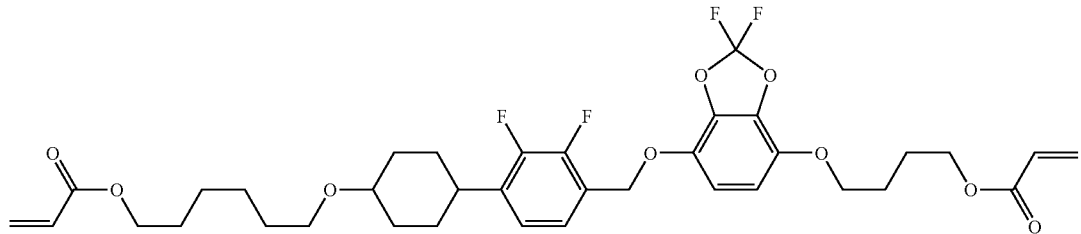
(1-23-4)
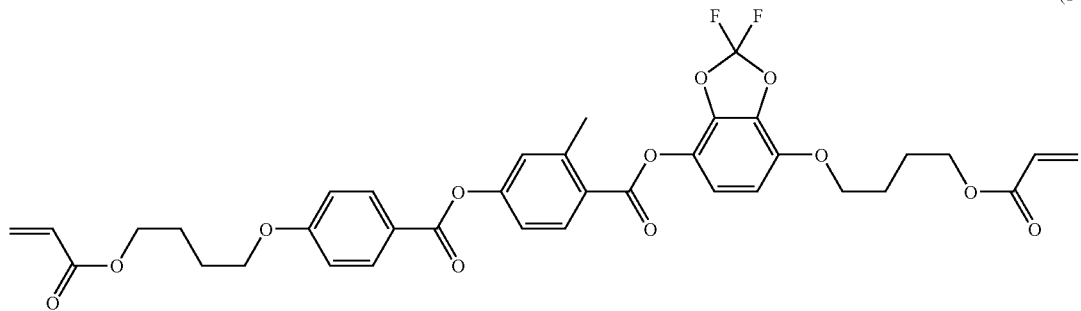
(1-23-5)
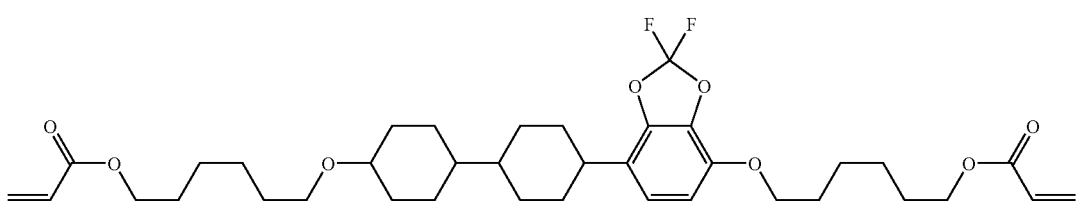
(1-23-6)
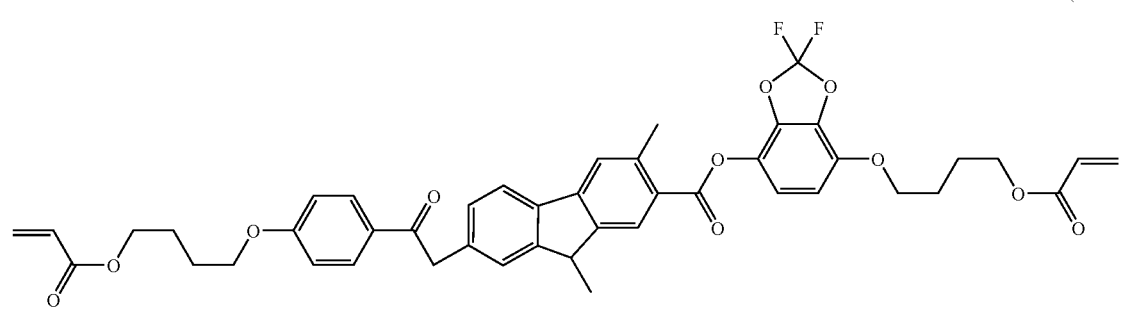
(1-23-7)
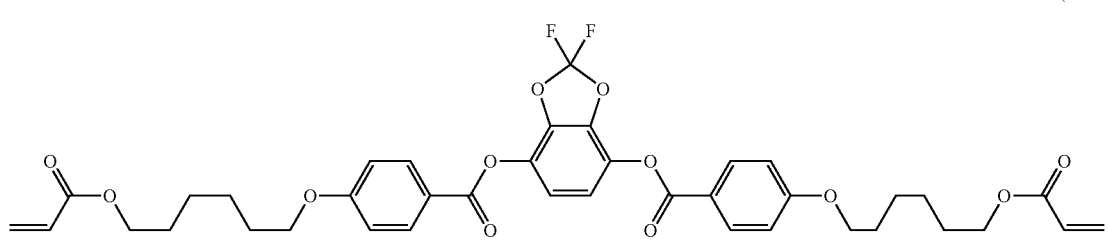

-continued
(1-23-8)
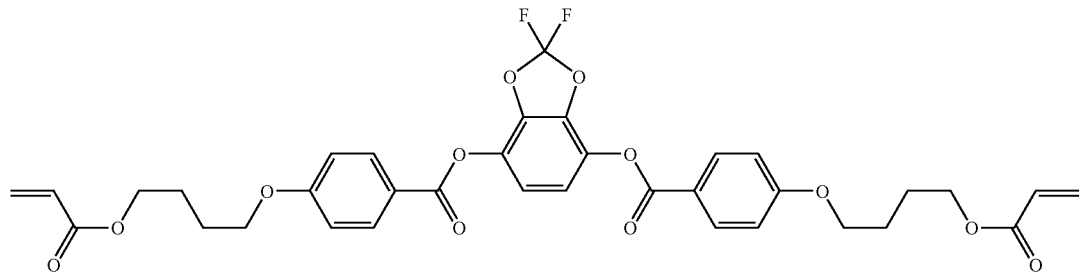
(1-23-9)
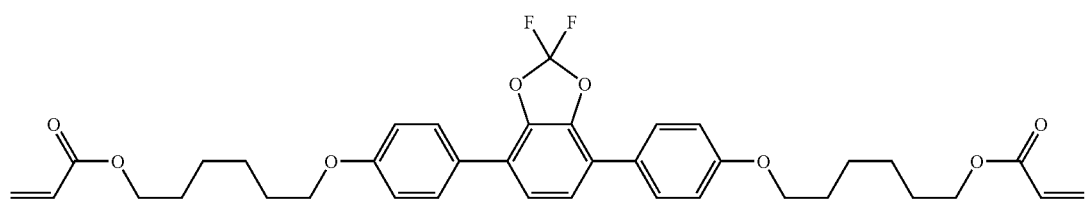
(1-23-10)
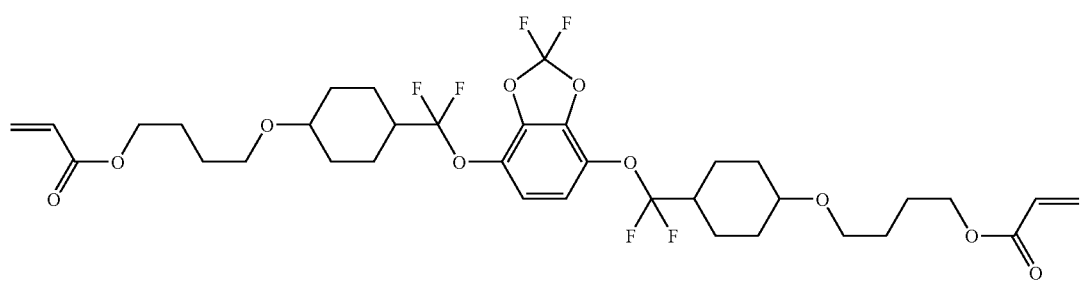
(1-23-11)
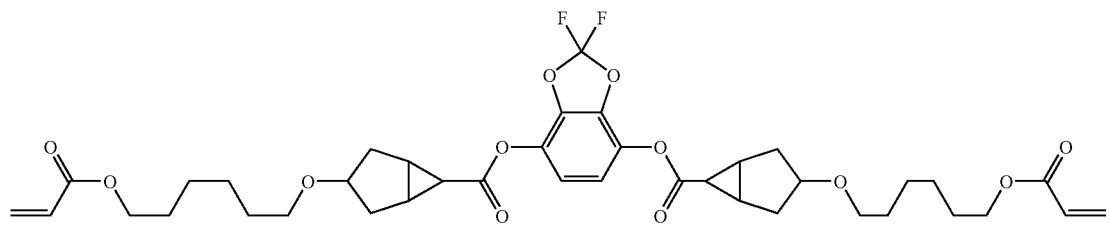
(1-23-12)
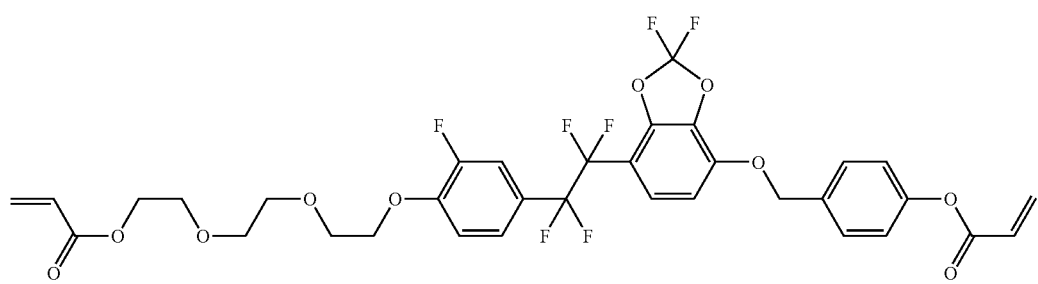

-continued
(1-23-13)
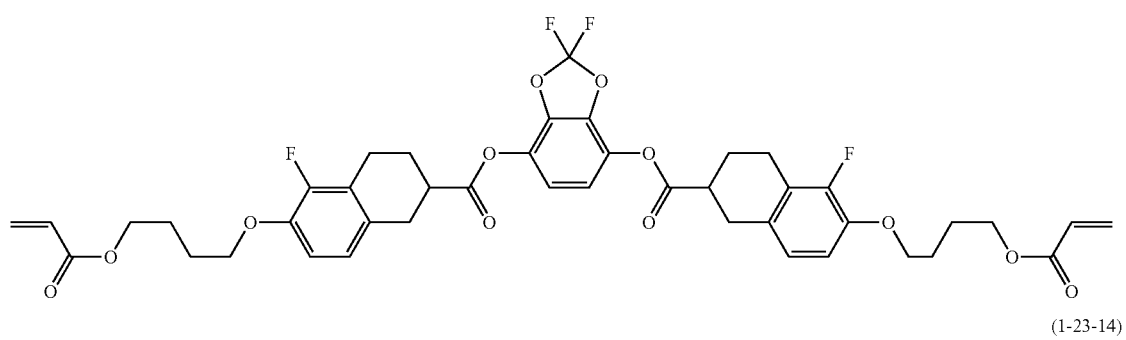
(1-23-14)
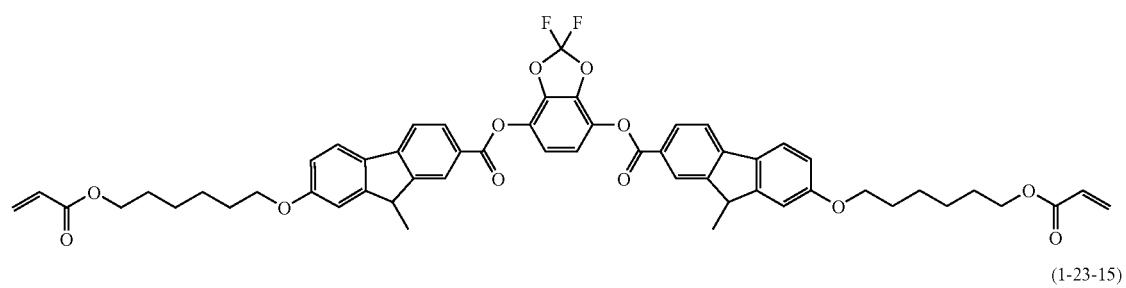
(1-23-15)
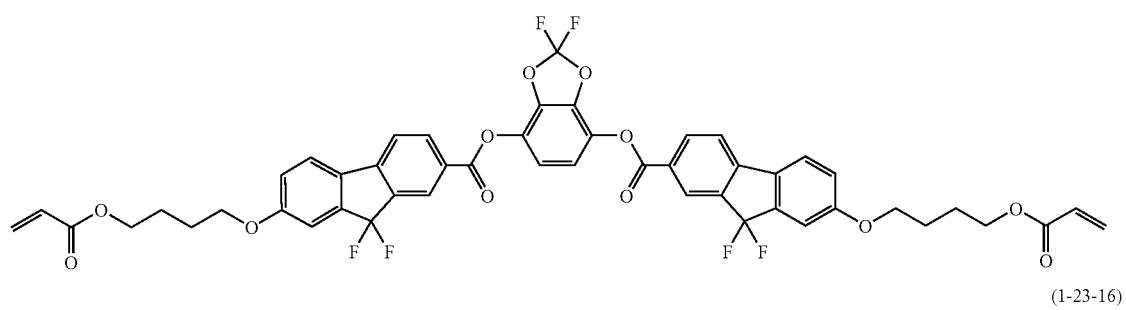
(1-23-16)
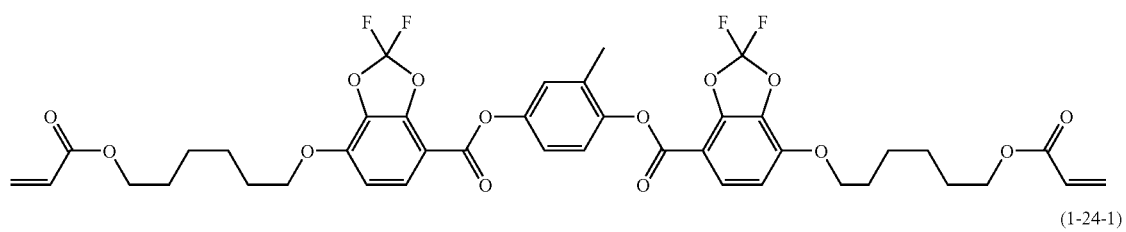
(1-24-1)
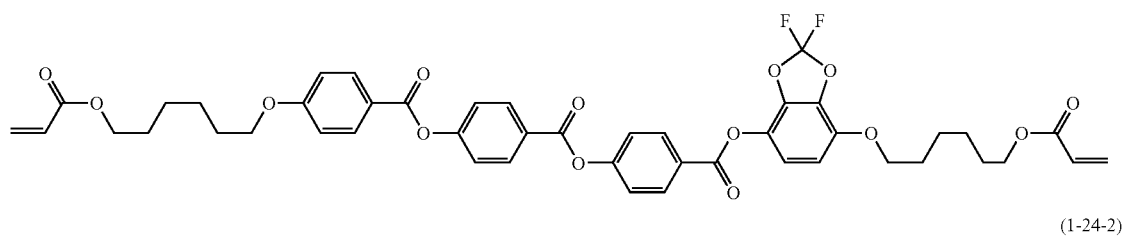
(1-24-2)
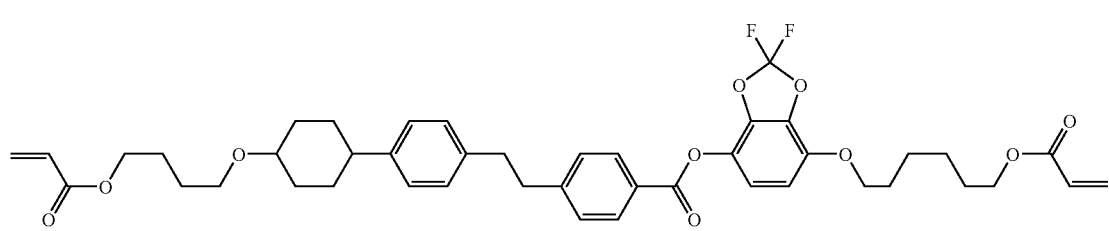

-continued
(1-24-3)
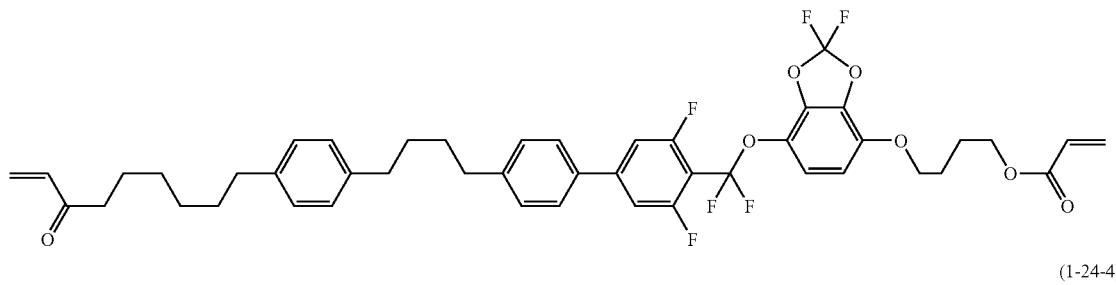
(1-24-4)
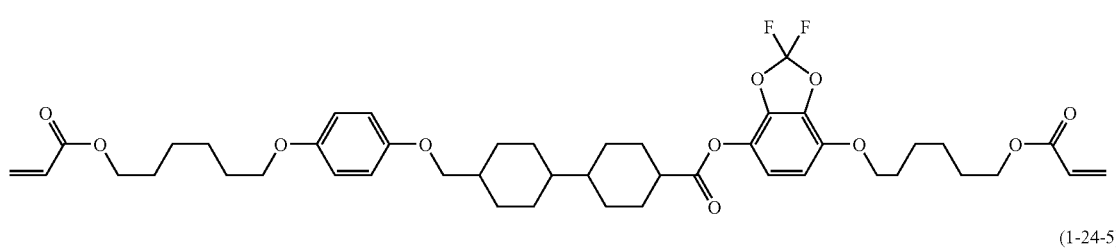
(1-24-5)
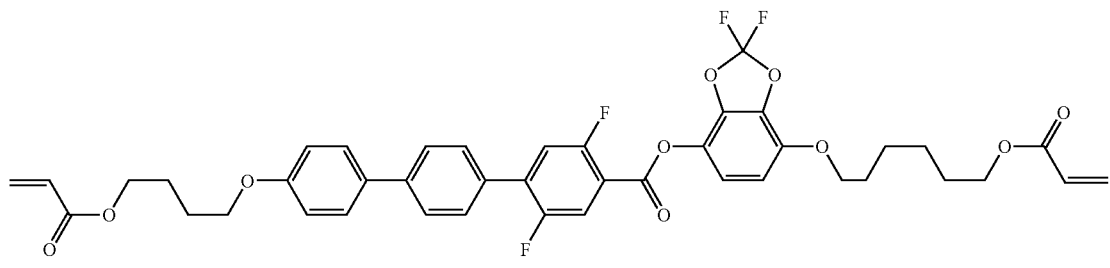
(1-24-6)
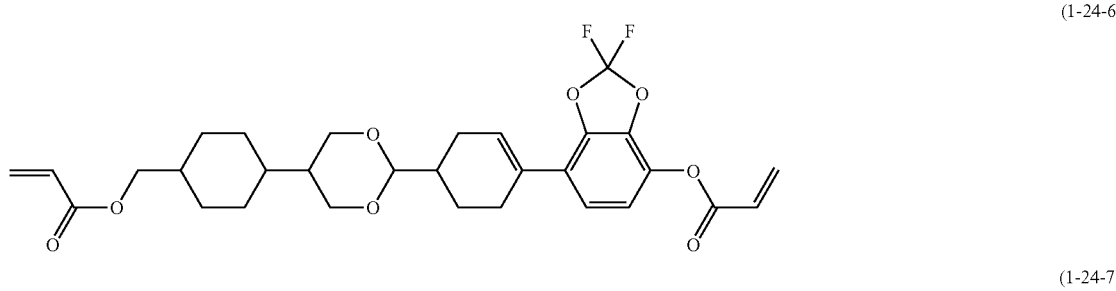
(1-24-7)
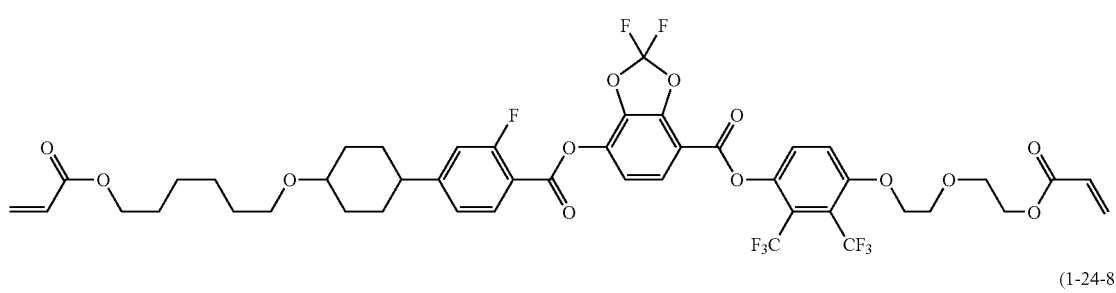
(1-24-8)
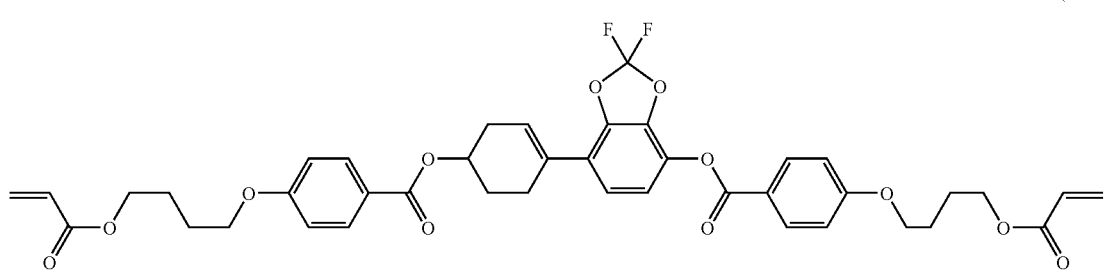

(1-24-9)
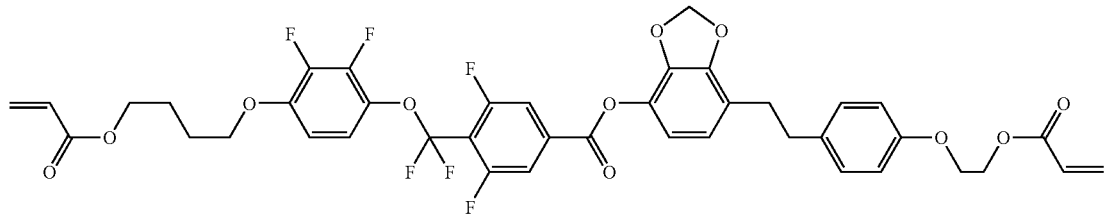
(1-24-10)
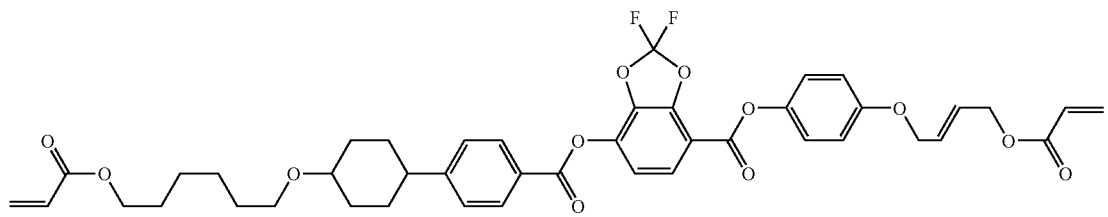
(1-24-11)
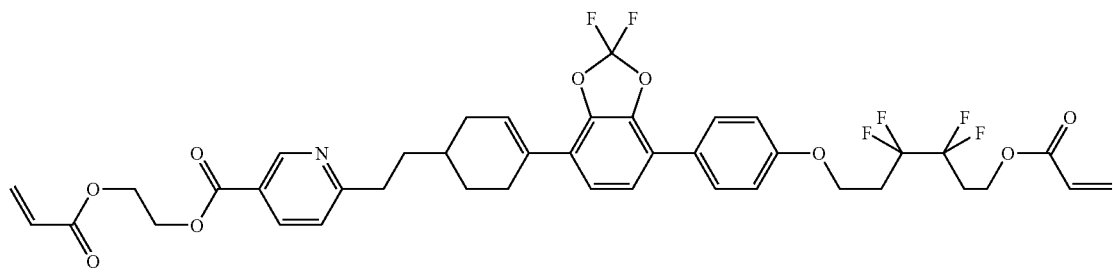
(1-24-12)
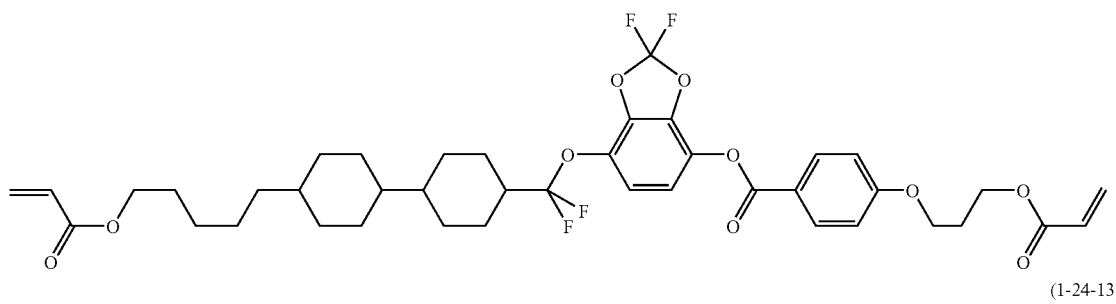
(1-24-13)
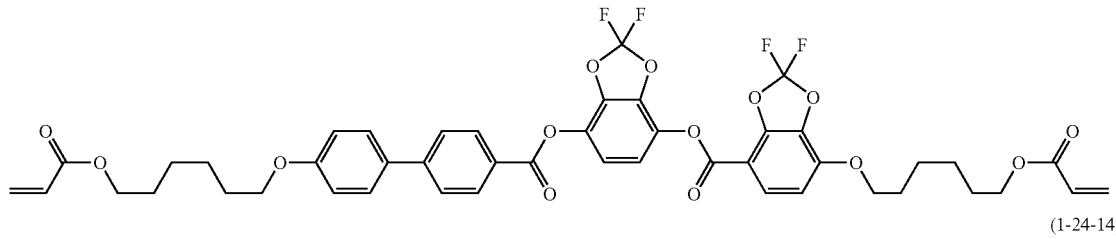
(1-24-14)
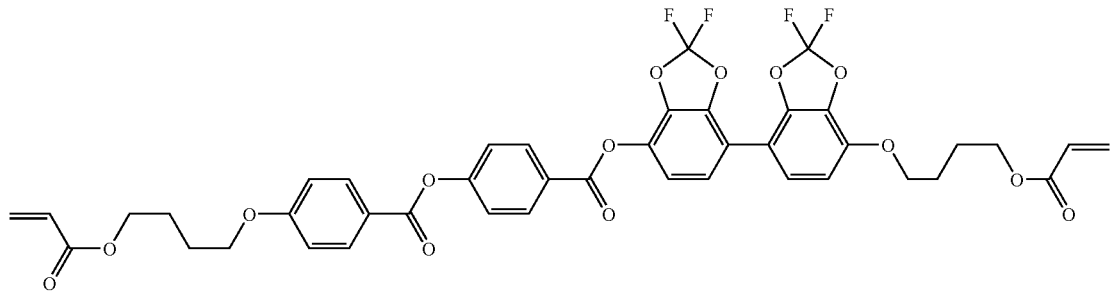

-continued
(1-24-15)
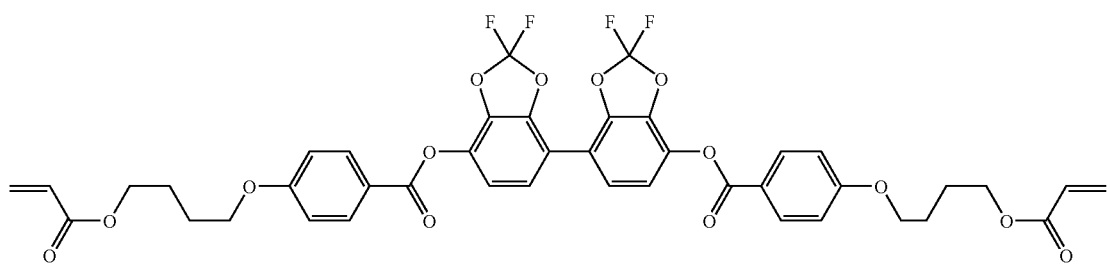
(1-24-16)
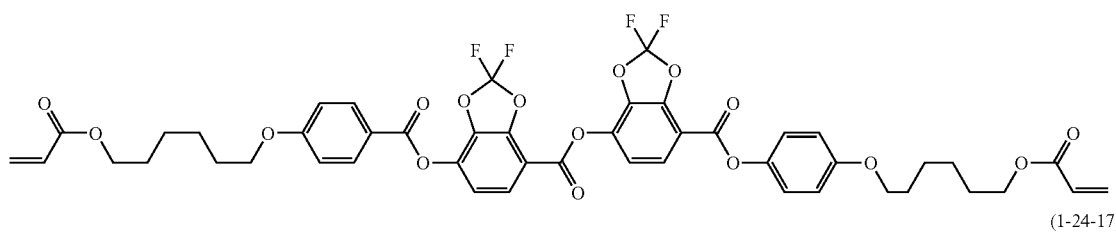
(1-24-17)
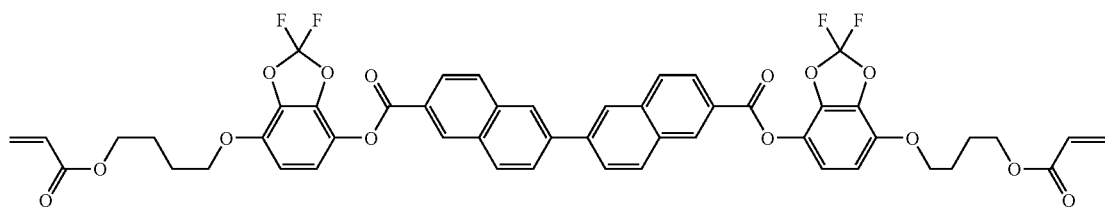
(1-25-1)
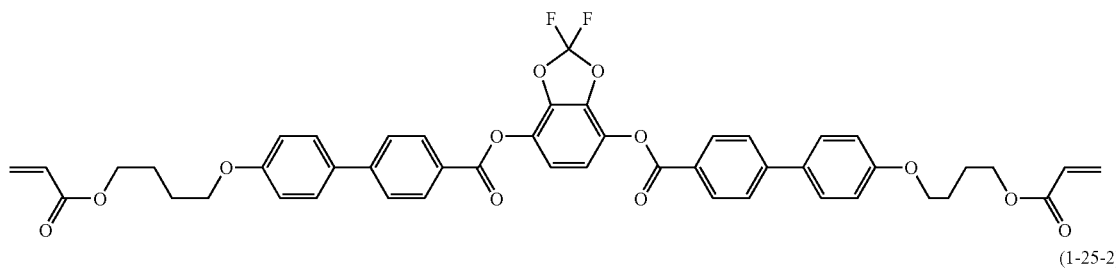
(1-25-2)
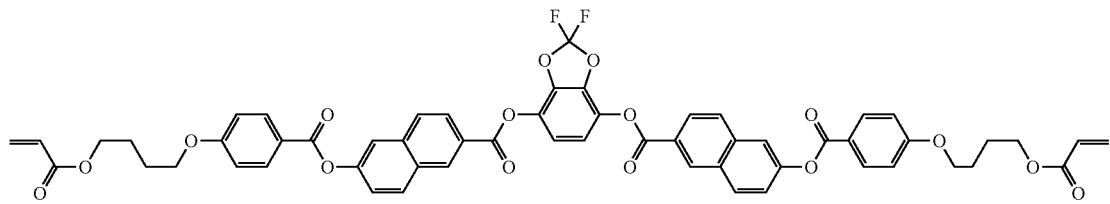
(1-25-3)
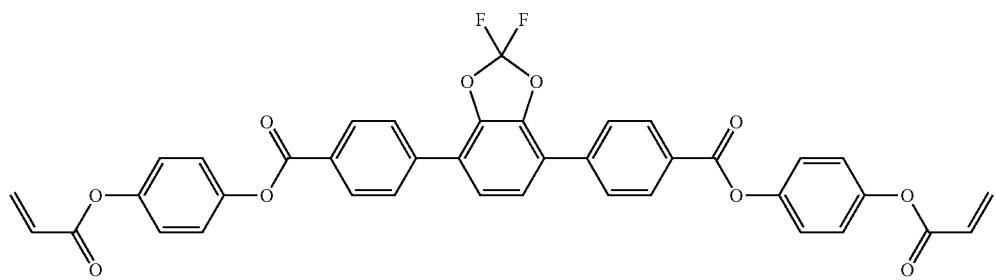

-continued
(1-25-4)
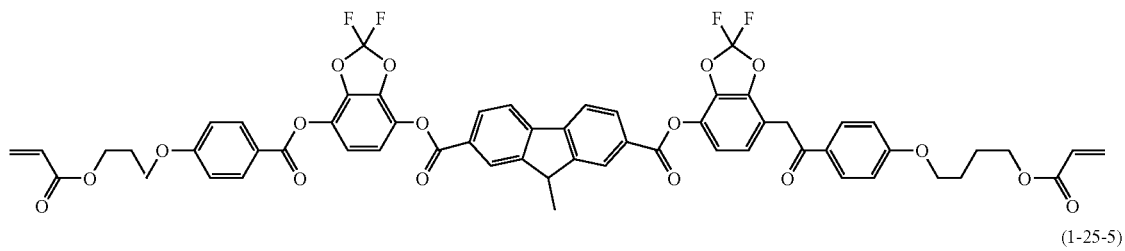
(1-25-5)
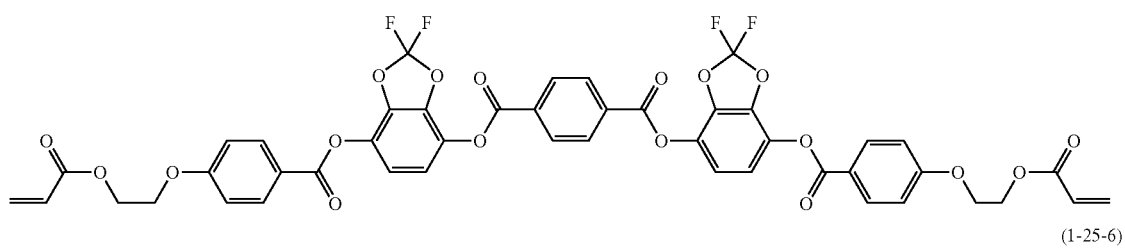
(1-25-6)
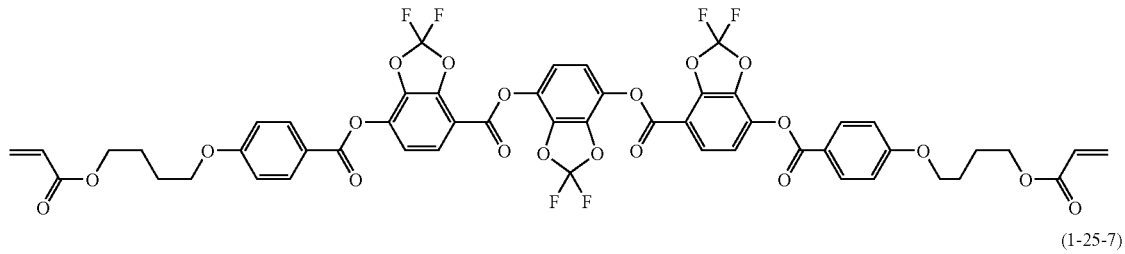
(1-25-7)
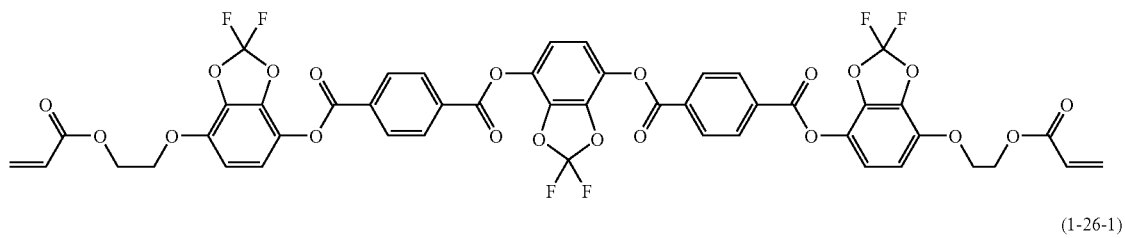
(1-26-1)
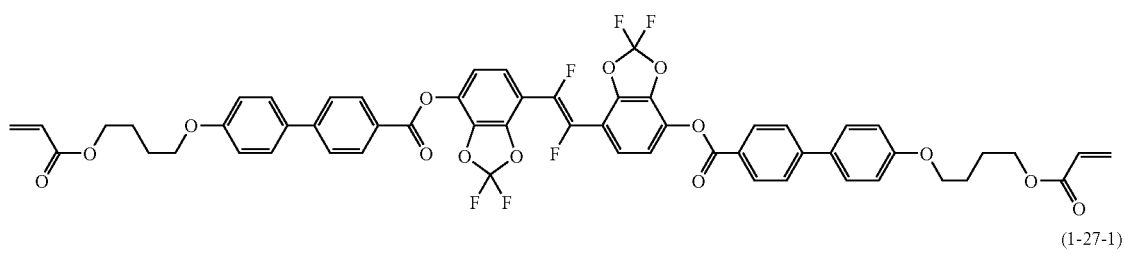
(1-27-1)
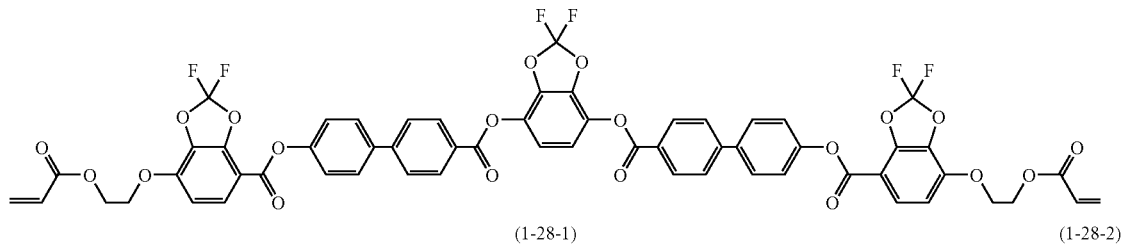
(1-28-1)      (1-28-2)
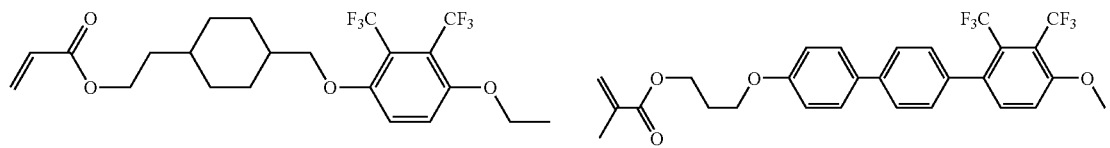

-continued
(1-28-3)
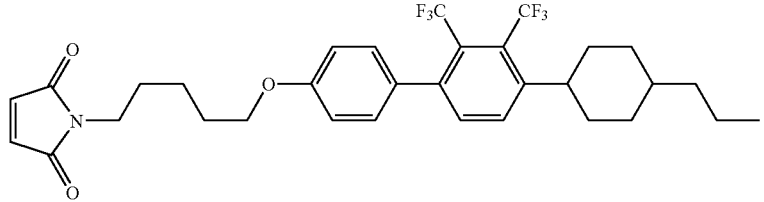
(1-28-4)
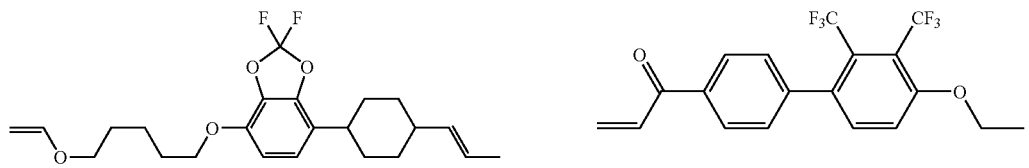
(1-28-5)
(1-28-6)
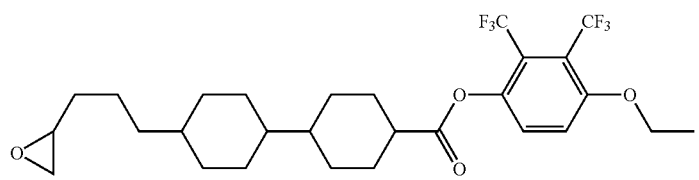
(1-28-7)
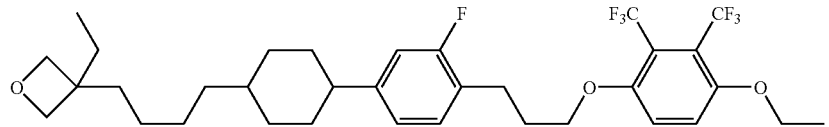
(1-28-8)
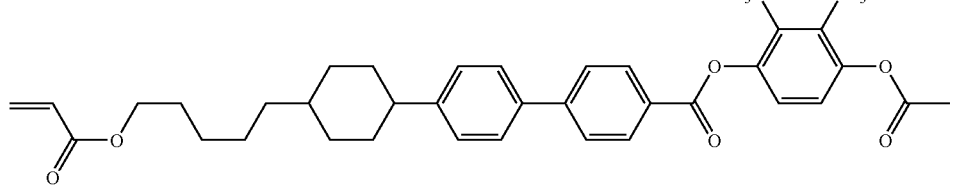
(1-28-10)
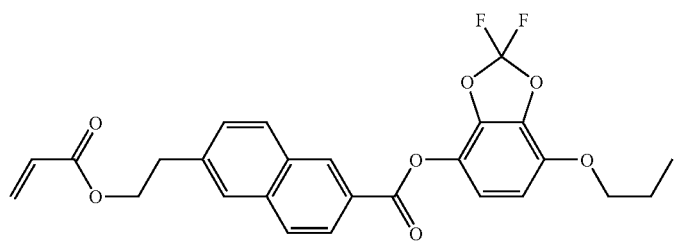
(1-28-11)
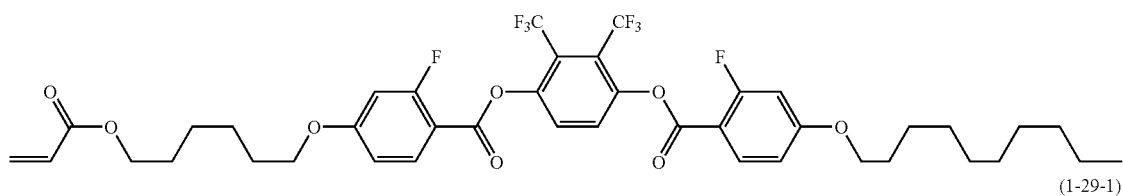
(1-29-1)
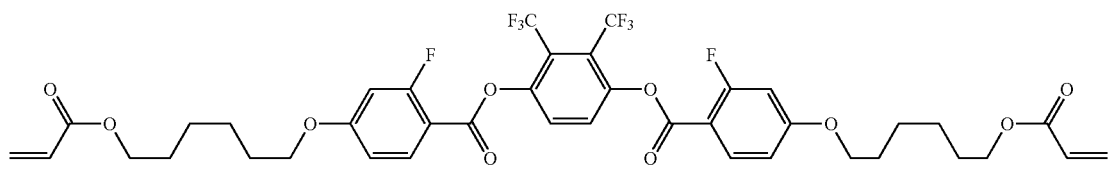
C 59.1 N 69.1 Iso -continued
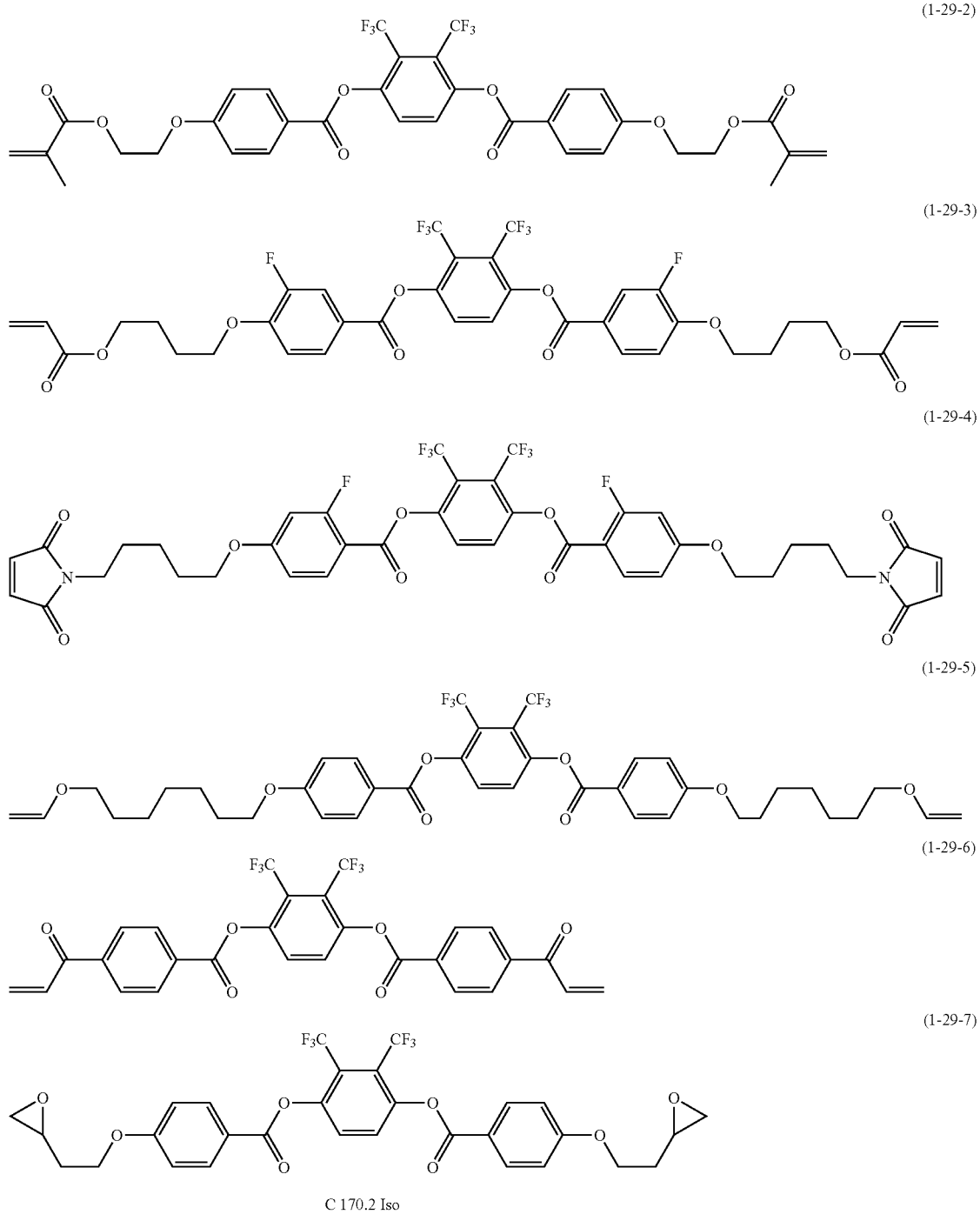
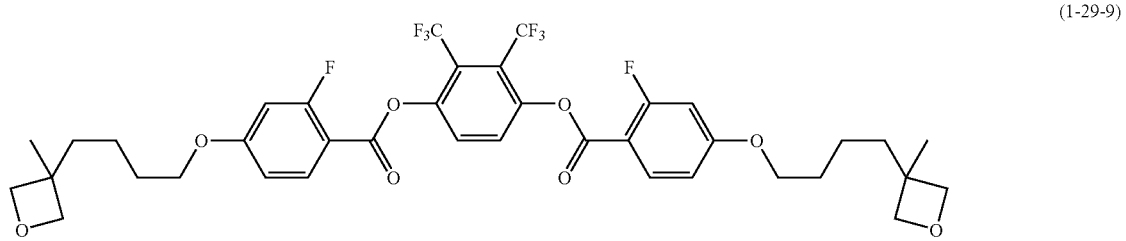

-continued
(1-29-10)
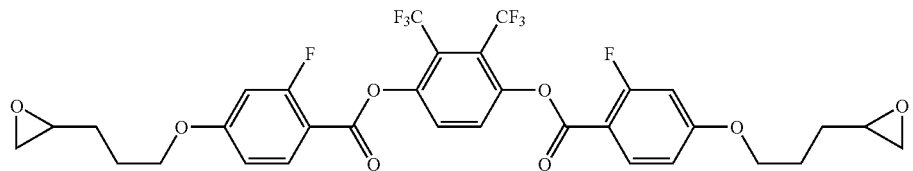
(1-29-11)
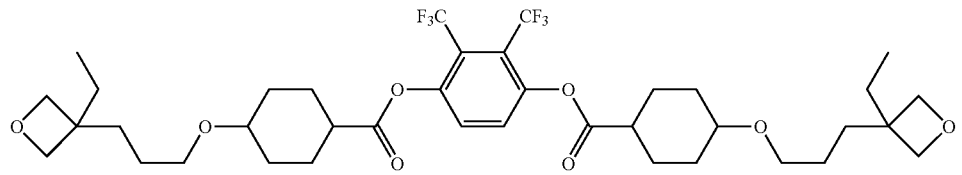
(1-30-1)
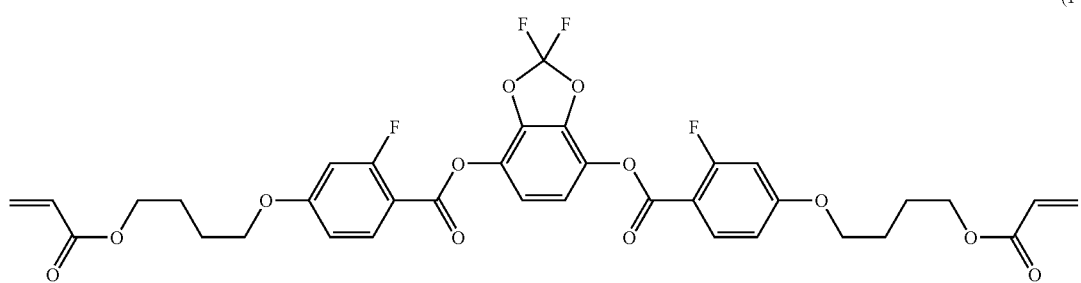
(1-30-2)
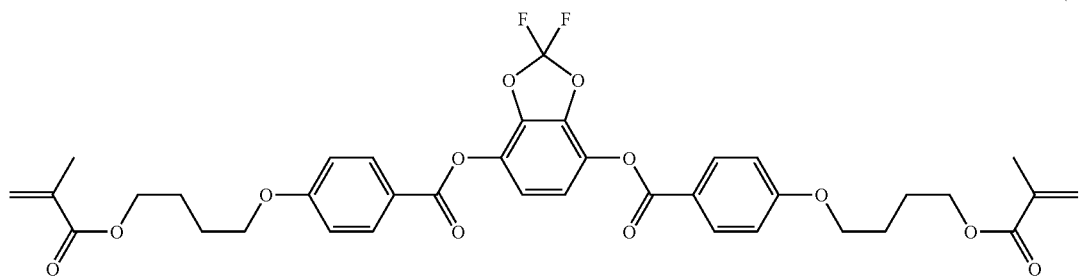
(1-30-3)
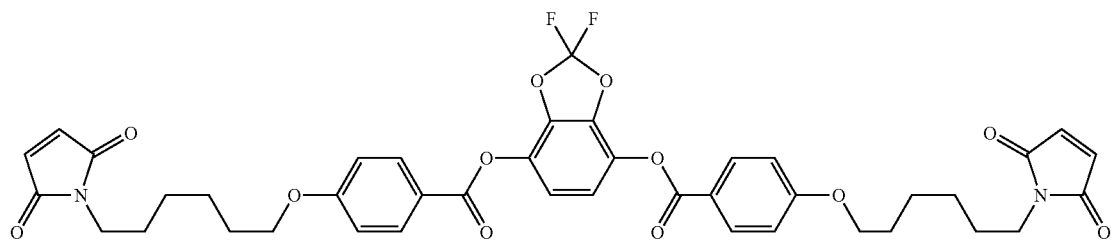
(1-30-4)
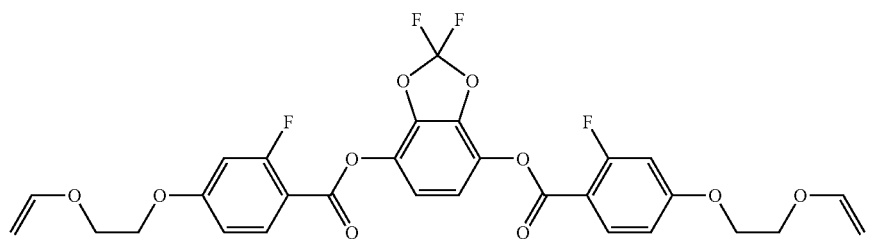

-continued
(1-30-5)
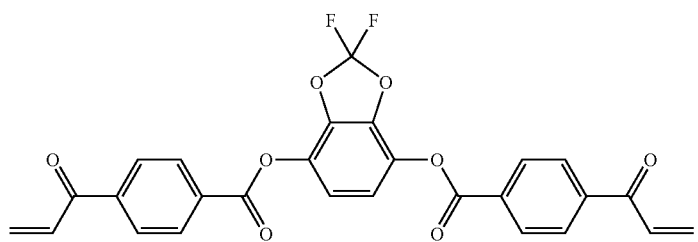
(1-30-6)
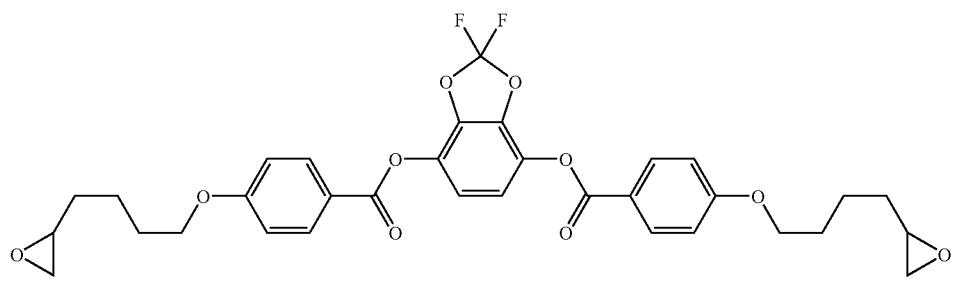
(1-30-7)
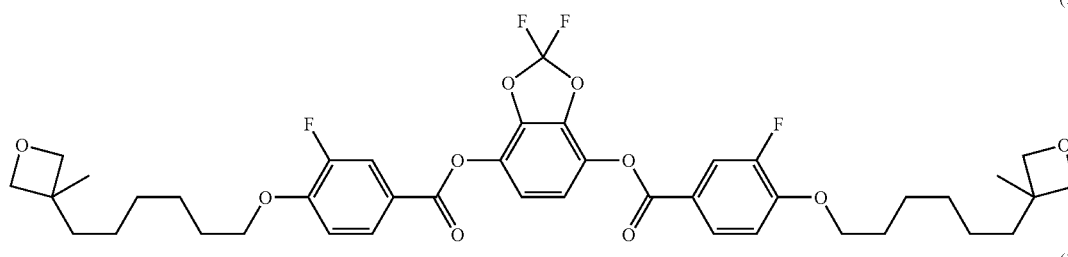
(1-30-8)
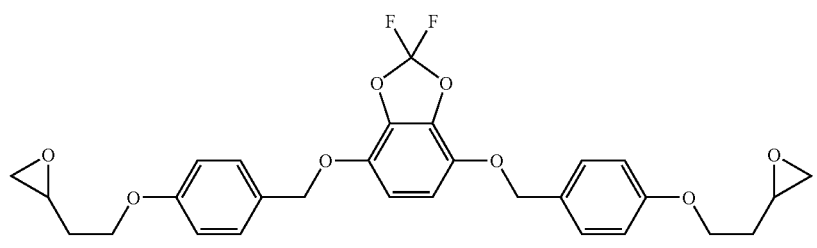
(1-31-1)
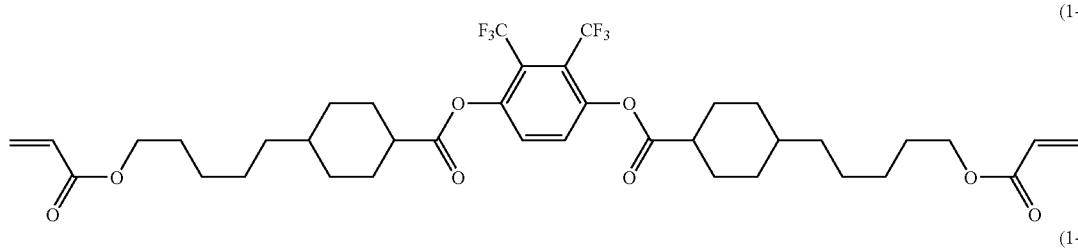
(1-31-2)
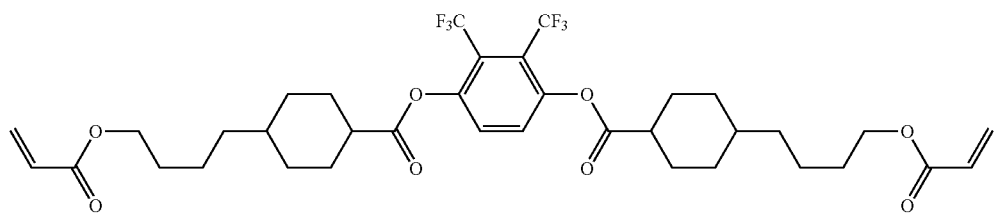
(1-31-3)
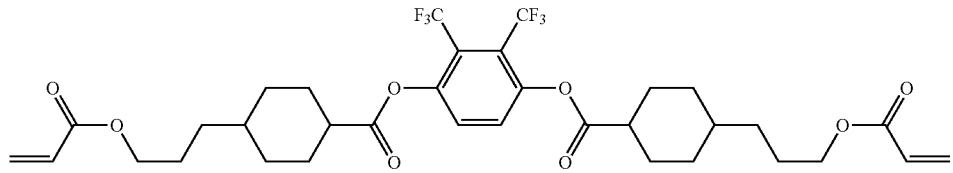

-continued
(1-31-4)
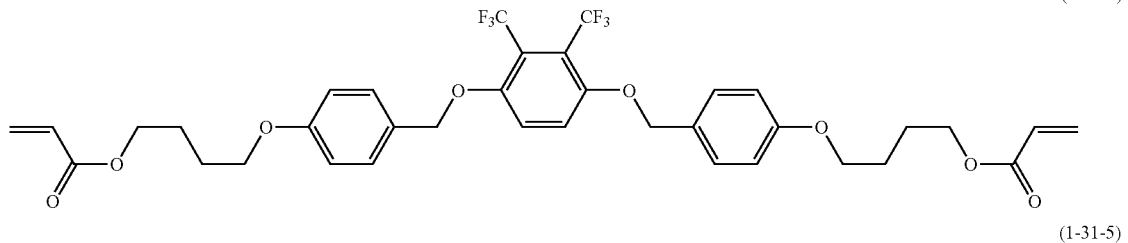
(1-31-5)
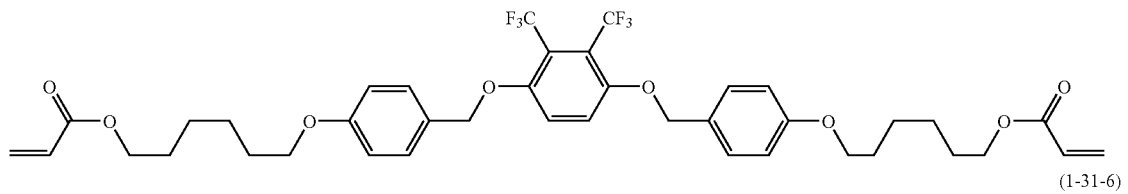
(1-31-6)
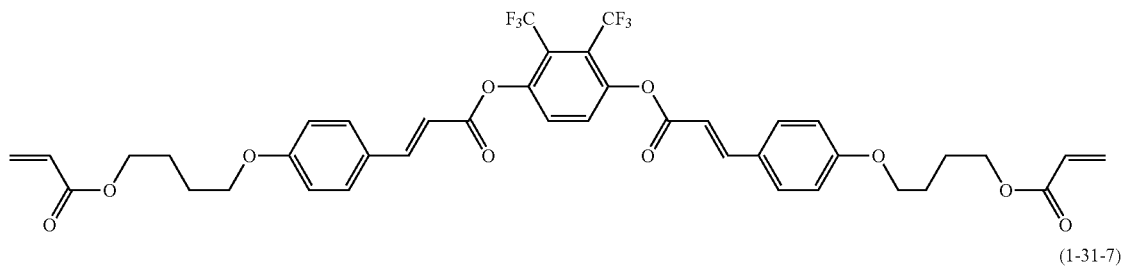
(1-31-7)
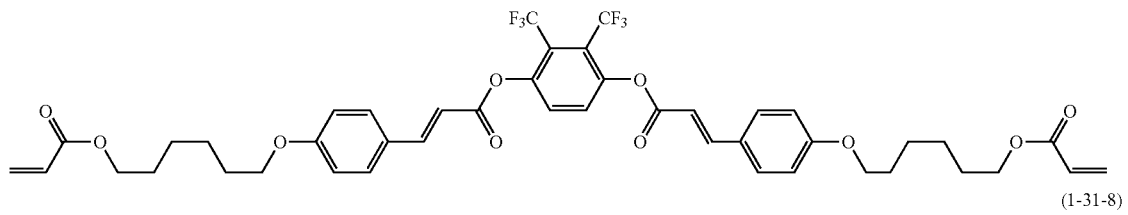
(1-31-8)
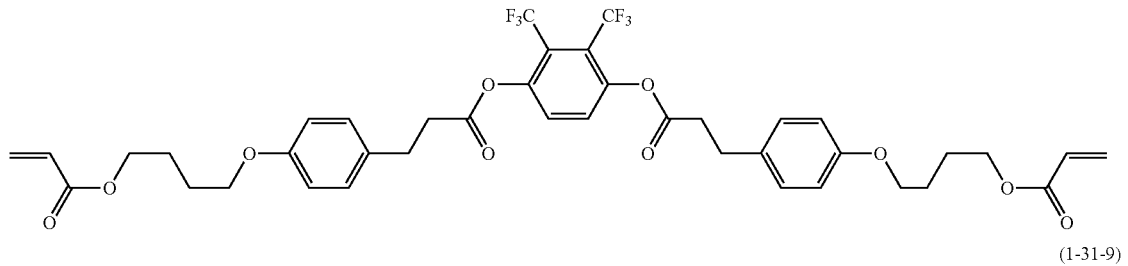
(1-31-9)
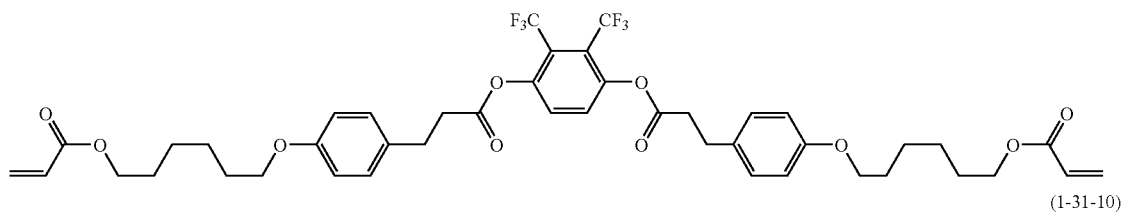
(1-31-10)
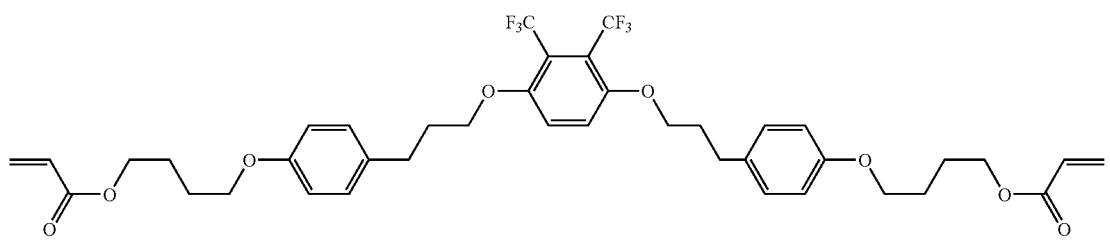

-continued
(1-31-11)
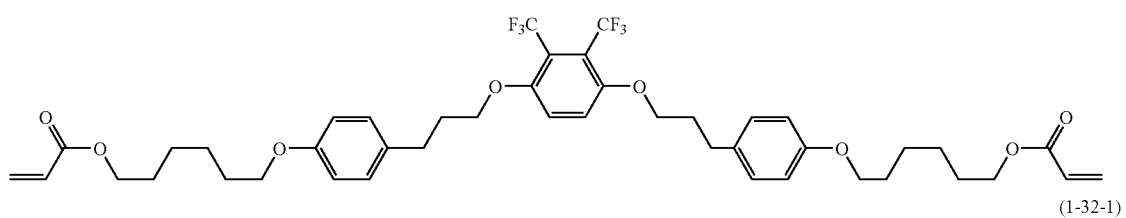
(1-32-1)
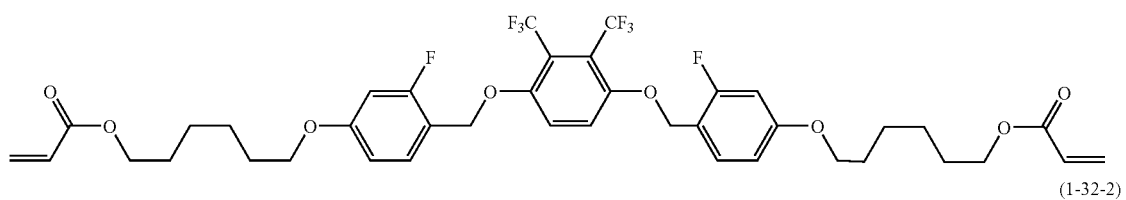
(1-32-2)
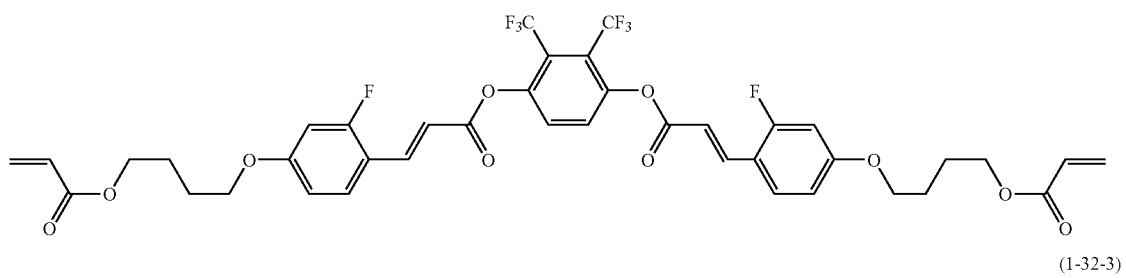
(1-32-3)
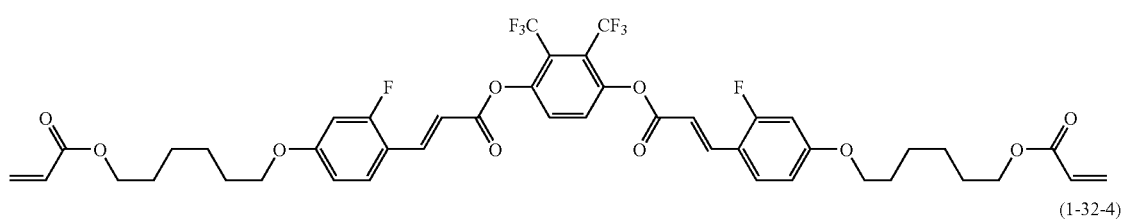
(1-32-4)
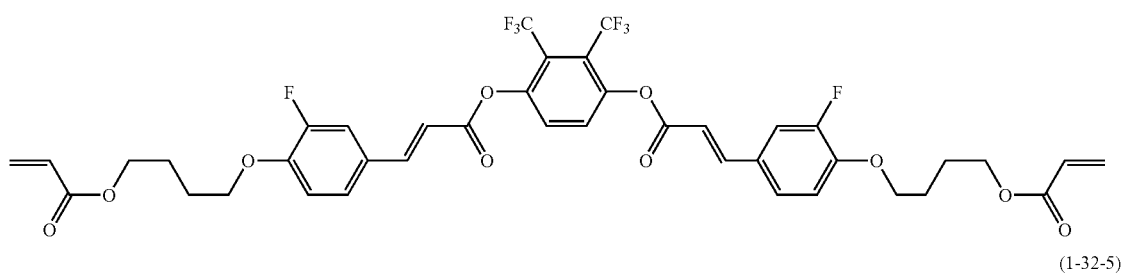
(1-32-5)
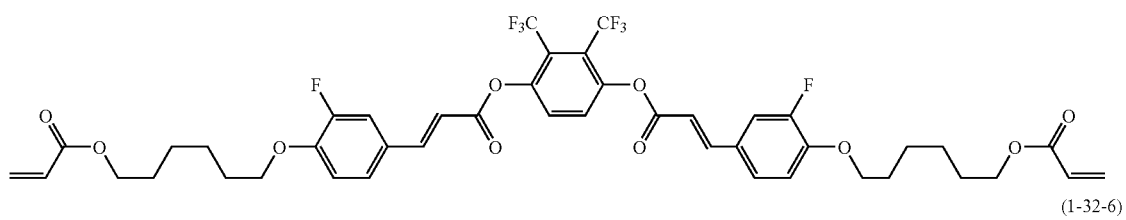
(1-32-6)
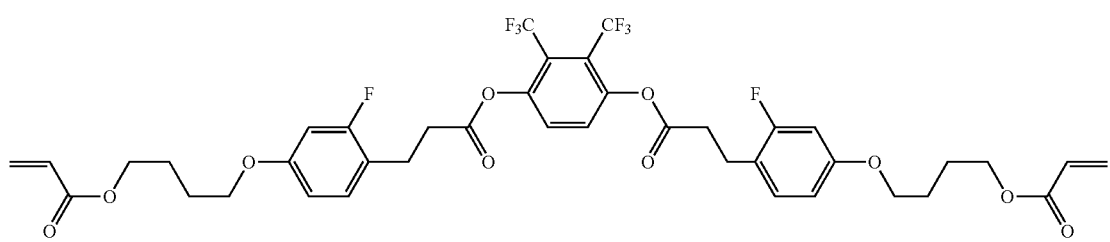

-continued
(1-32-7)
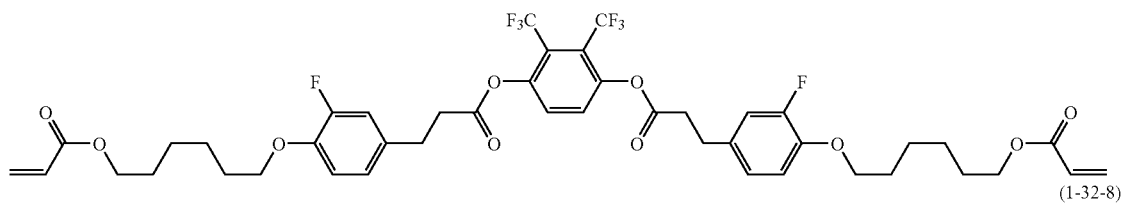
(1-32-8)
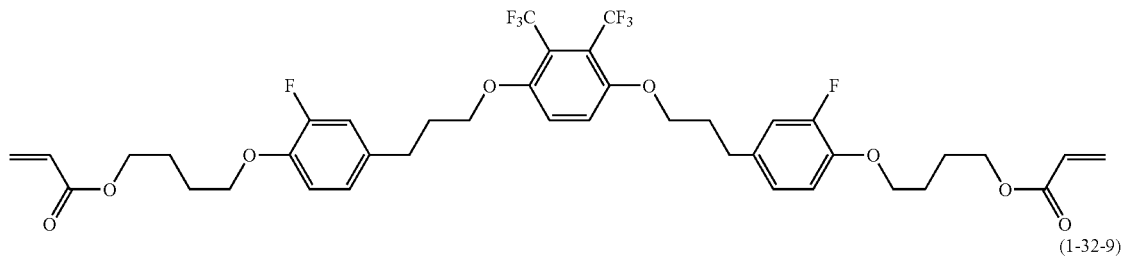
(1-32-9)
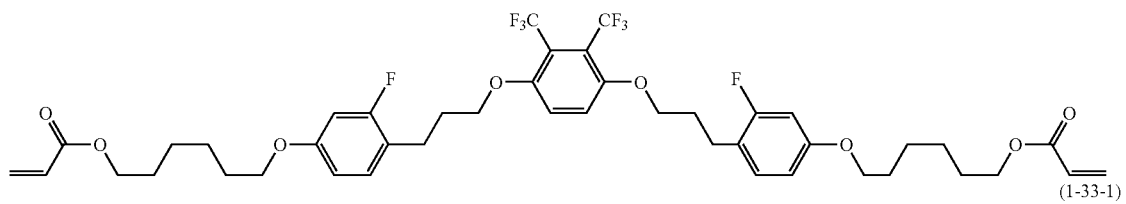
(1-33-1)
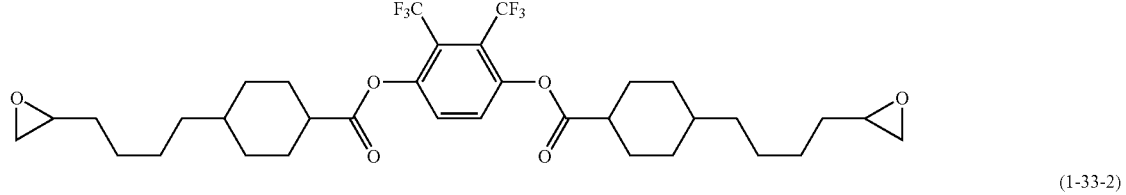
(1-33-2)
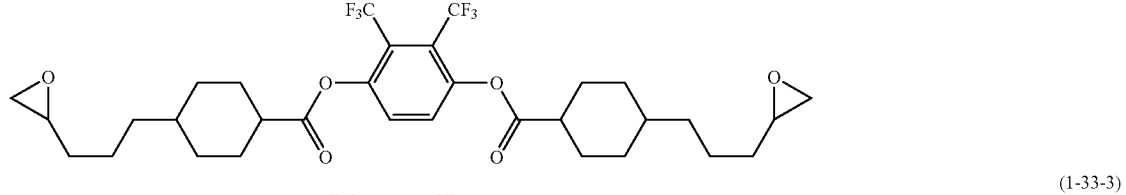
(1-33-3)
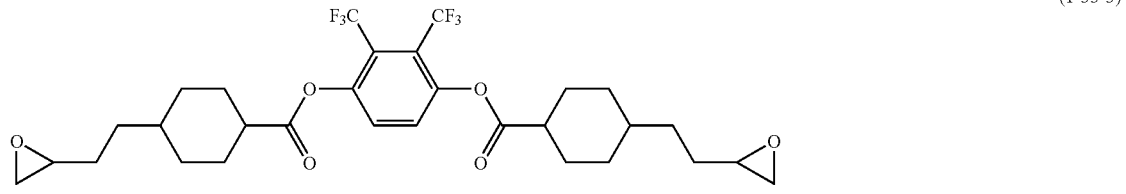
(1-33-4)
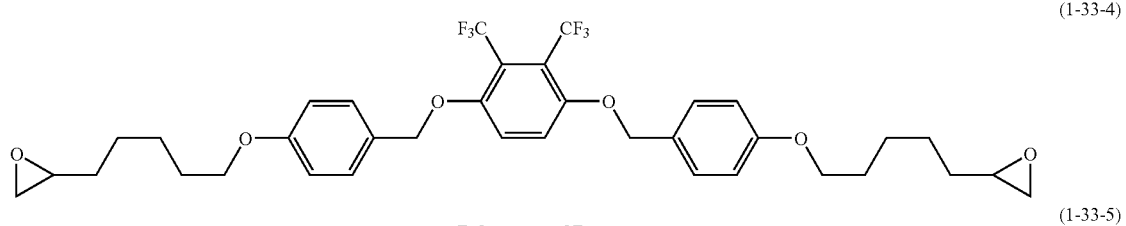
(1-33-5)
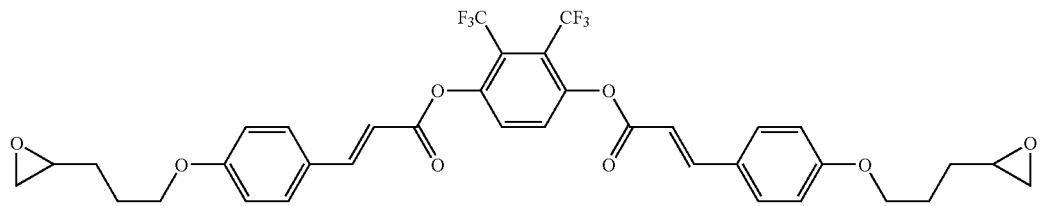

-continued
(1-33-6)
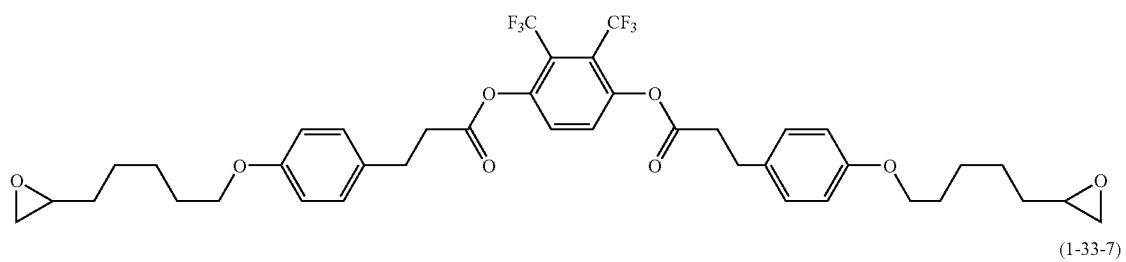
(1-33-7)
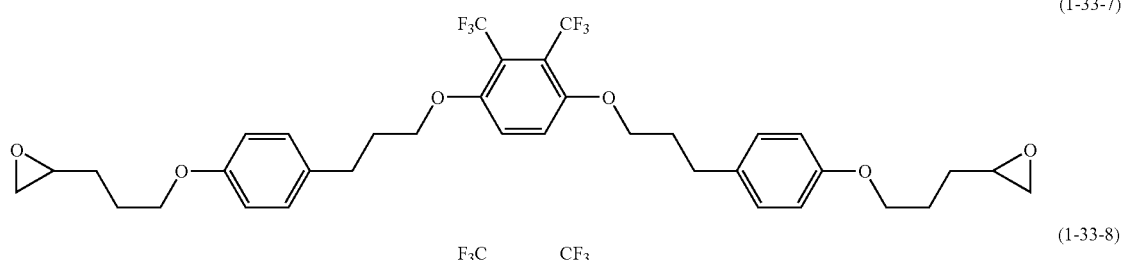
(1-33-8)
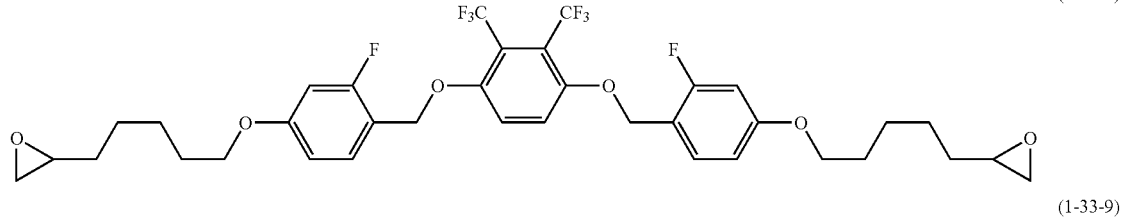
(1-33-9)
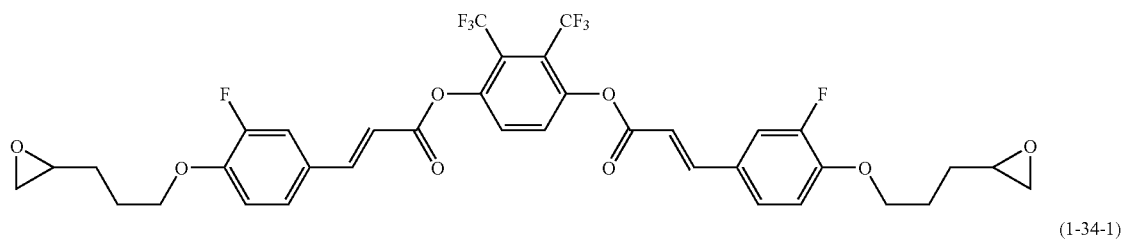
(1-34-1)
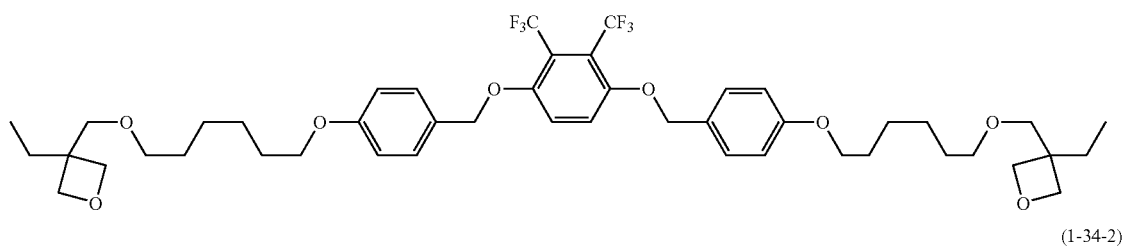
(1-34-2)
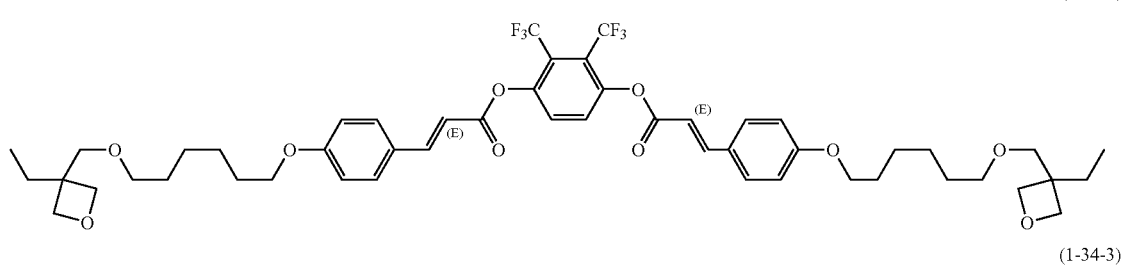
(1-34-3)
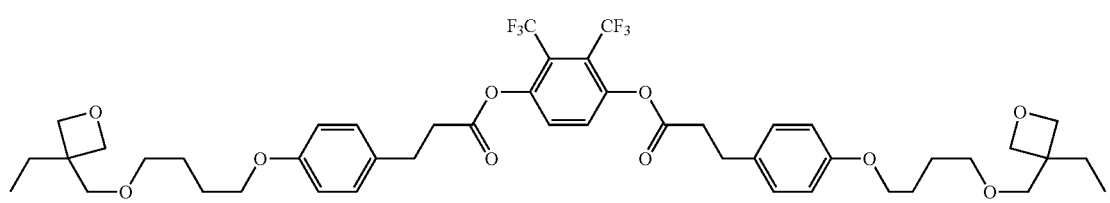

-continued

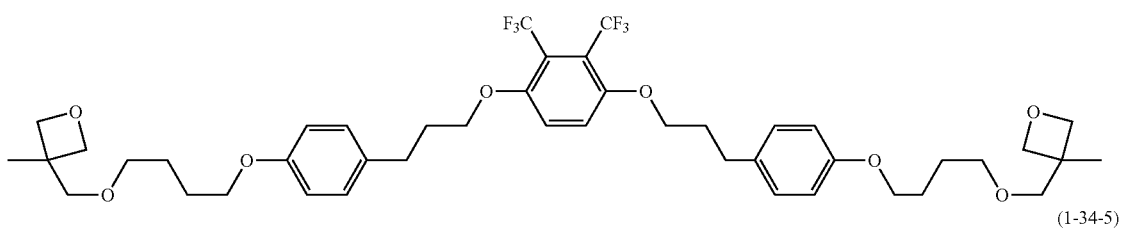
(1-34-4)

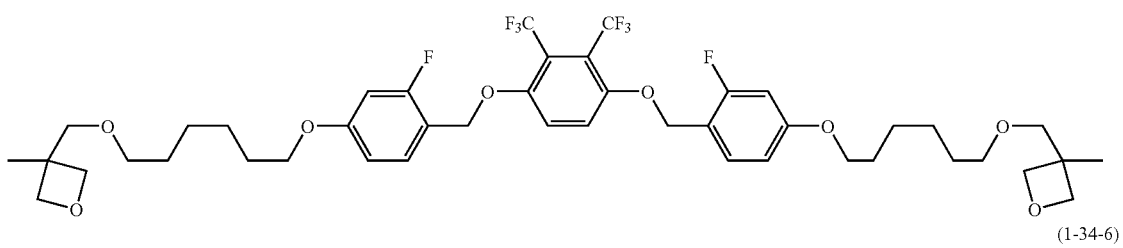
(1-34-5)

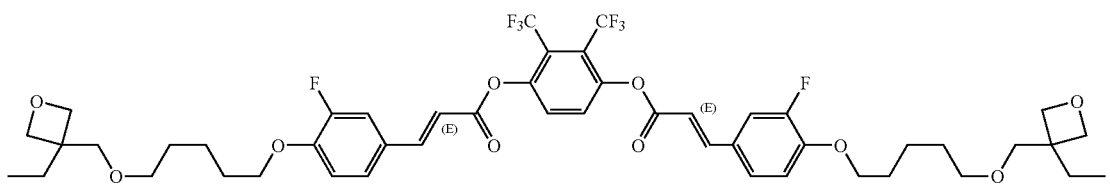
(1-34-6)

Example 3

Compound (1-13-7) 27 parts by weight produced in Example 1, a compound (A) 40 parts by weight, a compound (B) 30 parts by weight and a photopolymerization initiator (Irgacure 907 manufactured by Ciba Specialty Chemicals Co., Ltd.) 3 parts by weight were mixed to prepare a polymerizable liquid crystal composition (C). The composition thus obtained had a nematic phase in a temperature range of 52 to 100° C.

was injected into the above cell on a hot plate heated to 60° C. The cell staying in the above state was observed under a polarization microscope to confirm that the uniform homogeneous alignment thereof have no defects. Further, the retardation was determined by means of a Berek compensator to obtain a value of 890 nm. Further, this was disposed on a hot plate heated to 60° C. and irradiated with a UV ray of 365 nm at an intensity of 30 mW/cm² for 10 seconds by means of an extra high pressure mercury lamp as a light source to polymerize the composition (C). The polymer thus

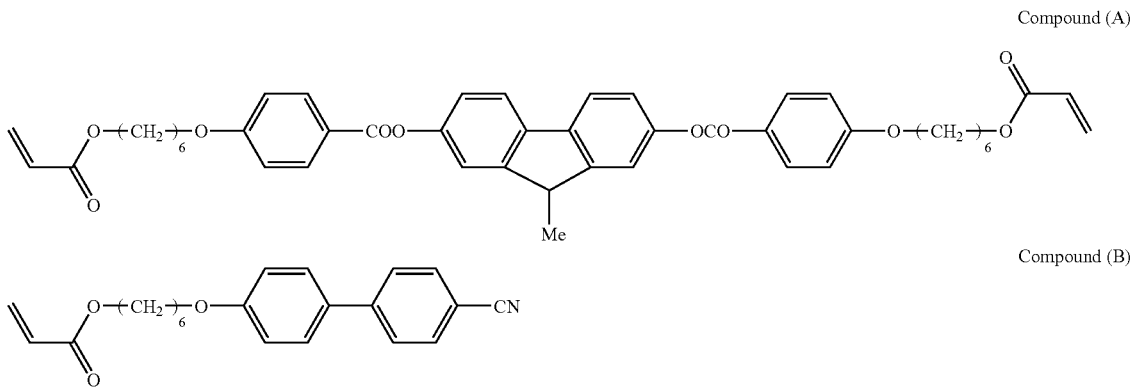

Example 4

Two plates of glass substrates having a polyimide aligning film treated with rubbing treatment were oppositely disposed at an interval of 5 μm, such that a an angle of the rubbing direction was 180 degrees, to prepare a cell. The polymerizable liquid crystal composition (C) obtained in Example 3 obtained was observed under a polarization microscope to ensure that homogeneous alignment was evenly maintained without defects. Further, the retardation was determined by means of the Berek compensator to confirm that it remained unchanged compared to that before the polymerization and that the retardation was scarcely changed even when treated at 150° C. for 10 minutes.

Example 5

The composition (C) obtained in Example 3 was dissolved in 200 parts by weight of cyclopentanone to prepare a solution having a concentration of about 33% by weight. The above solution was coated on a glass substrate having a polyimide aligning film treated with rubbing alignment treatment. The coating was performed by means of a bar coater by which a wet film thickness of about 12 μm was obtained. This was put on a hot plate heated to 70° C. for 120 seconds to dry the solvent and carry out liquid crystal alignment. Further, this was irradiated with a light having an intensity of 30 mW/cm$^2$ (a central wavelength of 365 nm) for 20 seconds at a room temperature by means of an extra high pressure mercury lamp of 250 W/cm and polymerized in nitrogen atmosphere. The optical thin film thus obtained was observed under a polarization microscope to confirm that uniform homogeneous alignment have no alignment defects. The retardation was determined by means of the Berek compensator to obtain a value of 212 nm. Further, the above optical thin film was interposed between cross-nicol polarizers so that an angle formed by a rubbing direction and an absorbing axis of the polarizer was 45° to observe the state of transmission of light on a back light. The state of transmission of light was observed while inclining to the rubbing direction to confirm that the change was symmetrical at left and right sides with the front face as the center??. This indicates that an aligning vector of a liquid crystal skeleton in the above optical thin film is horizontal to the glass substrate, that is, homogeneous alignment is achieved.

Example 6

The photopolymerization initiator Irgacure 907 (manufactured by Ciba Specialty Chemicals Co., Ltd.) 3 parts by weight was added to a photopolymerizable composition comprising Compound (1-13-7) 25 parts by weight, the compound (A) 35 parts by weight, the compound (B) 25 parts by weight and Compound (OP-15) 12 parts by weight. The above photopolymerizable composition containing the photopolymerization initiator was dissolved in 200 parts by weight of cyclopentanone to prepare a solution having a concentration of about 33% by weight. The above solution was coated on a glass substrate having a polyimide aligning film treated with rubbing alignment treatment. The coating was performed by means of a bar coater by which a wet film thickness of about 12 μm was obtained. This was put on a hot plate heated to 70° C. for 120 seconds to dry the solvent and carry out liquid crystal alignment. Further, this was irradiated with a light having an intensity of 30 mW/cm$^2$ (a central wavelength of 365 nm) for 20 seconds by means of an extra high pressure mercury lamp of 250 W/cm and polymerized in nitrogen atmosphere while heating at 70° C. on the hot plate. As a result thereof, an optical thin film showing red selective reflection was obtained.

Example 7

Compound (1-13-7) (10 mg) produced in Example 1, azobiscyclohexanecarbonitrile (0.1 mg) and benzene (100 μL) were put in a glass ampoule. This was cooled to −60° C. and sealed after sufficiently deaerating by means of a vacuum pump. The above ampoule was heated on a water bath of 70° C. for 24 hours. The resulting reaction mixture was reprecipitated three times from methanol (15 mL) to obtain a polymer (8.1 mg). The weight average molecular weight (Mw) measured by means of GPC was 30,000. The polydispersibility (Mw/Mn) was 1.99. The polymer (1.025 mg) was dipped in purified water (1 mL) and left standing at 50° C. for 10 days. The polymer was taken out and sufficiently dried, and the weight was measured and it was found to be 1.028 mg. It was found that the polymer has a small water absorption coefficient.

Example 8

The polymer 5 parts by weight produced in Example 7 was dissolved in NMP (N-methylpyrrolidone) 100 parts by weight. The above solution was coated separately on two plates of glass substrates, which were sufficiently washed in advance by means of a spin coater. These glass substrates were heated at 200° C. for 3 hours to remove the solvent, whereby the thin films of the polymer were formed on the glass substrate. The surfaces of these thin films of the polymer formed on the glass substrate were rubbed in one direction by means of a roller equipped with a rubbing cloth to subject them to rubbing treatment. Two plates of these glass substrates were stuck together with spacers having a thickness of 10 μm being interposed therebetween so that the thin films of the polymer were oppositely disposed and the rubbing directions were the same, whereby a cell was prepared. A liquid crystal composition ZLI-1132 manufactured by Merck Co., Ltd. was injected into the above cell at a room temperature. The liquid crystal composition contained in the liquid crystal cell showed even homogeneous alignment.

Example 9

The suitable examples of the composition prepared using the compounds of the present invention are described in Composition Example 1 to Composition Example 6. Any of these compounds can be polymerized by irradiating with a UV ray to obtain a molded article having an optical anisotropy. Percentage (%) composition in the following shows % by weight.

Composition Example 1

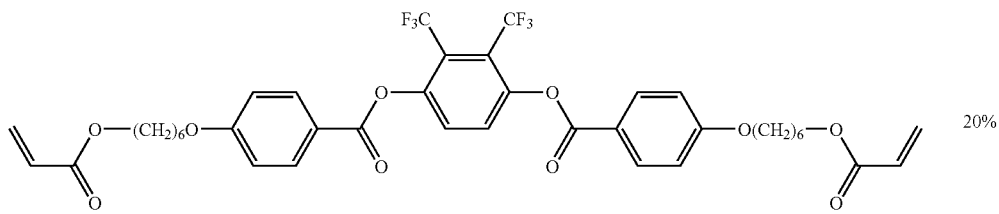

20%

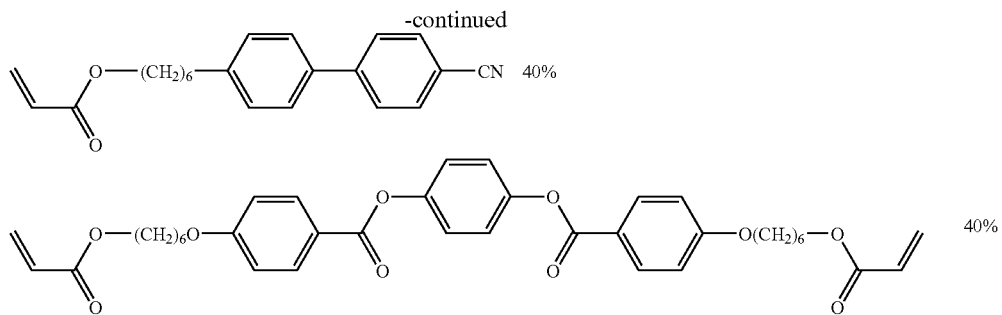
Composition Example 2
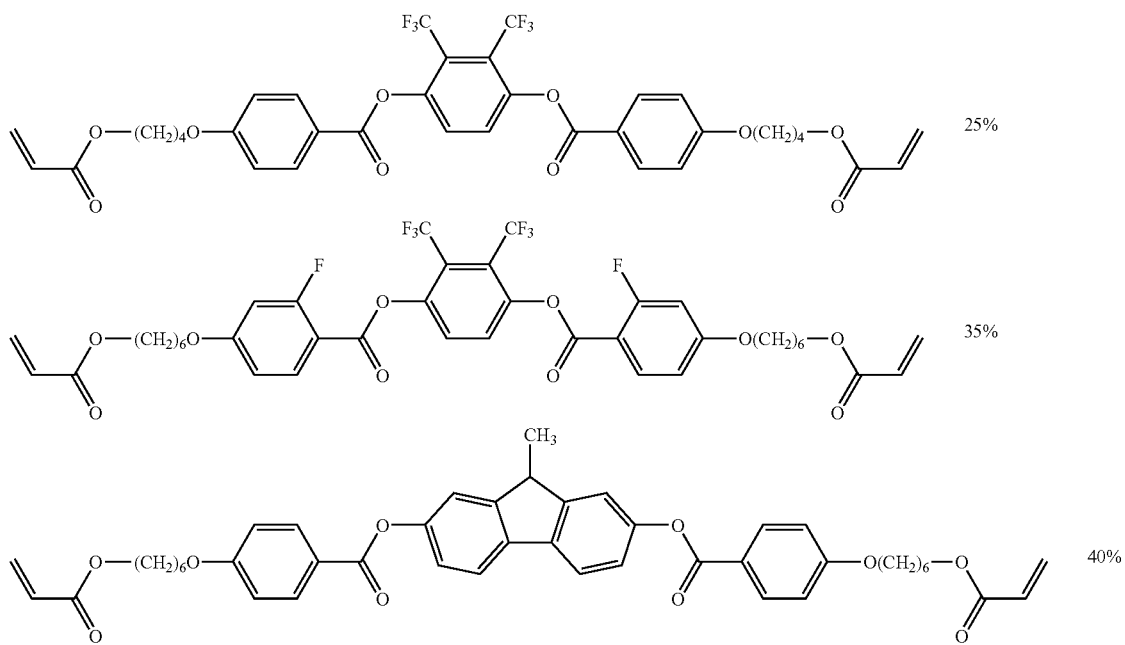
Composition Example 3
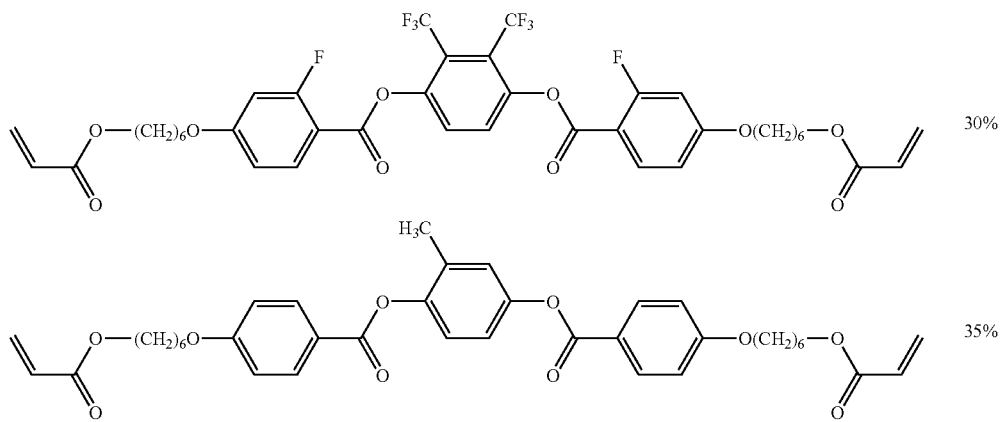

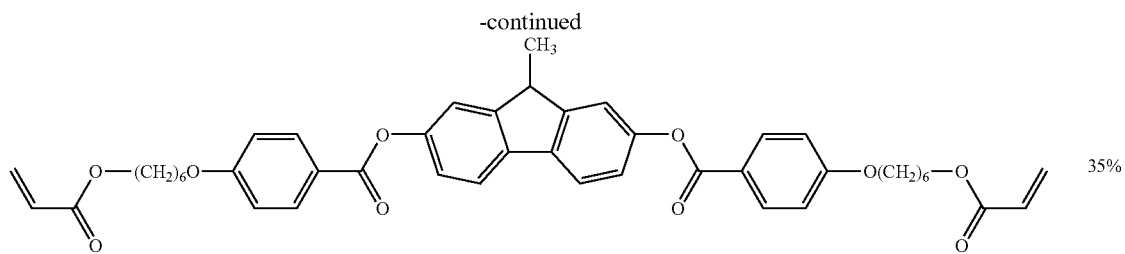 35%
Composition Example 4
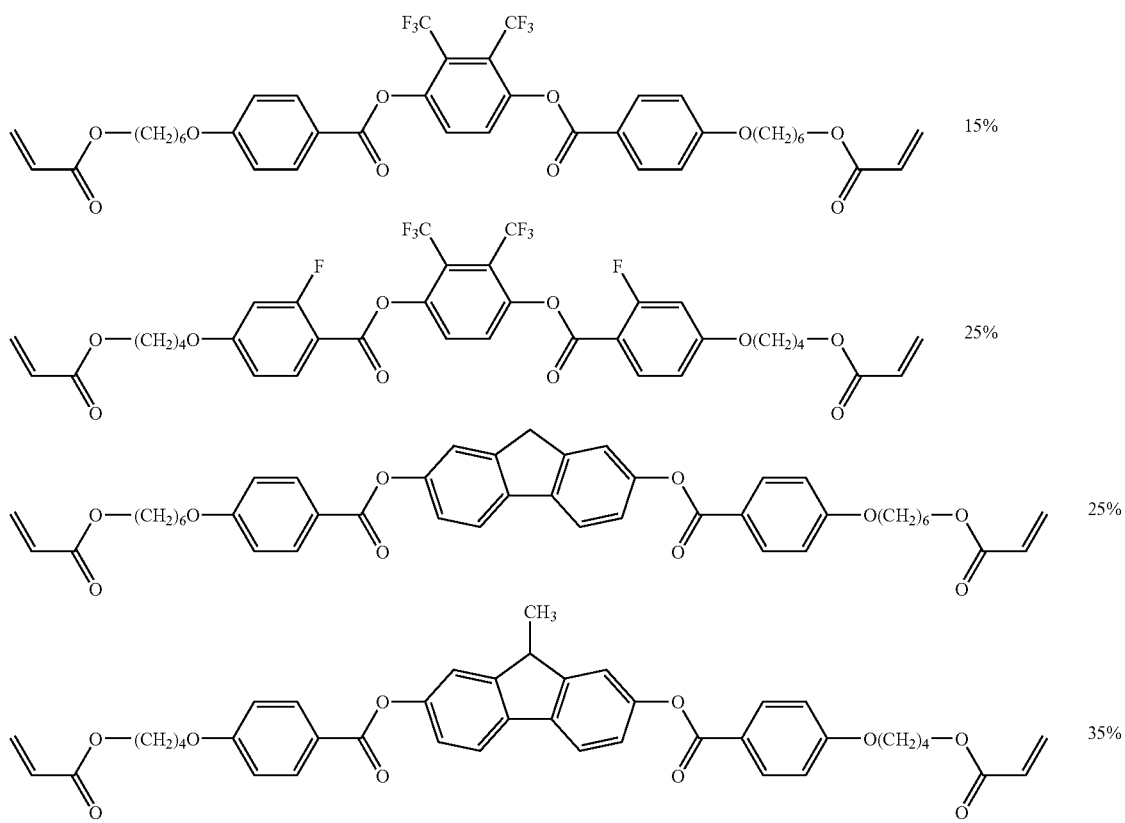
15%
25%
25%
35%
Composition Example 5
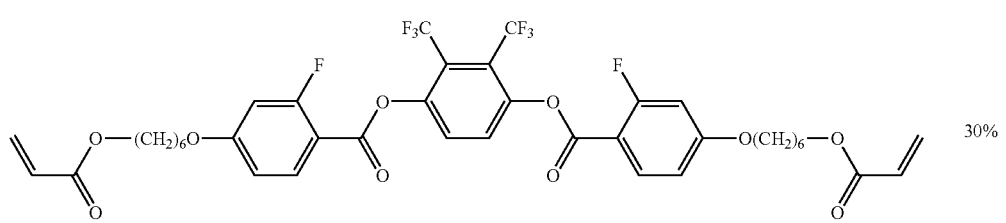 30%

-continued

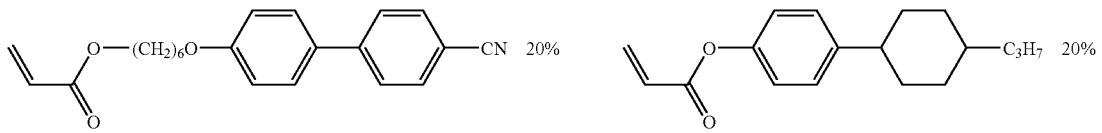 20%

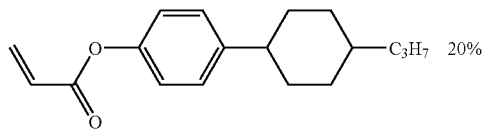 20%

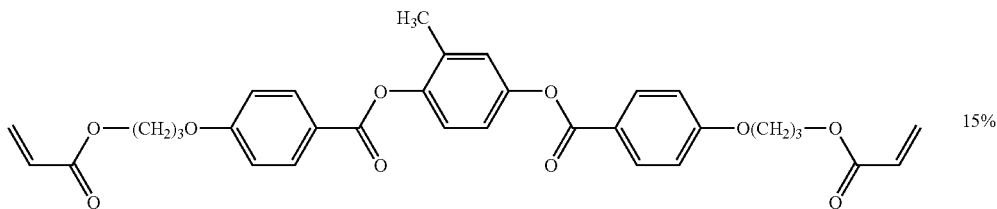 15%

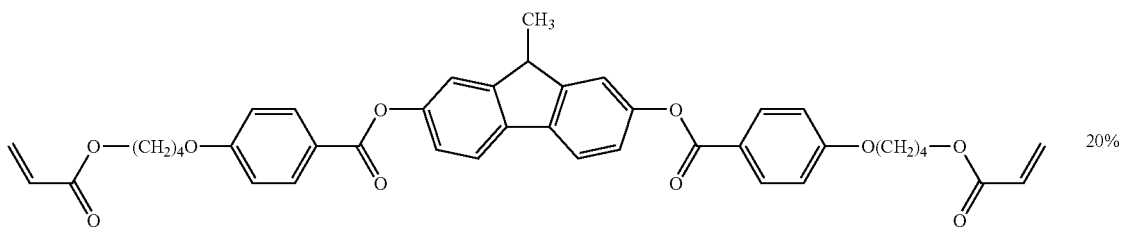 20%

Composition Example 6

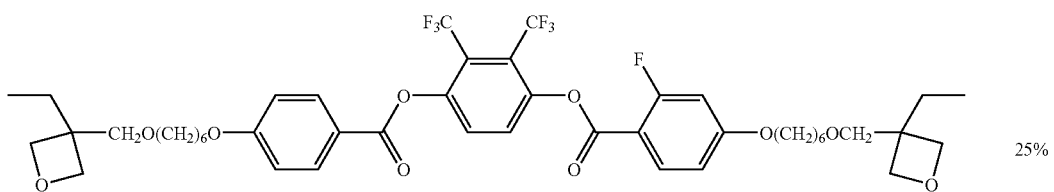 25%

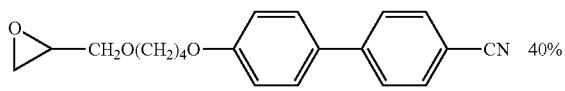 40%

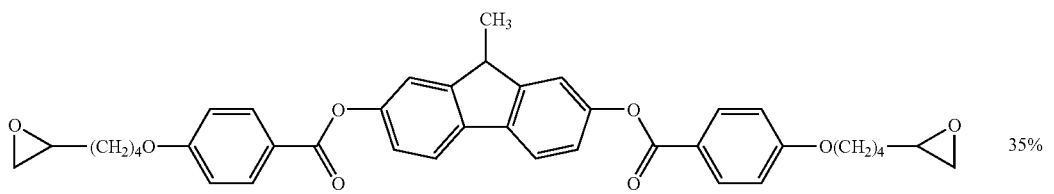 35%

Comparative Example 1

The compound (A) 61 parts by weight, the compound (B) 26 parts by weight and the photopolymerization initiator (Irgacure 907 manufactured by Ciba Specialty Chemicals Co., Ltd.) 3 parts by weight were mixed to prepare a polymerizable liquid crystal composition (E). The composition thus obtained was gradually heated and it was observed that the crystal started to melt as the temperature reached near 85° C. and that the whole mixture showed a nematic phase at a temperature near 95° C. Accordingly, the polymerizable liquid crystal composition (E) has a very high melting point compared to that of the polymerizable liquid crystal composition (C) prepared in Example 3, and the melting point-falling effect of the compound (1) of the present invention was thus demonstrated.

Compound (A)

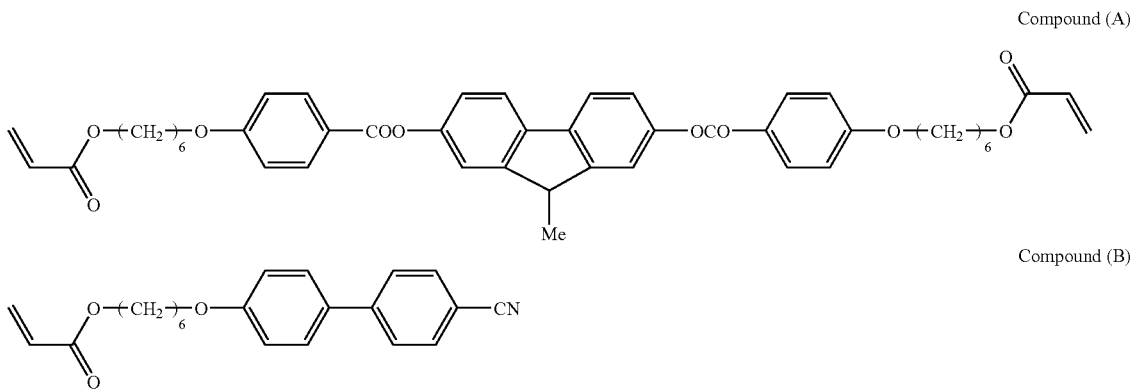

Compound (B)

The invention claimed is:

1. A compound represented by the following Formula (1) or (2):

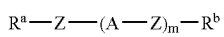 (1)

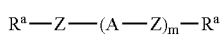 (2)

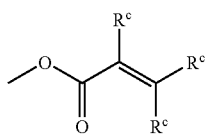 (3-1)

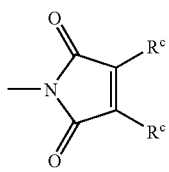 (3-2)

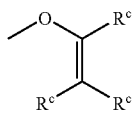 (3-3)

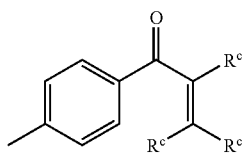 (3-4)

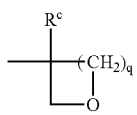 (3-5)

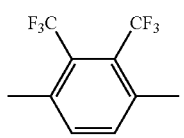 (4-1)

-continued

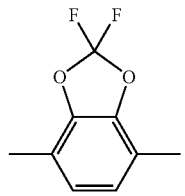 (4-2)

wherein $R^a$ is any one of polymerizable groups represented by formulae (3-1) to (3-5); $R^b$ is hydrogen, halogen, —CN, —NCO, —NCS or alkyl having a carbon number of 1 to 20; in the above alkyl, at least a —CH$_2$— can be substituted with —O—, —S—, —CO—, —COO—, —OCO—, —CH=CH— or —C≡C—, and at least a hydrogen can be substituted with halogen or —CN; A is 1,4-cyclohexylene, 1,4-cyclohexenylene, 1,4-phenylene, naphthalene-2,6-diyl, tetrahydronaphthalene-2,6-diyl, fluorene-2,7-diyl, bicyclo[2.2.2]oct-1,4-diyl or bicyclo[3.1.0]hex-3,6-diyl; in the above rings, —CH$_2$— can be substituted with —O—, and —CH= can be substituted with —N=; in the above rings, at least a hydrogen can be substituted with halogen, alkyl having a carbon number of 1 to 5 or halogenated alkyl having a carbon number of 1 to 5, and when the above substituents are adjacent, they can be combined with each other to form a ring together with a carbon-carbon bond in the ring, but at least one A is substituted 1,4-phenylene represented by formula (4-1) or (4-2); Z is a single bond or alkylene having a carbon number of 1 to 20; in the above alkylene, at least a —CH$_2$— can be substituted with —O—, —S—, —COO—, —OCO—, —CH=CH—, —CF=CF— or —C≡C—, and at least a hydrogen can be substituted with halogen; $R^c$ is hydrogen, halogen, —CF$_3$ or alkyl having a carbon number of 1 to 5; m is an integer of 1 to 6, and q is 0 or 1; and in Formula (1), when at least one A is substituted 1,4-phenylene represented by formula (4-2) and $R^a$ is a group represented by formula (3-1), the groups $R^c$ in $R^a$ are not all hydrogen atoms.

2. The compound as described in claim 1, wherein in formulae (1) and (2), $R^a$ is the polymerizable group represented by formula (3-1) or (3-5).

3. The compound as described in claim 1, wherein in formulae (1) and (2), $R^a$ is the polymerizable group represented by formula (3-1) or (3-5), and A other than the ring represented by formula (4-1) or (4-2) is 1,4-cyclohexylene, 1,4-cyclohexylene in which at least a hydrogen is substituted with halogen, 1,4-phenylene or 1,4-phenylene in which at least a hydrogen is substituted with halogen.

4. The compound as described in claim 1, wherein in formulae (1) and (2), $R^a$ is the polymerizable group represented by formula (3-1) or (3-5); A other than the ring represented by formula (4-1) or (4-2) is 1,4-cyclohexylene, 1,4-cyclohexylene in which at least a hydrogen is substituted with halogen, 1,4-phenylene or 1,4-phenylene in which at least a hydrogen is substituted with halogen; Z is a single bond, —$(CH_2)_a$—, —$O(CH_2)_a$—, —$(CH_2)_aO$—, —$O(CH_2)_aO$—, —CH=CH—, —C≡C—, —COO—, —OCO—, —CH=CH—COO—, —OCO—CH=CH—, —$CH_2CH_2$—COO—, —OCO—$CH_2CH_2$—, —$OCF_2$— or —$CF_2O$—; and a is an integer of 1 to 20.

5. The compound as described in claim 1, wherein in formulae (1) and (2), $R^a$ is the polymerizable group represented by any one of Formulas (3-2) to (3-4).

6. The compound as described in claim 1, wherein in formulae (1) and (2), $R^a$ is the polymerizable group represented by any one of Formulas (3-2) to (3-4), and A other than the ring represented by Formula (4-1) or (4-2) is 1,4-cyclohexylene, 1,4-cyclohexylene in which at least a hydrogen is substituted with halogen, 1,4-phenylene or 1,4-phenylene in which at least a hydrogen is substituted with halogen.

7. The compound as described in claim 1, wherein in formulae (1) and (2), $R^a$ is the polymerizable group represented by any one of formulas (3-2) to (3-4); A other than the ring represented by formula (4-1) or (4-2) is 1,4-cyclohexylene, 1,4-cyclohexylene in which at least a hydrogen is substituted with halogen, 1,4-phenylene or 1,4-phenylene in which at least a hydrogen is substituted with halogen; Z is a single bond, —$(CH_2)_a$—, —$O(CH_2)_a$—, —$(CH_2)_aO$—, —$O(CH_2)_aO$—, —CH=CH—, —C≡C—, —COO—, —OCO—, —$OCF_2$— or —$CF_2O$—; and a is an integer of 1 to 20.

8. The compound as described in claim 1, wherein in formulae (1) and (2), m is 2.

9. The compound as described in claim 1, wherein in formulae (1) and (2), m is 3.

10. The compound as described in claim 1, wherein in formulae (1) and (2), m is 4.

11. The compound as described in claim 1, wherein in formulae (1) and (2), $R^a$ is the polymerizable group represented by formula (3-1) or (3-5); one of A is the ring represented by formula (4-1), and A other than it is 1,4-cyclohexylene, 1,4-phenylene or 1,4-phenylene in which at least a hydrogen is substituted with halogen; Z is a single bond, —COO—, —OCO—, —$(CH_2)_a$—, —CH=CH—COO—, —OCO—CH=CH—, —$CH_2CH_2$—COO—, —OCO—$CH_2CH_2$—, —$O(CH_2)_a$—, —$(CH_2)_aO$— or —$O(CH_2)_aO$—; and a is an integer of 1 to 20.

12. The compound as described in claim 1, wherein in formulae (1) and (2), $R^a$ is the polymerizable group represented by formula (3-1) or (3-5); one of A is the ring represented by formula (4-2), and A other than it is 1,4-cyclohexylene, 1,4-phenylene or 1,4-phenylene in which at least a hydrogen is substituted with halogen; Z is a single bond, —COO—, —OCO—, —$(CH_2)_a$—, —$O(CH_2)_a$—, —$(CH_2)_aO$— or —$O(CH_2)_aO$—; and a is an integer of 1 to 20.

13. The compound as described in claim 1, wherein in formulae (1) and (2), $R^a$ is the polymerizable group represented by formula (3-1) or (3-5); one of A is the ring represented by formula (4-1), and A other than it is 1,4-phenylene; Z is —COO—, —OCO—, —$(CH_2)_a$—, —$O(CH_2)_a$—, —$(CH_2)_aO$— or —$O(CH_2)_aO$—; and a is an integer of 1 to 20.

14. The compound as described in claim 1, wherein in formulae (1) and (2), $R^a$ is the polymerizable group represented by any one of formulae (3-2) to (3-4); one of A is the ring represented by formula (4-1), and A other than it is 1,4-cyclohexylene, 1,4-phenylene or 1,4-phenylene in which at least a hydrogen is substituted with halogen; Z is a single bond, —COO—, —OCO—, —$(CH_2)_a$—, —$O(CH_2)_a$—, —$(CH_2)_aO$— or —$O(CH_2)_aO$—; and a is an integer of 1 to 20.

15. The compound as described in claim 1, wherein in formulae (1) and (2), $R^a$ is the polymerizable group represented by any one of formulae (3-2) to (3-4); one of A is the ring represented by Formula (4-2), and A other than it is 1,4-cyclohexylene, 1,4-phenylene or 1,4-phenylene in which at least a hydrogen is substituted with halogen; Z is a single bond, —COO—, —OCO—, —$(CH_2)_a$, —$O(CH_2)_a$—, —$(CH_2)_aO$— or —$O(CH_2)_aO$—; and a is an integer of 1 to 20.

16. The compound as described in claim 1, wherein in formulae (1) and (2), $R^a$ is the polymerizable group represented by any one of formulae (3-2) to (3-4); one of A is the ring represented by Formula (4-1), and A other than it is 1,4-phenylene; Z is —COO—, —OCO—, —$(CH_2)_a$—, —$O(CH_2)_a$—, —$(CH_2)_aO$— or —$O(CH_2)_aO$—; and a is an integer of 1 to 20.

17. A compound represented by any one of the following formulae (a) to (r):

| | |
|---|---|
| $R^a$-Z-B—$R^a$ | (a) |
| $R^a$-Z-B-Z-A-$R^a$ | (b) |
| $R^a$-Z-B-Z-A-Z-A-$R^a$ | (c) |
| $R^a$-Z-A-Z-B-Z-A-$R^a$ | (d) |
| $R^a$-Z-B-Z-A-Z-A-Z-A-$R^a$ | (e) |
| $R^a$-Z-A-Z-B-Z-A-Z-A-$R^a$ | (f) |
| $R^a$-Z-B-Z-A-Z-A-Z-A-Z-A-$R^a$ | (g) |
| $R^a$-Z-A-Z-B-Z-A-Z-A-Z-A-$R^a$ | (h) |
| $R^a$-Z-A-Z-A-Z-B-Z-A-Z-A-$R^a$ | (i) |
| $R^a$-Z-B-Z-$R^a$ | (j) |
| $R^a$-Z-B-Z-A-Z-$R^a$ | (k) |
| $R^a$-Z-B-Z-A-Z-A-Z-$R^a$ | (l) |
| $R^a$-Z-A-Z-B-Z-A-Z-$R^a$ | (m) |
| $R^a$-Z-B-Z-A-Z-A-Z-A-Z-$R^a$ | (n) |
| $R^a$-Z-A-Z-B-Z-A-Z-A-Z-$R^a$ | (o) |
| $R^a$-Z-B-Z-A-Z-A-Z-A-Z-A-Z-$R^a$ | (p) |
| $R^a$-Z-A-Z-B-Z-A-Z-A-Z-A-Z-$R^a$ | (q) |
| $R^a$-Z-A-Z-A-Z-B-Z-A-Z-A-Z-$R^a$ | (r) |

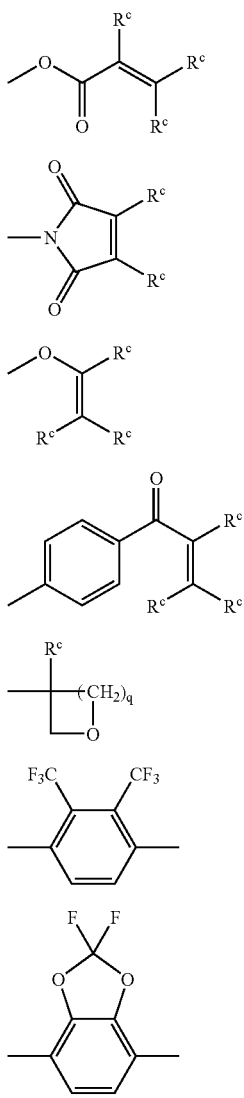

(3-1)
(3-2)
(3-3)
(3-4)
(3-5)
(4-1)
(4-2)

wherein $R^a$ is any one of polymerizable groups represented by formulae (3-1) to (3-5); A is 1,4-cyclohexylene, 1,4-cyclohexenylene, 1,4-phenylene, naphthalene-2,6-diyl, tet- rahydronaphthalene-2,6-diyl, fluorene-2,7-diyl, bicyclo[2.2.2]oct-1,4-diyl or bicyclo[3.1.0]hex-3,6-diyl; in the above rings, at least a —$CH_2$— can be substituted with —O—, and at least a —CH= can be substituted with —N=; in the above rings, at least a hydrogen can be substituted with halogen, alkyl having a carbon number of 1 to 5 or halogenated alkyl having a carbon number of 1 to 5, and when the above substituents are adjacent, they can be combined with each other to form a ring together with a carbon-carbon bond in the ring; B is substituted 1,4-phenylene represented by formula (4-1) or (4-2); Z is a single bond or alkylene having 1 to 20 carbon atoms; in the above alkylene, at least a —$CH_2$— can be substituted with —O—, —S—, —COO—, —OCO—, —CH=CH—, —CF=CF— or —C≡C—, and at least a hydrogen can be substituted with halogen; $R^c$ is hydrogen, halogen, —$CF_3$ or alkyl having 1 to 5 carbon atoms; and q is 0 or 1.

18. The compound as described in claim 17, wherein in formulae (a) to (r), A is 1,4-cyclohexylene or 1,4-phenylene, and in the above rings, at least a hydrogen can be substituted with halogen; Z is a single bond, —CH=CH—, —C≡C—, —COO—, —OCO—, —$(CF_2)_2$—, —CF=CF—, —$OCF_2$—, —$CF_2O$—, —$(CH_2)_a$—, —CH=CH—COO—, —OCO—CH=CH—, —$CH_2CH_2$—COO—, —OCO—$CH_2CH_2$—, —$O(CH_2)_a$—, —$(CH_2)_aO$— or —$O(CH_2)_aO$—, and a is an integer of 1 to 20.

19. The compound as described in claim 17, wherein in formulae (a) to (i), A is 1,4-cyclohexylene, 1,4-phenylene or 1,4-phenylene in which at least a hydrogen is substituted with halogen; Z is a single bond, —COO—, —OCO—, —$(CH_2)_a$—, —$O(CH_2)_a$—, —$(CH_2)_aO$— or —$O(CH_2)_aO$—; and a is an integer of 1 to 20.

20. A liquid crystal composition comprising at least two polymerizable compounds, wherein at least one of the polymerizable compounds is the compound as described in claim 1.

21. The liquid crystal composition as described in claim 20, wherein all of the polymerizable compounds are the compounds as described in claim 1.

22. The liquid crystal composition as described in claim 20, comprising at least one of the compounds as described in claim 1 and at least one of polymerizable compounds other than the compounds described in claim 1.

23. The liquid crystal composition as described in claim 20, comprising at least one of the compounds as described in claim 1 and at least one polymerizable compound selected from the group of compounds each represented by formula (A), Formula (B) and Formula (C) as follows:

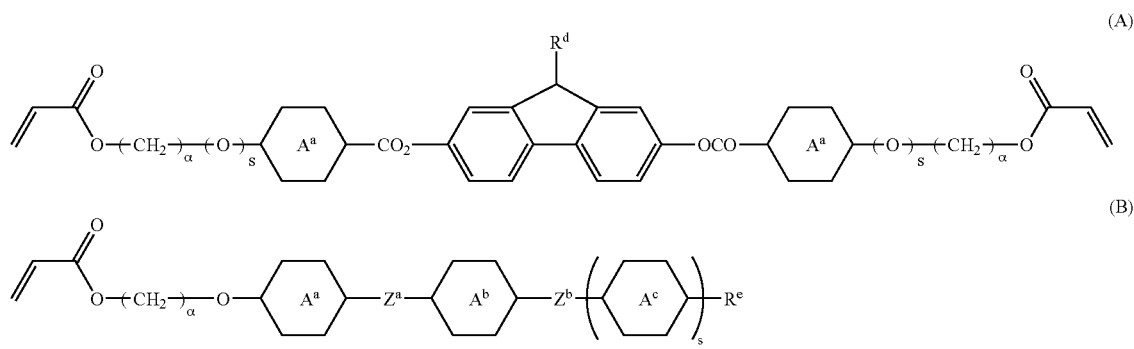

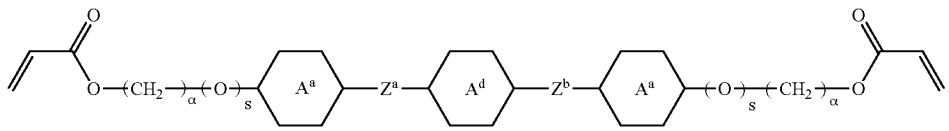
(C)

wherein $R^d$ is hydrogen, methyl, ethyl or propyl; $R^e$ is —CN, alkyl having a carbon number of 1 to 20 or alkoxy having a carbon number of 1 to 20; rings $A^a$, $A^b$ and $A^c$ are independently 1,4-cyclohexylene, 1,4-phenylene or 1,4-phenylene in which at least a hydrogen is substituted with halogen; a ring $A^d$ is 1,4-phenylene or 2-methyl-1,4-phenylene; $Z^a$ and $Z^b$ are independently a single bond, —(CH$_2$)$_2$—, —CH=CH—COO—, —OCO—CH=CH—, —CH$_2$CH$_2$—COO—, —OCO—CH$_2$CH$_2$—, —COO— or —OCO—; α is an integer of 0 to 20; and s is 0 or 1.

24. The liquid crystal composition as described in claim 20, further comprising an optically active compound.

25. A polymer obtained by polymerizing at least one of the compounds as described in claim 1.

26. A polymer obtained by homopolymerizing one of the compounds as described claim 1.

27. A polymer obtained by polymerizing the composition as described claim 20.

28. The polymer as described in claim 25, wherein a weight average molecular weight is 500 to 100,000.

29. The polymer as described in claim 25, wherein a weight average molecular weight is 1,000 to 50,000.

30. The polymer as described in claim 25, wherein the polymer is optically active.

31. A film obtained from the polymer as described in claim 25.

32. A molded article having an optical anisotropy comprising the polymer as described in claim 25.

33. A phase contrast film comprising the polymer as described in claim 25.

34. A liquid crystal aligning film comprising the polymer as described in claim 25.

35. A reflection reducing film comprising the polymer as described in claim 25.

36. A viewing angle compensation film comprising the polymer as described in claim 25.

37. A polarizing element comprising the polymer as described in claim 25.

38. A film having a selective reflection function comprising the polymer as described in claim 25.

39. A liquid crystal display element comprising the film as described in claim 31.

40. A liquid crystal display element comprising the molded article having an optical anisotropy as described in claim 32.

41. A liquid crystal display element comprising the phase contrast film as described in claim 33.

42. A liquid crystal display element comprising the liquid crystal aligning film as described in claim 34.

43. A liquid crystal display element comprising the reflection reducing film as described in claim 35.

44. A liquid crystal display element comprising the viewing angle compensation film as described in claim 36.

45. A liquid crystal display element comprising the polarizing element as described in claim 37.

46. A liquid crystal display element comprising the film having a selective reflection function as described in claim 38.

47. A liquid crystal display element comprising the composition as described in claim 20.

* * * * *